US012769002B2

(12) United States Patent
Rekow et al.

(10) Patent No.: US 12,769,002 B2
(45) Date of Patent: Oct. 20, 2026

(54) SYSTEMS AND METHODS FOR ADAPTIVE SCAN RESOLUTION IN LIDAR SENSORS

(71) Applicant: VELODYNE LIDAR USA, INC., San Jose, CA (US)

(72) Inventors: Mathew Noel Rekow, Santa Cruz, CA (US); Aaron Chen, San Jose, CA (US); Stephen S. Nestinger, Fremont, CA (US); Fausto D'apuzzo, Redmond, WA (US)

(73) Assignee: Velodyne Lidar USA, Inc., San Jose, CA (US)

( * ) Notice: Subject to any disclaimer, the term of this patent is extended or adjusted under 35 U.S.C. 154(b) by 963 days.

(21) Appl. No.: 18/082,910

(22) Filed: Dec. 16, 2022

(65) Prior Publication Data

US 2024/0201386 A1 Jun. 20, 2024

(51) Int. Cl.
*G01S 17/931* (2020.01)
*G01S 7/481* (2006.01)

(52) U.S. Cl.
CPC .......... *G01S 17/931* (2020.01); *G01S 7/4817* (2013.01)

(58) Field of Classification Search
CPC ............................. G01S 17/931; G01S 7/4817
USPC ......................................................... 356/4.01
See application file for complete search history.

(56) References Cited

U.S. PATENT DOCUMENTS

| | | | |
|---|---|---|---|
| 5,023,888 | A | 6/1991 | Bayston |
| 6,420,698 | B1 | 7/2002 | Dimsdale |
| 7,969,558 | B2 | 6/2011 | Hall |
| 8,310,654 | B2 | 11/2012 | Weilkes |
| 8,314,732 | B2 | 11/2012 | Oswald |
| 8,675,181 | B2 | 3/2014 | Hall |
| 8,744,741 | B2 | 6/2014 | Brimble |
| 8,767,190 | B2 | 7/2014 | Hall |
| 9,983,297 | B2 | 5/2018 | Hall et al. |
| 10,048,374 | B2 | 8/2018 | Hall et al. |
| 10,197,669 | B2 | 2/2019 | Hall et al. |
| 2006/0176697 | A1 | 8/2006 | Arruda |
| 2011/0040482 | A1 | 2/2011 | Brimble et al. |
| 2011/0305250 | A1 | 12/2011 | Chann et al. |
| 2012/0038903 | A1 | 2/2012 | Weimer et al. |
| 2013/0050676 | A1 | 2/2013 | d'Aligny |
| 2013/0314711 | A1 | 11/2013 | Cantin et al. |

(Continued)

OTHER PUBLICATIONS

Morsy et al., "Multispectral LiDAR Data for Land Cover Classification of Urban Areas," Sensors 17, 958, 2017, 21 pages.

(Continued)

*Primary Examiner* — Jeffery A Williams
(74) *Attorney, Agent, or Firm* — Kilpatrick Townsend & Stockton LLP

(57) ABSTRACT

Systems and methods for adaptive scanning in lidar sensors are provided. In some embodiments, a lidar device includes a plurality of channels and a plurality of transmitter-receiver optical subassemblies (TROSAs), with each TROSA including a respective subset of the plurality of channels. Each channel can be assigned to a firing group from a plurality of firing groups. Each firing group can include either one channel or no channels from any given TROSA from the plurality of TROSAs. The channels in each firing group can be configured to scan an environment during a respective window of time assigned to the firing group in a firing sequence.

17 Claims, 22 Drawing Sheets

(56) References Cited

U.S. PATENT DOCUMENTS

| | | | |
|---|---|---|---|
| 2014/0240317 A1 | 8/2014 | Go et al. | |
| 2015/0035437 A1 | 2/2015 | Panopoulos et al. | |
| 2016/0014309 A1 | 1/2016 | Ellison et al. | |
| 2016/0041266 A1 | 2/2016 | Smits | |
| 2019/0011567 A1* | 1/2019 | Pacala | G01S 17/89 |

OTHER PUBLICATIONS

"Firmware 2.1.1: Better Perception Performance with Improved Reflectivity and Signal Multiplier mode," <https://www.marketscreener.com/quote/stock/OUSTER-INC-120216302/news/Firmware-2-1-1-Better-Perception-Performance-with-Improved-Reflectivity-and-Signal-Multiplier-mode-35694197/>, Jun. 24, 2021.
Ouster, "Ouster, Firmware User Manual: Firmware v.2.3.0 for all Ouster sensors," Apr. 22, 2022, 181 pages.
Velodyne LiDAR, "VLP-32C User Manual 63-9325 Rev. B", 2018, 136 pages.
Velodyne LiDAR, "Firmware Release Notes, Version 4.4.2.0, Model VLP-32C LiDAR Sensor, Document No. 63-9510 Rev. C", undated, 11 pages.
Velodyne LiDAR, "Technical Release Notes, v4.4.2.0 Release, VLP-32C/uS, Document No. 63-9408 Rev. C", Sep. 3, 2021, 55 pages.
U.S. Appl. No. 18/082,923, filed Dec. 16, 2022.

* cited by examiner

430

TROSA 401a

TROSA 401b

| Wing 400a | Wing 400b | Wing 400c | Wing 400d |
|---|---|---|---|
| Channel 0 | Channel 32 | Channel 64 | Channel 96 |
| Channel 1 | Channel 33 | Channel 65 | Channel 97 |
| Channel 2 | Channel 34 | Channel 66 | Channel 98 |
| Channel 3 | Channel 35 | Channel 67 | Channel 99 |
| Channel 4 | Channel 36 | Channel 68 | Channel 100 |
| Channel 5 | Channel 37 | Channel 69 | Channel 101 |
| Channel 6 | Channel 38 | Channel 70 | Channel 102 |
| Channel 7 | Channel 39 | Channel 71 | Channel 103 |
| Channel 8 | Channel 40 | Channel 72 | Channel 104 |
| Channel 9 | Channel 41 | Channel 73 | Channel 105 |
| Channel 10 | Channel 42 | Channel 74 | Channel 106 |
| Channel 11 | Channel 43 | Channel 75 | Channel 107 |
| Channel 12 | Channel 44 | Channel 76 | Channel 108 |
| Channel 13 | Channel 45 | Channel 77 | Channel 109 |
| Channel 14 | Channel 46 | Channel 78 | Channel 110 |
| Channel 15 | Channel 47 | Channel 79 | Channel 111 |
| Channel 16 | Channel 48 | Channel 80 | Channel 112 |
| Channel 17 | Channel 49 | Channel 81 | Channel 113 |
| Channel 18 | Channel 50 | Channel 82 | Channel 114 |
| Channel 19 | Channel 51 | Channel 83 | Channel 115 |
| Channel 20 | Channel 52 | Channel 84 | Channel 116 |
| Channel 21 | Channel 53 | Channel 85 | Channel 117 |
| Channel 22 | Channel 54 | Channel 86 | Channel 118 |
| Channel 23 | Channel 55 | Channel 87 | Channel 119 |
| Channel 24 | Channel 56 | Channel 88 | Channel 120 |
| Channel 25 | Channel 57 | Channel 89 | Channel 121 |
| Channel 26 | Channel 58 | Channel 90 | Channel 122 |
| Channel 27 | Channel 59 | Channel 91 | Channel 123 |
| Channel 28 | Channel 60 | Channel 92 | Channel 124 |
| Channel 29 | Channel 61 | Channel 93 | Channel 125 |
| Channel 30 | Channel 62 | Channel 94 | Channel 126 |
| Channel 31 | Channel 63 | Channel 95 | Channel 127 |

FIG. 4A

First (e.g., Low Frequency) Firing Sequence 500a

Firing Group 510

Channels 502

| Firing Group | | | | | | | | |
|---|---|---|---|---|---|---|---|---|
| L-Group 1 | 4 | 12 | 20 | 28 | 36 | 44 | 52 | 60 |
| L-Group 2 | 68 | 76 | 84 | 92 | 100 | 108 | 116 | 124 |
| L-Group 3 | 0 | 8 | 16 | 24 | 32 | 40 | 48 | 56 |
| L-Group 4 | 64 | 72 | 80 | 88 | 96 | 104 | 112 | 120 |
| L-Group 5 | 5 | 13 | 21 | 29 | 37 | 45 | 53 | 61 |
| L-Group 6 | 69 | 77 | 85 | 93 | 101 | 109 | 117 | 125 |
| L-Group 7 | 1 | 9 | 17 | 25 | 33 | 41 | 49 | 57 |
| L-Group 8 | 65 | 73 | 81 | 89 | 97 | 105 | 113 | 121 |
| L-Group 9 | 6 | 14 | 22 | 30 | 38 | 46 | 54 | 62 |
| L-Group 10 | 70 | 78 | 86 | 94 | 102 | 110 | 118 | 126 |
| L-Group 11 | 2 | 10 | 18 | 26 | 34 | 42 | 50 | 58 |
| L-Group 12 | 66 | 74 | 82 | 90 | 98 | 106 | 114 | 122 |
| L-Group 13 | 7 | 15 | 23 | 31 | 39 | 47 | 55 | 63 |
| L-Group 14 | 71 | 79 | 87 | 95 | 103 | 111 | 119 | 127 |
| L-Group 15 | 3 | 11 | 19 | 27 | 35 | 43 | 51 | 59 |
| L-Group 16 | 67 | 75 | 83 | 91 | 99 | 107 | 115 | 123 |

Time: 0 → t

TROSA 501a

FIG. 5A

SYSTEMS AND METHODS FOR ADAPTIVE SCAN RESOLUTION IN LIDAR SENSORS

FIELD OF TECHNOLOGY

The present disclosure relates generally to lidar technology and, more specifically, to techniques for adaptive scan resolution in lidar systems.

BACKGROUND

Lidar (light detection and ranging) systems measure the attributes of their surrounding environments (e.g., shape of a target, contour of a target, distance to a target, etc.) by illuminating the environment with light (e.g., laser light) and measuring the reflected light with sensors. Differences in laser return times and/or wavelengths can then be used to make digital, three-dimensional ("3D") representations of a surrounding environment. Lidar technology may be used in various applications including autonomous vehicles, advanced driver assistance systems, mapping, security, surveying, robotics, geology and soil science, agriculture, unmanned aerial vehicles, airborne obstacle detection (e.g., obstacle detection systems for aircraft), etc. Depending on the application and associated field of view, multiple optical transmitters and/or optical receivers may be used to produce images in a desired resolution. A lidar system with greater numbers of transmitters and/or receivers can generally generate larger numbers of pixels.

In a multi-channel lidar device, optical transmitters can be paired with optical receivers to form multiple "channels." In operation, each channel's transmitter can emit an optical signal (e.g., laser light) into the device's environment, and the channel's receiver can detect the portion of the signal that is reflected back to the channel's receiver by the surrounding environment. In this way, each channel can provide "point" measurements of the environment, which can be aggregated with the point measurements provided by the other channel(s) to form a "point cloud" of measurements of the environment.

The measurements collected by a lidar channel may be used to determine the distance ("range") from the device to the surface in the environment that reflected the channel's transmitted optical signal back to the channel's receiver. In some cases, the range to a surface may be determined based on the time of flight of the channel's signal (e.g., the time elapsed from the transmitter's emission of the optical signal to the receiver's reception of the return signal reflected by the surface). In other cases, the range may be determined based on the wavelength (or frequency) of the return signal (s) reflected by the surface.

In some cases, lidar measurements may be used to determine the reflectance of the surface that reflects an optical signal. The reflectance of a surface may be determined based on the intensity of the return signal, which generally depends not only on the reflectance of the surface but also on the range to the surface, the emitted signal's glancing angle with respect to the surface, the power level of the channel's transmitter, the alignment of the channel's transmitter and receiver, and other factors.

The foregoing examples of the related art and limitations therewith are intended to be illustrative and not exclusive, and are not admitted to be "prior art." Other limitations of the related art will become apparent to those of skill in the art upon a reading of the specification and a study of the drawings.

SUMMARY

Disclosed herein are lidar systems configured for adaptive scanning, and related methods and apparatus. In one aspect, the subject matter described herein relates to a lidar device. The lidar device includes a plurality of channels. The lidar device includes a plurality of transmitter-receiver optical subassemblies (TROSAs) each including a respective subset of the plurality of channels. Each channel is assigned to a firing group from a plurality of firing groups. Each firing group includes either one channel or no channels from any given TROSA from the plurality of TROSAs. The channels in each firing group are configured to scan an environment during a respective window of time assigned to the firing group in a firing sequence.

In another aspect, the subject matter described herein relates to a method. The method includes providing a lidar device including a plurality of channels and a plurality of transmitter-receiver optical subassemblies (TROSAs) each including a respective subset of the plurality of channels. Each channel is assigned to a firing group from a plurality of firing groups and each firing group includes either one channel or no channels from any given TROSA from the plurality of TROSAs. The method includes scanning an environment surrounding the lidar device, wherein the channels in each firing group are configured to scan the environment during a respective window of time assigned to the firing group in a firing sequence.

In another aspect, the subject matter described herein relates to a method. The method includes providing a lidar device including a plurality of channels and a plurality of transmitter-receiver optical subassemblies (TROSAs) each including a respective subset of the plurality of channels. Each channel is assigned to a firing group from a plurality of firing groups and each firing group includes either one channel or no channels from any given TROSA from the plurality of TROSAs. The method includes dividing an environment surrounding the lidar device into a plurality of azimuthal regions. The method includes assigning each azimuthal region to a firing sequence from a plurality of firing sequences. The method includes scanning each azimuthal region according to the assigned firing sequence, wherein the channels in each firing group are configured to scan the environment during a respective window of time assigned to the firing group in the firing sequence.

The above and other preferred features, including various novel details of implementation and combination of events, will now be more particularly described with reference to the accompanying figures and pointed out in the claims. It will be understood that the particular systems and methods described herein are shown by way of illustration only and not as limitations. As will be understood by those skilled in the art, the principles and features described herein may be employed in various and numerous embodiments without departing from the scope of any of the present inventions. As can be appreciated from the foregoing and the following description, each and every feature described herein, and each and every combination of two or more such features, is included within the scope of the present disclosure provided that the features included in such a combination are not mutually inconsistent. In addition, any feature or combination of features may be specifically excluded from any embodiment of any of the present inventions.

The foregoing Summary, including the description of some embodiments, motivations therefor, and/or advantages thereof, is intended to assist the reader in understanding the present disclosure, and does not in any way limit the scope of any of the claims.

BRIEF DESCRIPTION OF THE DRAWINGS

The accompanying figures, which are included as part of the present specification, illustrate the presently preferred embodiments and together with the general description given above and the detailed description of the preferred embodiments given below serve to explain and teach the principles described herein.

FIG. 4A shows an exemplary channel configuration of a lidar system, in accordance with some embodiments.

FIG. 5A shows an exemplary firing sequence for a lidar system operating in a first operating mode, in accordance with some embodiments.

Figure 1:
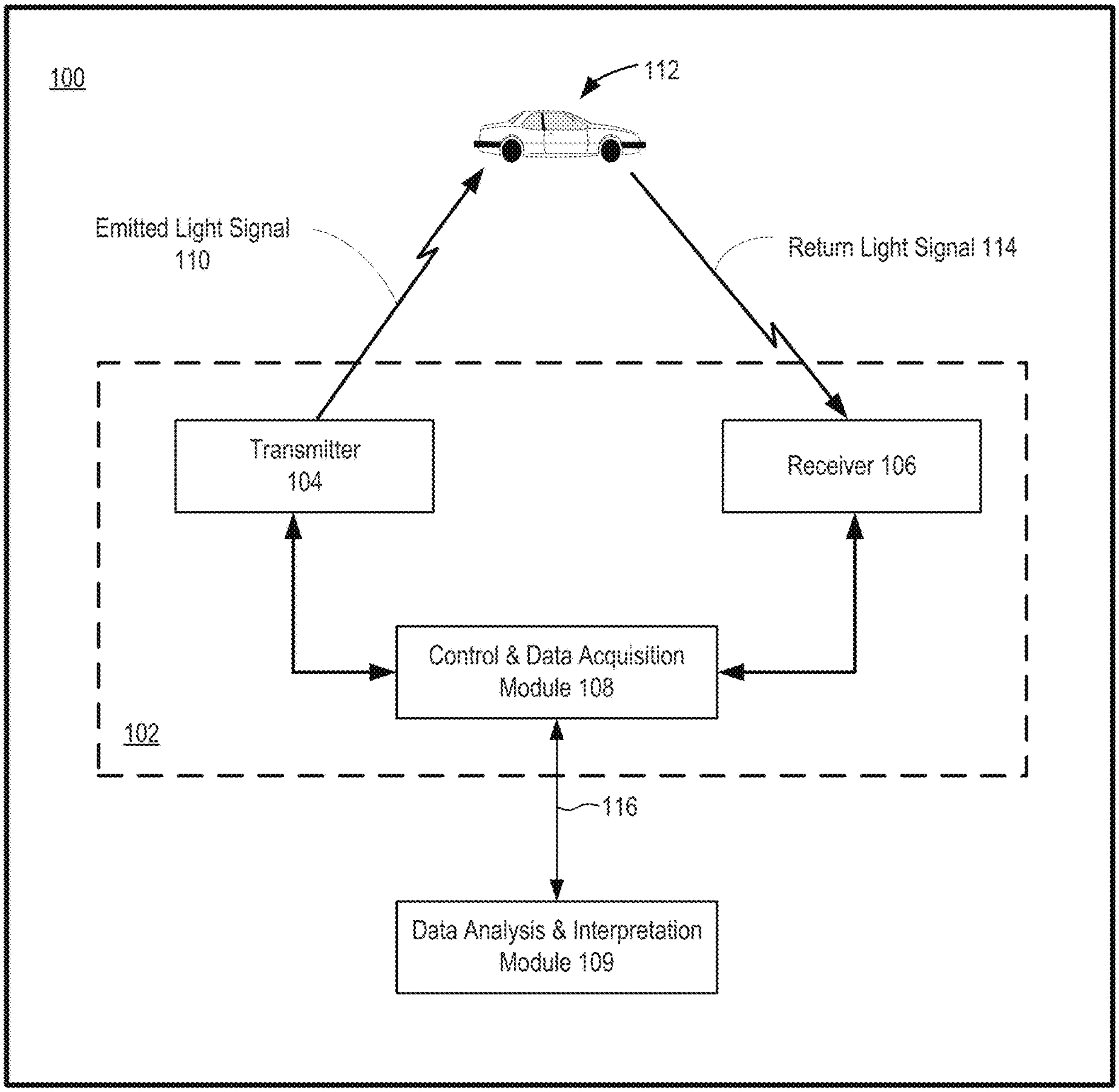
FIG. 1 is an illustration of an exemplary lidar system, in accordance with some embodiments.

While the present disclosure is subject to various modifications and alternative forms, specific embodiments thereof have been shown by way of example in the drawings and will herein be described in detail. The present disclosure should not be understood to be limited to the particular forms disclosed, but on the contrary, the intention is to cover all modifications, equivalents, and alternatives falling within the spirit and scope of the present disclosure.

DETAILED DESCRIPTION

Systems and methods for adaptive scanning in a lidar system are disclosed. It will be appreciated that, for simplicity and clarity of illustration, where considered appropriate, reference numerals may be repeated among the figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details.

Three of the most significant technical challenges faced by the lidar industry are (1) reducing the manufacturing cost for lidar devices while maintaining existing performance levels, (2) improving the reliability of lidar devices under automotive operating conditions (e.g., weather, temperature, and mechanical vibration), and (3) increasing the range of lidar devices. One approach to reducing manufacturing costs is to reduce the amount of hardware (e.g., channels, transmitters, emitters, receivers, detectors, etc.) in the lidar device while increasing the utilization of the remaining hardware to maintain performance levels. One approach to improving device reliability is to develop lidar devices that use fewer moving mechanical parts (e.g., by eliminating or simplifying mechanical beam scanners). One approach to extending range is to develop lidar devices that use solid-state lasers.

Motivation for and Benefits of Some Embodiments

Multi-channel lidar devices may be capable of scanning a FOV to generate 2D and/or 3D representations of a surrounding environment. To generate 3D representations of the surrounding environment, each channel's transmitter emits an optical signal (e.g., laser beam) into the device's environment and each channel's receiver detects the portion of the return signal that is reflected back to the receiver by the surrounding environment, such that each channel provides "point" measurements of the environment. Each point measurement may represent a "pixel" of the surrounding environment, which can each be aggregated to form a "point cloud" of measurements of the environment.

In some cases, a multi-channel lidar device may include one or more transmitter-receiver optical subassemblies (TROSAs), where each TROSA includes one or more channels. One or more TROSAs may be configured and/or positioned within a lidar device into a particular "wing" (i.e. "stack") of one or more wings (i.e. stacks). Channel(s) corresponding to a particular TROSA may be physically oriented such that the channel(s) are adjacent (e.g., in a linear array). Point cloud measurements aggregated by the channel(s) of a particular TROSA may be clustered in a respective scanning region within the FOV.

To scan a FOV, a multi-channel lidar device may be configured with one or more operating modes. In a particular operating mode, channel(s) may be configured to operate at a respective optical signal emission (e.g., firing) frequency and in a particular optical signal emission (e.g., firing) sequence (or "order"), which may result in a particular scanning frequency and point cloud resolution for the operating mode. In this context, "scanning frequency" refers to the average rate at which the multi-channel lidar device emits optical signals. A particular operating mode may be used to generate a point cloud of measurements to identify (e.g., map) objects and surfaces in the lidar device's FOV, where the configured operating mode may be selected based on the desired resolution for detecting objects and surfaces in the surrounding environment. As an example, a first (e.g., low scanning frequency or "low frequency") operating mode may correspond to a reduced scanning frequency and reduced point cloud resolution, while a second (e.g., "standard") operating mode may correspond to an increased scanning frequency and increased point cloud resolution.

Scanning frequencies and sequences (as well as resulting point cloud resolutions) corresponding to operating modes may be limited by operating factors including (but not limited to) power consumption, thermal load, communication bandwidth (e.g., to transfer return signal data), eye safety, and a number of simultaneously transmitting (e.g., firing) channels. As an example, to avoid overheating, a multi-channel lidar device may be limited to high frequency scanning for only a portion of a scanning region, and the lidar device may revert to lower frequency scanning in the remaining portion of the scanning region. As another example, TROSAs of a particular multi-channel lidar device may be limited to firing only one transmitter at a time, such that a TROSA may not simultaneously fire any of its channels, thereby limiting the device's scanning frequency.

In some cases, a lidar device's FOV may include one or more regions-of-interest (ROIs), where the lidar device (and/or a system coupled to the lidar device) may benefit from an increased scanning frequency and increased resolution point cloud measurements for a particular ROI (or ROIs). The ROI(s) for a particular lidar device may depend on the application of the lidar device and a use case for the environmental data aggregated by the lidar device. As an example, an autonomous vehicle including a lidar device may benefit from increased point cloud resolution for return signal data aggregated from ROIs in front of the vehicle and behind the vehicle, as such ROIs may be critical to collision-avoidance systems, and increased point cloud resolution may improve performance of such systems. In some cases, a lidar device's FOV may include one or more regions where the lidar device (and/or a system coupled to the lidar device) may tolerate reduced scanning frequency and reduced resolution point cloud measurements.

Accordingly, it would be desirable to provide a lidar system that is structured and arranged to adaptively scan one or more ROIs in a FOV using one or more operating modes each corresponding to a respective firing sequence and scanning frequency. A lidar system that is structured and arranged to adaptively scan one or more ROIs in a FOV may be further configured to adhere to the operating factors described herein.

Some Examples of Lidar Systems

A lidar system may be used to measure the shape and contour of the environment surrounding the system. Lidar systems may be applied to numerous applications including autonomous navigation and aerial mapping of surfaces. In general, a lidar system emits light that is subsequently reflected by objects within the environment in which the system operates. The light may be emitted by a laser (e.g., a rapidly firing laser). Laser light travels through a medium and reflects off points of surfaces in the environment (e.g., surfaces of buildings, tree branches, vehicles, etc.). The reflected (and/or scattered) light energy returns to a lidar detector where it may be sensed and used to perceive the environment.

The science of lidar systems is based on the physics of light and optics. Any suitable measurement techniques may be used to determine the attributes of objects in a lidar system's environment. In some examples, the lidar system is configured to emit light pulses (e.g., individual pulses or sequences of pulses). The time each pulse (or pulse sequence) travels from being emitted to being received ("time of flight" or "TOF") may be measured to determine the distance between the lidar system and the object that reflects the pulse. Lidar systems that operate in this way may be referred to as "pulsed lidar," "TOF lidar," "direct TOF lidar," or "pulsed TOF lidar." In some other examples, the time of flight may be calculated indirectly (e.g., using amplitude-modulated continuous wave (AMCW) structured light). Lidar systems that operate in this way may be referred to as "indirect TOF lidar" or "iTOF lidar." In still other examples, the lidar system can be configured to emit continuous wave (CW) light. The wavelength (or frequency) of the received, reflected light may be measured to determine the distance between the lidar system and the object that reflects the light. In some examples, lidar systems can measure the speed (or velocity) of objects. Lidar systems that operate in this way may be referred to as "coherent lidar," "continuous wave lidar," or "CW lidar." In a CW lidar system, any suitable variant of CW lidar sensing may be used. For example, frequency modulated continuous wave (FMCW) lidar sensing may be used.

FIG. 1 depicts the operation of a lidar system 100, according to some embodiments. In the example of FIG. 1, the lidar system 100 includes a lidar device 102, which may include a transmitter 104 that generates and emits a light signal 110, a receiver 106 that detects and processes a return light signal 114, and a control & data acquisition module 108. The transmitter 104 may include a light source (e.g., "optical emitter" or "emitter"), electrical components operable to activate (e.g., drive) and deactivate the light source in response to electrical control signals, and optical components adapted to shape and redirect the light emitted by the light source. The receiver 106 may include a light detector (e.g., "optical detector," "photodetector," or "detector") and optical components adapted to shape return light signals 114 and direct those signals to the detector. In some implementations, one or more optical components (e.g., lenses, mirrors, etc.) may be shared by the transmitter and the receiver.

The lidar device 102 may be referred to as a lidar transceiver or "channel." In operation, the emitted light signal 110 propagates through a medium and reflects off an object(s) 112, whereby a return light signal 114 propagates through the medium and is received by receiver 106. In one example, each lidar channel may correspond to a physical mapping of a single emitter to a single detector (e.g., a one-to-one pairing of a particular emitter and a particular detector). In other examples, however, each lidar channel may correspond to a physical mapping of multiple emitters to a single detector or a physical mapping of a single emitter to multiple detectors (e.g., a "flash" configuration). In some examples, a lidar system 100 may have no fixed channels;

rather, light emitted by one or more emitters may be detected by one or more detectors without any physical or persistent mapping of specific emitters to specific detectors.

Any suitable light source may be used including, without limitation, one or more gas lasers, chemical lasers, metal-vapor lasers, solid-state lasers (SSLs) (e.g., Q-switched SSLs, Q-switched solid-state bulk lasers, etc.), fiber lasers (e.g., Q-switched fiber lasers), liquid lasers (e.g., dye lasers), semiconductor lasers (e.g., laser diodes, edge emitting lasers (EELs), vertical-cavity surface emitting lasers (VCSELs), quantum cascade lasers, quantum dot lasers, quantum well lasers, hybrid silicon lasers, optically pumped semiconductor lasers, etc.), and/or any other device operable to emit light. For semiconductor lasers, any suitable gain medium may be used including, without limitation, gallium nitride (GaN), indium gallium nitride (InGaN), aluminum gallium indium phosphide (AlGaInP), aluminum gallium arsenide (AlGaAs), indium gallium arsenide phosphide (InGaAsP), lead salt, etc. For Q-switched lasers, any suitable type or variant of Q-switching can be used including, without limitation, active Q-switching, passive Q-switching, cavity dumping, regenerative Q-switching, etc. The light source may emit light having any suitable wavelength or wavelengths, including but not limited to wavelengths between 100 nm (or less) and 1 mm (or more). Semiconductor lasers operable to emit light having wavelengths of approximately 905 nm, 1300 nm, or 1550 nm are widely commercially available. In some examples, the light source may be operated as a pulsed laser, a continuous-wave (CW) laser, and/or a coherent laser. A light signal (e.g., "optical signal") 110 emitted by a light source may consist of a single pulse, may include a sequence of two or more pulses, or may be a continuous wave.

A lidar system 100 may use any suitable illumination technique to illuminate the system's field of view (FOV). In some examples, the lidar system 100 may illuminate the entire FOV simultaneously. Such illumination techniques may be referred to herein as "flood illumination" or "flash illumination." In some examples, the lidar system 100 may illuminate fixed, discrete spots throughout the FOV simultaneously. Such illumination techniques may be referred to herein as "fixed spot illumination." In some examples, the lidar system 100 may illuminate a line within the FOV and use a scanner (e.g., a 1D scanner) to scan the line over the entire FOV. Such illumination techniques may be referred to herein as "scanned line illumination." In some examples, the lidar system 100 may simultaneously illuminate one or more spots within the FOV and use a scanner (e.g., a 1D or 2D scanner) to scan the spots over the entire FOV. Such illumination techniques may be referred to herein as "scanned spot illumination."

Any suitable optical detector may be used including, without limitation, one or more photodetectors, contact image sensors (CIS), solid-state photodetectors (e.g., photodiodes (PD), single-photon avalanche diode (SPADs), avalanche photodiodes (APDs), etc.), photomultipliers (e.g., silicon photomultipliers (SiPMs), and/or any other device operable to convert light (e.g., optical signals) into electrical signals. In some examples, CIS can be fabricated using a complementary metal-oxide semiconductor (CMOS) process. In some examples, solid-state photodetectors can be fabricated using semiconductor processes similar to CMOS. Such semiconductor processes may use silicon, germanium, indium gallium arsenide, lead (II) sulfide, mercury cadmium, telluride, $MoS_2$, graphene, and/or any other suitable material(s). In some examples, an array of integrated or discrete CIS or solid-state photodetectors can be used to simultaneously image (e.g., perform optical detection across) the lidar device's entire field of view or a portion thereof. In general, solid-state photodetectors may be configured to detect light having wavelengths between 190 nm (or lower) and 1.4 μm (or higher). PDs and APDs configured to detect light having wavelengths of approximately 905 nm, 1300 nm, or 1550 nm are widely commercially available.

The lidar system 100 may include any suitable combination of measurement technique(s), light source(s), illumination technique(s), and detector(s). Some combinations may be more accurate or more economical on certain conditions. For example, some combinations may be more economical for short-range sensing but incapable of provide accurate measurements at longer ranges. Some combinations may pose potential hazards to eye safety, while other combinations may reduce such hazards to negligible levels.

The control & data acquisition module 108 may control the light emission by the transmitter 104 and may record data derived from the return light signal 114 detected by the receiver 106. In some embodiments, the control & data acquisition module 108 controls the power level at which the transmitter 104 operates when emitting light. For example, the transmitter 104 may be configured to operate at a plurality of different power levels, and the control & data acquisition module 108 may select the power level at which the transmitter 104 operates at any given time. Any suitable technique may be used to control the power level at which the transmitter 104 operates. In some embodiments, the control & data acquisition module 108 or the receiver 106 determines (e.g., measures) particular characteristics of the return light signal 114 detected by the receiver 106. For example, the control & data acquisition module 108 or receiver 106 may measure the intensity of the return light signal 114 using any suitable technique.

Operational parameters of the transceiver 102 may include its horizontal field of view ("FOV") and its vertical FOV. The FOV parameters effectively define the region of the environment that is visible to the specific lidar transceiver 102. More generally, the horizontal and vertical FOVs of a lidar system 100 may be defined by combining the fields of view of a plurality of lidar devices 102.

To obtain measurements of points in its environment and generate a point cloud based on those measurements, a lidar system 100 may scan its FOV. A lidar transceiver system 100 may include one or more beam-steering components (not shown) to redirect and shape the emitted light signals 110 and/or the return light signals 114. Any suitable beam-steering components may be used including, without limitation, mechanical beam steering components (e.g., rotating assemblies that physically rotate the transceiver(s) 102, rotating scan mirrors that deflect emitted light signals 110 and/or return light signals 114, etc.), optical beam steering components (e.g., lenses, lens arrays, microlenses, microlens arrays, beam splitters, etc.), microelectromechanical (MEMS) beam steering components (e.g., MEMS scan mirrors, etc.), solid-state beam steering components (e.g., optical phased arrays, optical frequency diversity arrays, etc.), etc.

In some implementations, the lidar system 100 may include or be communicatively coupled to a data analysis & interpretation module 109, which may receive outputs (e.g., via a connection 116) from the control & data acquisition module 108 and may perform data analysis on those outputs. By way of example and not limitation, connection 116 may be implemented using wired or wireless (e.g., non-contact communication) technique(s).

Figure 2A:
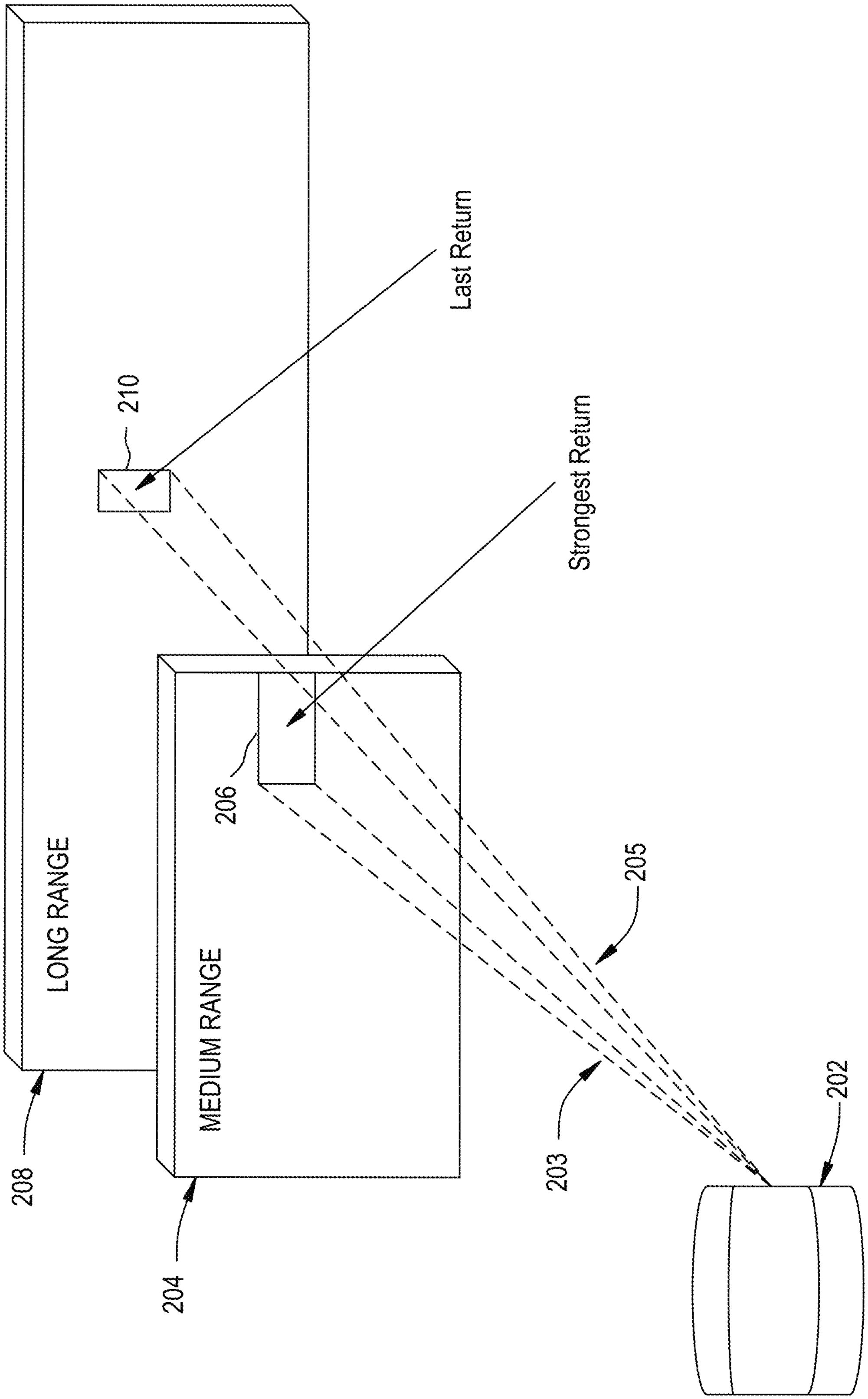
FIG. 2A is an illustration of the operation of a lidar system, in accordance with some embodiments.

FIG. 2A illustrates the operation of a lidar system 202, in accordance with some embodiments. In the example of FIG. 2A, two return light signals 203 and 205 are shown. Because laser beams generally tend to diverge as they travel through a medium, a single laser emission may hit multiple objects at different ranges from the lidar system 202, producing multiple return signals 203, 205. The lidar system 202 may analyze multiple return signals 203, 205 and report one of the return signals (e.g., the strongest return signal, the last return signal, etc.) or more than one (e.g., all) of the return signals. In the example of FIG. 2A, lidar system 202 emits laser light in the direction of near wall 204 and far wall 208. As illustrated, the majority of the emitted light hits the near wall 204 at area 206 resulting in a return signal 203, and another portion of the emitted light hits the far wall 208 at area 210 resulting in a return signal 205. Return signal 203 may have a shorter TOF and a stronger received signal strength compared to return signal 205. In both single- and multiple-return lidar systems, it is important that each return signal is accurately associated with the transmitted light signal so that one or more attributes of the object reflecting the light signal (e.g., range, velocity, reflectance, etc.) can be correctly estimated.

Some embodiments of a lidar system may capture distance data in a two-dimensional ("2D") (e.g., within a single plane) point cloud manner. These lidar systems may be used in industrial applications, or for surveying, mapping, autonomous navigation, and other uses. Some embodiments of these systems rely on the use of a single laser emitter/detector pair combined with a moving mirror to effect scanning across at least one plane. This mirror may reflect the emitted light from the transmitter (e.g., laser diode), and/or may reflect the return light to the receiver (e.g., to the detector). Use of a movable (e.g., oscillating) mirror in this manner may enable the lidar system to achieve 90-180-360 degrees of azimuth (horizontal) view while simplifying both the system design and manufacturability. Many applications require more data than just a 2D plane. The 2D point cloud may be expanded to form a 3D point cloud, in which multiple 2D point clouds are used, each corresponding to a different elevation (e.g., a different position and/or direction with respect to a vertical axis). Operational parameters of the receiver of a lidar system may include the horizontal FOV and the vertical FOV.

Figure 2B:
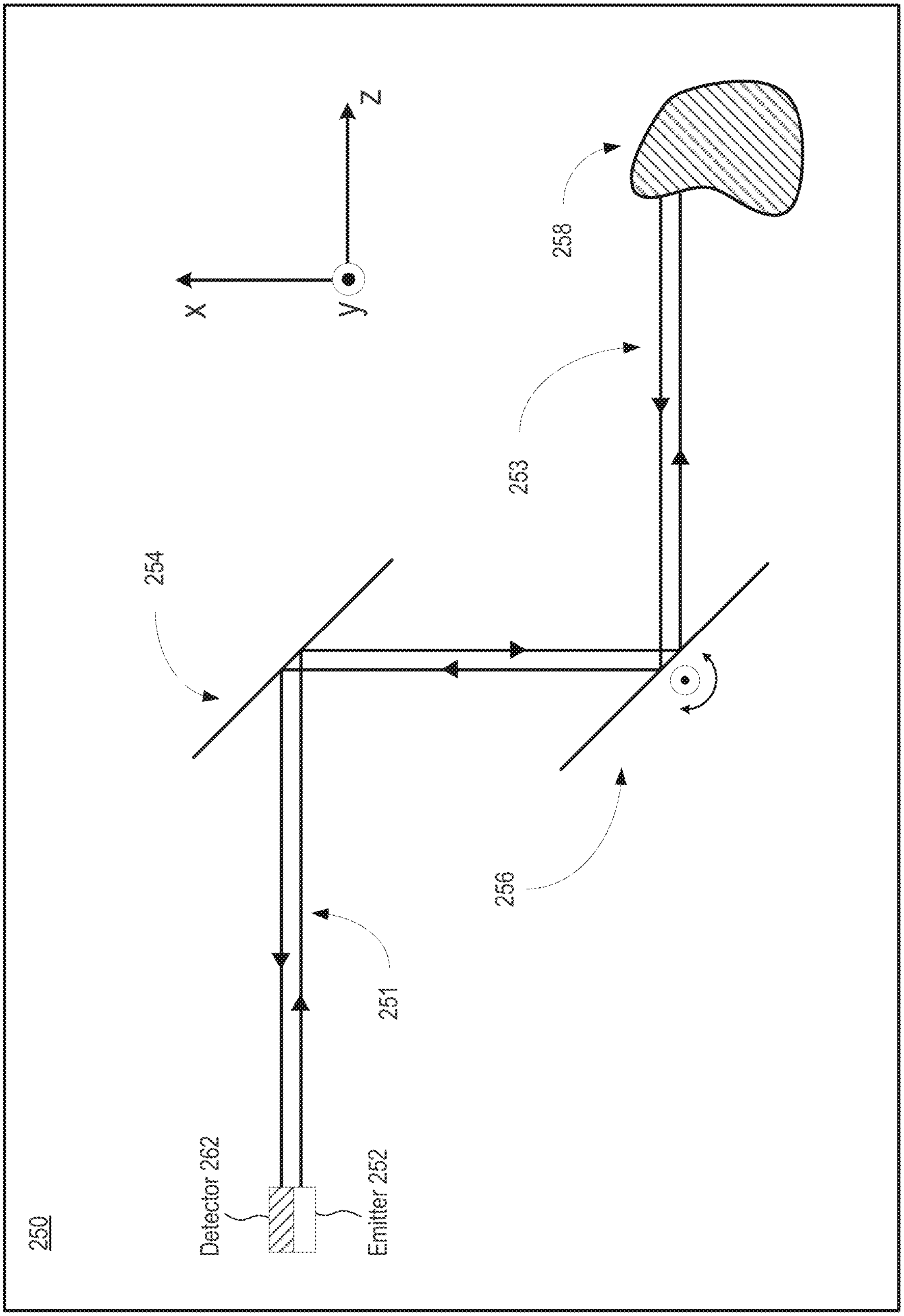
FIG. 2B is an illustration of optical components of a channel of a lidar system with a movable mirror, in accordance with some embodiments.

FIG. 2B depicts a lidar system 250 with a movable (e.g., rotating or oscillating) mirror, according to some embodiments. In the example of FIG. 2B, the lidar system 250 uses a single emitter 252/detector 262 pair combined with a fixed mirror 254 and a movable mirror 256 to effectively scan across a plane. Distance measurements obtained by such a system may be effectively two-dimensional (e.g., planar), and the captured distance points may be rendered as a 2D (e.g., single plane) point cloud. In some embodiments, but without limitation, the movable mirror 256 may oscillate at very fast speeds (e.g., thousands of cycles per minute). An angular (azimuthal) orientation w of the transmitter's movable mirror 256 may be measured with respect to the mirror's axis of oscillation (or rotation). Scanning across the full azimuthal extent of a plane within the FOV (e.g., by changing the position (e.g., angular orientation ω) of the movable mirror 256, emitting laser signal(s) 251, and receiving return signal(s) 253) may be referred to as a "sweep" of the FOV by the lidar system 250, such that changing the orientation w of the movable mirror 256 changes the point(s) scanned along the plane during the sweep. Scanning the "full azimuthal extent" of the FOV may refer to scanning a portion of the FOV that extends from one extreme of the azimuthal range to the other extreme of the azimuthal range.

As an example, the movable mirror 256 may be configured to change position such that the lidar system 250 may scan a horizontal plane in the FOV for a full azimuthal extent of orientation ω=30 to 150 degrees during the sweep of the FOV, where azimuthal orientation ω is measured with respect to a horizontal axis. During a sweep of the FOV, the lidar system 250 may scan one or more scanning regions in the FOV as described further below with respect to FIGS. 6A and 6B. As described herein, a sweep may involve scanning the entire FOV. A scanning mechanism (e.g., movable mirror 256) of the lidar system 250 may cause the lidar system 250 to scan the full azimuthal extent of the FOV during the sweep.

The emitted laser signal 251 may be directed to a fixed mirror 254, which may reflect the emitted laser signal 251 to the movable mirror 256. As movable mirror 256 moves (e.g., oscillates), the emitted laser signal 251 may reflect off an object 258 in its propagation path. The reflected return signal 253 may be coupled to the detector 262 via the movable mirror 256 and the fixed mirror 254. In some embodiments, the movable mirror 256 is implemented with mechanical technology or with solid state technology (e.g., MEMS).

Design elements of the lidar system 250 can include the horizontal FOV and the vertical FOV, which define a scanning region. A position of the movable mirror 256 may correspond to a scanning azimuth of the emitted laser signal 251 originating from the lidar system 250. A scanning azimuth may correspond to one or more points scanned by the lidar system 250 within the FOV, where the scanning azimuth is an azimuthal direction measured relative to the lidar system. As described further below with respect to FIGS. 6A and 6B, a scanning azimuth of the lidar system 250 may correspond to and/or be included in a respective azimuthal scanning region of one or more azimuthal scanning regions.

Figure 2C:
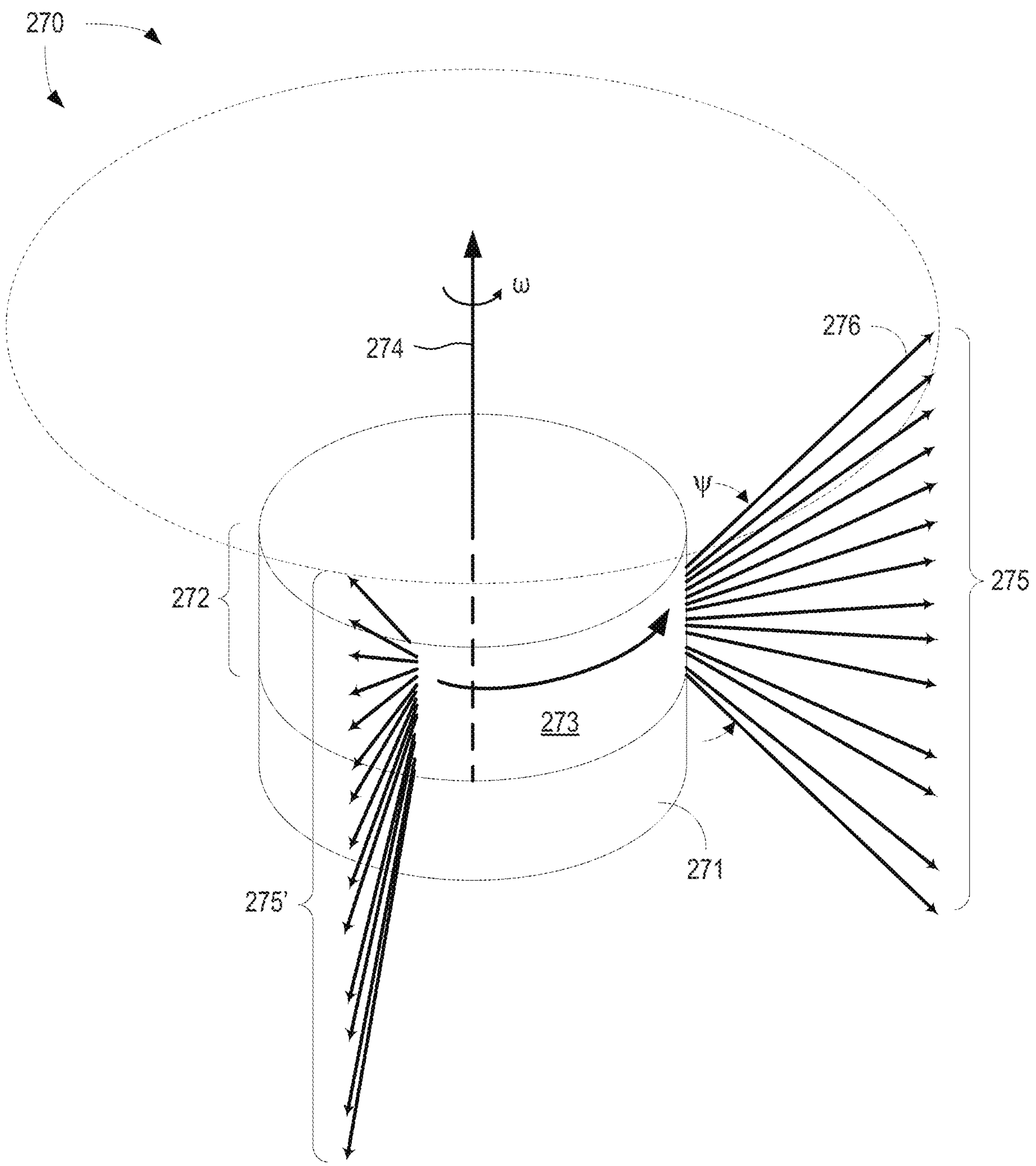
FIG. 2C is an illustration of an example of a 3D lidar system, in accordance with some embodiments.

FIG. 2C depicts a 3D lidar system 270, according to some embodiments. In the example of FIG. 2C, the 3D lidar system 270 includes a lower housing 271 and an upper housing 272. The upper housing 272 includes a cylindrical shell element 273 constructed from a material that is transparent to infrared light (e.g., light having a wavelength within the spectral range of 700 to 1,700 nanometers). In one example, the cylindrical shell element 273 is transparent to light having wavelengths centered at 905 nanometers.

In some embodiments, the 3D lidar system 270 includes a lidar transceiver, such as transceiver 102 shown in FIG. 1, operable to emit laser beams (e.g., optical scanning signals) 276 through the cylindrical shell element 273 of the upper housing 272. In the example of FIG. 2C, each individual arrow in the sets of arrows 275, 275' directed outward from the 3D lidar system 270 represents a laser beam 276 emitted by the 3D lidar system. Each beam of light emitted from the system 270 (e.g., each laser beam 276) may diverge slightly, such that each beam of emitted light forms a cone of light emitted from system 270. In one example, a beam of light emitted from the system 270 illuminates a spot size of 20 centimeters in diameter at a distance of 100 meters from the system 270.

In some embodiments, the transceiver 102 emits each laser beam 276 transmitted by the 3D lidar system 270. The direction of each emitted beam may be determined by the azimuthal orientation ω of the light source that emits the beam with respect to the system's central axis 274, by the angular orientation ψ (e.g., angular orientation in the vertical plane) of the light source that emits the beam, and/or by the azimuthal and angular orientations of the scanning device (e.g., movable mirror 256). The azimuthal orientation ω of the lidar system 270 at the time a beam is emitted may be referred to as the beam's "scanning azimuth," and the azimuthal orientation ω of the lidar system 270 at the current time may be referred to as the system's "current scanning azimuth." For example, the direction of an emitted beam in a horizontal dimension may be determined by the light source's azimuthal orientation ω, and the direction of the emitted beam in a vertical dimension may be determined by the angular orientation ψ of the light source. Alternatively, the direction of an emitted beam in a vertical dimension may be determined the azimuthal orientation ω of the light source, and the direction of the emitted beam in a horizontal dimension may be determined by the angular orientation ψ of the light source. (For purposes of illustration, the beams of light 275 are illustrated in one azimuthal orientation ω relative to a non-rotating coordinate frame of the 3D lidar system 270 and the beams of light 275' are illustrated in another azimuthal orientation ω' relative to the non-rotating coordinate frame.)

The 3D lidar system 270 may scan a particular point (e.g., pixel) ($\omega_i$, $\psi_i$) in its field of view by adjusting the azimuthal orientation ω of a light source having the angular orientation $\psi_i$ to the desired azimuth di and emitting a laser beam from the light source. A currently scanned point may be located at a particular current scanning azimuth as described herein. Likewise, the 3D lidar system 270 may systematically scan its field of view by adjusting the orientation ω of the light source (or set of light sources) to a set of scan points ($\omega_i$, $\psi_j$) and emitting laser beams from the light source(s) at each of the scan points. A path formed through the FOV by connecting adjacent scan points may be referred to as a "scan path."

Scanning the full azimuthal extent of the FOV by adjusting the azimuthal orientation ω of the light source(s) between the extremes of the azimuthal range and emitting laser beams from the light sources at intermediate azimuths may be referred to as a "sweep" of the FOV by the lidar system 270. During a sweep of the FOV, the lidar system 270 may scan the full azimuthal extent of the FOV based on one or more scanning regions as described further below with respect to FIGS. 6A and 6B, such that the lidar system 270 scans each of the one or more scanning regions during the sweep.

For the 3D lidar system 270, a "current scanning azimuth" may correspond to the azimuthal orientation ω of the light source(s) of the lidar system 270.

Assuming that the optical component(s) (e.g., movable mirror 256) of a lidar transceiver remain stationary during the time period after the transmitter 104 emits a laser beam 110 (e.g., a pulsed laser beam or "pulse" or a CW laser beam) and before the receiver 106 receives the corresponding return beam 114, the return beam generally forms a spot centered at (or near) a stationary location L0 on the detector. This time period is referred to herein as the "ranging period" or "listening period" of the scan point associated with the transmitted beam 110 and the return beam 114.

In many lidar systems, the optical component(s) of a lidar transceiver do not remain stationary during the ranging period of a scan point. Rather, during a scan point's ranging period, the optical component(s) may be moved to orientation(s) associated with one or more other scan points, and the laser beams that scan those other scan points may be transmitted. In such systems, absent compensation, the location Li of the center of the spot at which the transceiver's detector receives a return beam 114 generally depends on the change in the orientation of the transceiver's optical component(s) during the ranging period, which depends on the angular scan rate (e.g., the rate of angular motion of the movable mirror 256) and the range to the object 112 that reflects the transmitted light. The distance between the location Li of the spot formed by the return beam and the nominal location L0 of the spot that would have been formed absent the intervening rotation of the optical component(s) during the ranging period is referred to herein as "walk-off."

Figure 2D:
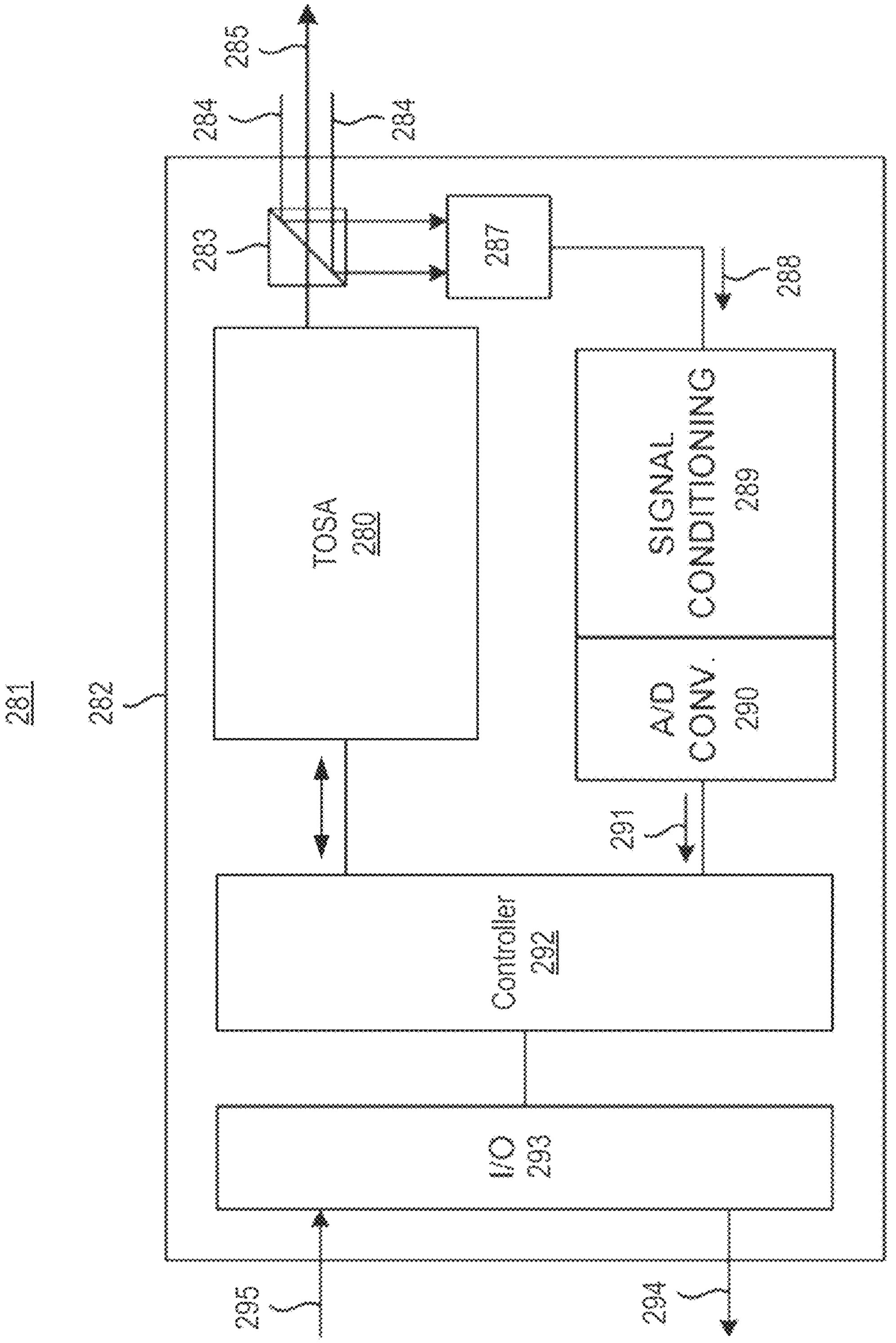
FIG. 2D is a block diagram of a transmitter-receiver optical sub-assembly (TROSA), according to some embodiments.

Referring to FIG. 2D, a block diagram of a transmitter-receiver optical subassembly (TROSA) 281 is shown, according to some embodiments. In some embodiments, the TROSA 281 may include a TOSA 280, an optical detector 287, a beam splitter 283, signal conditioning electronics 289, an analog to digital (A/D) converter 290, controller 292, and digital input/output (I/O) electronics 293. In some embodiments, the TROSA components illustrated in FIG. 2D are integrated onto a common substrate 282 (e.g., printed circuit board, ceramic substrate, etc.). In some embodiments, the TROSA components illustrated in FIG. 2D are individually mounted to a common substrate 282. In some embodiments, groups of these components are packaged together and the integrated package(s) is/are mounted to the common substrate.

The TOSA 280 may include one or more light sources and may operate the light source(s) safely within specified safety thresholds. A light source of the TOSA may emit an optical signal (e.g., laser beam) 285.

A return signal 284 may be detected by the TROSA 281 in response to the optical signal 285 illuminating a particular location. For example, the optical detector 287 may detect the return signal 284 and generate an electrical signal 288 based on the return signal 284. The controller 292 may initiate a measurement window (e.g., a period of time during which collected return signal data are associated with a particular emitted light signal 285) by enabling data acquisition by optical detector 287. Controller 292 may control the timing of the measurement window to correspond with the period of time when a return signal is expected in response to the emission of an optical signal 285. In some examples, the measurement window is enabled at the time when the optical signal 285 is emitted and is disabled after a time period corresponding to the time of flight of light over a distance that is substantially twice the range of the lidar device in which the TROSA 281 operates. In this manner, the measurement window is open to collect return light from objects adjacent to the lidar device (e.g., negligible time of flight), objects that are located at the maximum range of the lidar device, and objects in between. In this manner, other light that does not contribute to a useful return signal may be rejected.

In some embodiments, the signal analysis of the electrical signal 288 produced by the optical detector 287 is performed by the controller 292, entirely. In such embodiments, the signals 294 provided by the TROSA 281 may include an indication of the distances determined by controller 292. In some embodiments, the signals 294 include the digital signals 291 generated by the A/D converter 290. These raw measurement signals 291 may be processed further by one or more processors located on board the lidar device or external to the lidar device to arrive at a measurement of distance. In some embodiments, the controller 292 performs preliminary signal processing steps on the signals 291 and the signals 294 include processed data that are further processed by one or more processors located on board the lidar device or external to the lidar device to arrive at a measurement of distance.

In some embodiments a lidar device (e.g., a lidar device 100, 202, 250, or 270) includes multiple TROSAs 281. In some embodiments, a delay time is enforced between the firing of each TROSA and/or between the firing of different light sources within the same TROSA. In some examples, the delay time is greater than the time of flight of the light signal 285 to and from an object located at the maximum range of the lidar device, to reduce or avoid optical cross-talk among any of the TROSAs 281. In some other examples, an optical signal 285 is emitted from one TROSA 281 before a return signal corresponding to a light signal emitted from another TROSA 281 has had time to return to the lidar device. In these embodiments, there may be sufficient spatial separation between the areas of the surrounding environment interrogated by the light signals of these TROSAs to avoid optical cross-talk.

In some embodiments, digital I/O 293, A/D converter 290, and signal conditioning electronics 289 are integrated onto a single, silicon-based microelectronic chip. In another embodiment, these same elements are integrated into a single gallium-nitride or silicon based circuit that also includes components of the TOSA 280 (e.g., an illumination driver). In some embodiments, the A/D converter 290 and controller 292 are combined as a time-to-digital converter.

As depicted in FIG. 2D, return light 284 reflected from the surrounding environment is detected by optical detector 287. In some embodiments, optical detector 287 includes one or more avalanche photodiodes (APDs) and/or single-photon avalanche diodes (SPADs). Any suitable optical detector may be used. In some embodiments, optical detector 287 generates an output signal 288 that is amplified by signal conditioning electronics 289. In some embodiments, signal conditioning electronics 289 include an analog trans-impedance amplifier. However, in general, the amplification of output signal 288 may include multiple amplifier stages. In this sense, an analog transimpedance amplifier is provided by way of non-limiting example, as many other analog signal amplification schemes may be used.

In some embodiments, the amplified signal is communicated to A/D converter 290, and the digital signals generated by the A/D converter are communicated to controller 292. Controller 292 may generate an enable/disable signal to control the timing of data acquisition by ADC 290.

As depicted in FIG. 2D, the optical signal 285 emitted from the TROSA 281 and the return signal 284 directed toward the TROSA 281 share a common path within the lidar device. In the embodiment depicted in FIG. 2D, the return light 284 is separated from the emitted light 285 by a beam splitter 283. The beam splitter may direct the light 285 emitted by the TOSA 280 toward the lidar device's environment, and direct the return light 284 to the optical detector 287. Any suitable beam splitter may be used, including (without limitation) a polarizing beam splitter, nonpolarizing beam splitter, dielectric film, etc.). Some non-limiting examples of suitable beam splitters are described in International Patent Publication No. WO 2017/164989.

Configuration of a Lidar System

In some embodiments, as described herein, a lidar system (e.g., lidar system 100, 202, 250, and/or 270) may include one or more channels. The channels may be included in one or more TROSAs, where each TROSA may include one or more of the channels. In some embodiments, a TROSA may include one or more scanning devices (e.g., scanning mirrors). For example, a TROSA may include multiple scanning devices, each of which may be used by a single channel or shared among two or more channels. In some cases, a TROSA may include a single scanning device which may be shared by all the TROSA's channels. In some cases, one or more TROSAs may be configured and/or positioned within a lidar system in a particular "wing" (i.e., "stack"), where the lidar system may include one or more wings (i.e., stacks). For example, each wing can be positioned at a different circumferential or azimuthal location within the lidar system, and the TROSAs can be positioned at different vertical or axial locations within each wing (e.g., in a stacked configuration).

Figure 3:
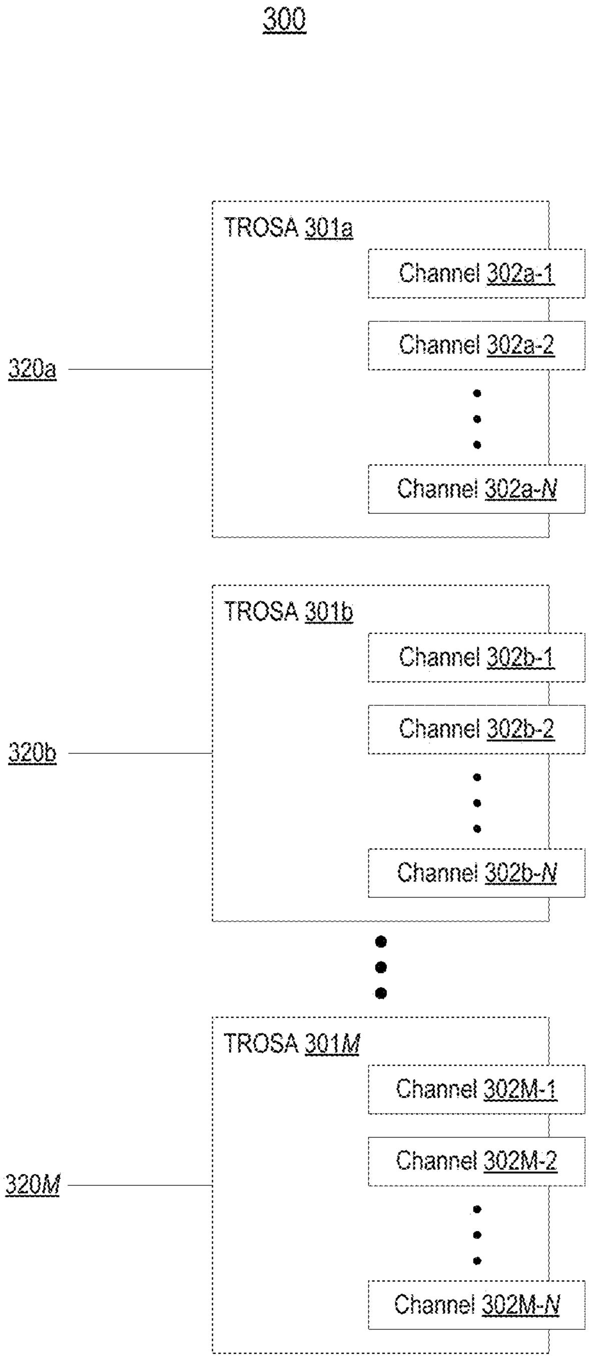
FIG. 3 shows an illustration of an exemplary wing of transmitter-receiver optical subassemblies (TROSAs) in a lidar system, in accordance with some embodiments.

FIG. 3 shows an illustration of an exemplary wing 300 of TROSAs 301 in a lidar system (e.g., any of the lidar systems 100, 202, 250, and 270). A lidar system may include one or more wings 300. As shown in FIG. 3, each TROSA 301 may include one or more channels 302. Each TROSA 301 may include N channels, where Nis any suitable number (e.g., 2, 4, 8, or any number between 2 and 32). A channel 302 may include one or more characteristics of a channel 102 as described with respect to FIG. 1. As an example, the channel 302*a*-1 of the TROSA 301*a* may include a transmitter 104 and a receiver 106. In some cases, as shown in FIG. 3, the wing 300 may include one or more TROSAs 301. As an example, the wing 300 may include M TROSAs 301, where M is any suitable number (e.g., 2, 4, 8, 16, or any number between 2 and 64).

In some embodiments, each TROSA 301 may be coupled to a respective connection 320. A connection 320 may include one or more electrical and/or communicative connections. As an example, for M TROSAs 301, the wing 300 may include M connections 320, where M is any suitable number. Each connection 320 may couple each TROSA 301 to one or more power sources, controllers (e.g., control and data acquisition module 108 and/or data analysis and interpretation module 109), and/or other components (e.g., temperature sensors). As an example, the connection 320*a* may include one or more connections to components that supply power to the TROSA 301*a* (and included channels 302*a*-1 to 320*a*-N), control the power applied to the TROSA 301*a*, and/or measure the temperature of the TROSA 301*a*. In some cases, each connection 320 may be individually coupled to the channels 302 included in each TROSA 301. Each connection 320 may couple each channel 302 to a controller (e.g., control and data acquisition module 108) and/or a data analysis and interpretation module (e.g., data analysis and interpretation module 108). As an example, a connection 320*b* may couple the channel 302*b*-1 of the TROSA 301*b* to the control and data acquisition module 108, such that the control and data acquisition module 108 may control the firing of the channel 302*b*-1 (e.g., using trigger signals), the pulse width of emitted optical signals, the pulse signatures encoded in the emitted optical signals, etc.

In some embodiments, the TROSAs 301 may be adjacently and/or proximally positioned within the wing 300. While the TROSAs 301 shown in FIG. 3 are positioned in a linear array and aligned with a linear focal plane, the TROSAs 301 may be configured in any suitable orientation and/or configuration within the wing 300. The channels 302 of each TROSA 301 may be adjacently and/or proximally positioned within the respective TROSA 301. While the channels 302 shown in FIG. 3 are positioned in a linear array and aligned with a linear focal plane in each TROSA 301, the channels 302 may be configured in any suitable orientation and/or configuration within their respective TROSA 301. As an example and as shown in FIG. 3, the TROSAs 301 may be arranged in a linear array and the channels 302 of each TROSA 301 may be arranged in a linear array such that the combination of the channels 302 from each TROSA 301 form a linear array. As another example, the TROSAs 301 and/or the channels 302 of each TROSA 301 may be arranged along a curved surface and aligned with a curved focal plane (not shown in FIG. 3), where the curved surface may be a section of a circle, a parabola, and/or an aspherical curve.

In some embodiments, one wing 300 or more than one wing 300 shown in FIG. 3 may be included in a lidar system. One or more wings 300 may be arranged and/or positioned in any suitable position. As an example, a set of four wings 300 may be configured in a stacked orientation, such that the combination of the four wings 300 (and their TROSAs 301 and channels 302) can generate a point cloud of measurements in the FOV. As described herein, a lidar system may include any number of wings 300, where each wing 300 includes any suitable number of TROSAs 301 and each TROSA 301 includes any suitable number of channels 302. As an example, the lidar system 270 may include four wings 300, where each wing 300 includes eight TROSAs 301 and each TROSA 301 includes four channels 302, such that the lidar system 270 includes 128 channels 302. Any suitable lidar system may include one or more wings 300 including, for example, lidar systems having rotating assemblies that physically rotate the transceiver(s), and/or lidar systems having rotating scan mirrors that deflect emitted light signals and/or return light signals.

In some embodiments, as described above, the channel(s) 302 of TROSA(s) 301 in a wing 300 may be configured to emit optical signals in a similar scanning region within a field of view. Optical signals emitted by channels 302 of the same TROSA 301 may be directed to adjacent and/or proximal positions.

Figure 4B:
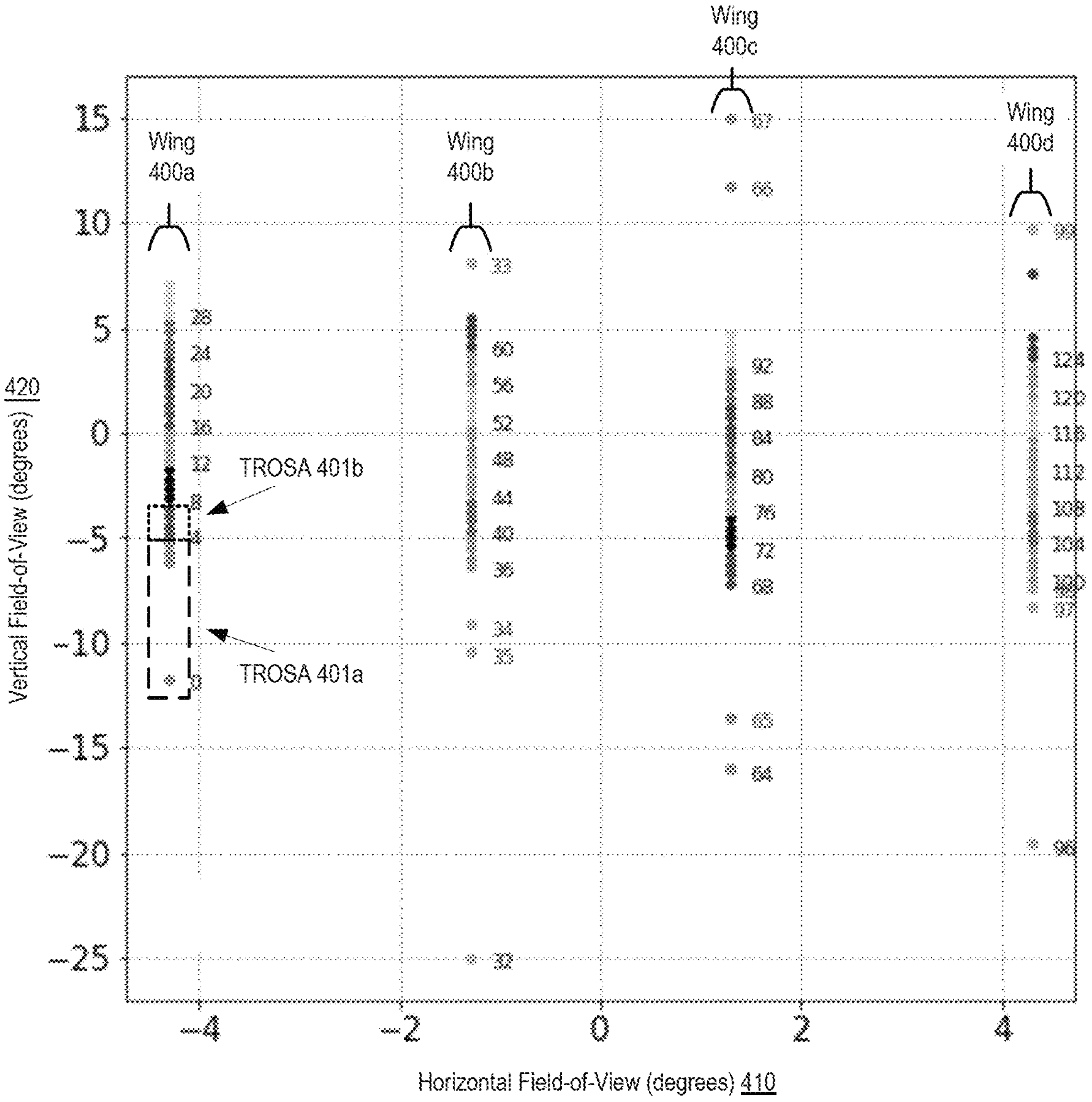
FIG. 4B shows an exemplary plot of scan points in a field of view (FOV) of a lidar system, in accordance with some embodiments.

FIG. 4A shows an exemplary channel configuration 430 of a lidar system, in accordance with some embodiments. FIG. 4B shows an exemplary plot 450 of scan points in a FOV of a lidar system having the channel configuration 430. A lidar system having the channel configuration 430 may include four wings (400*a*, 400*b*, 400*c*, and 400*d*) as shown in FIG. 4A. Each wing may include eight TROSAs 401 (indicated by bold lines surrounding each group of four channels), where each TROSA 401 includes four channels (e.g., as referred to as Channel 0-127 in FIG. 4A). While FIG. 4A shows an exemplary channel configuration 430 for a lidar system, any suitable configuration of wings 400, TROSAs 401, and channels may be used.

With respect to FIG. 4B, the plot 450 shows the positions of scan points in a FOV of the lidar system having the channel configuration 430. The x-axis 410 of the plot 450 shows a horizontal scanning region between approximately −4 degrees and approximately 4 degrees from a position of the lidar system, thereby showing an approximately 8 degree horizontal scanning region in the FOV of the lidar system. The y-axis 420 of the plot 450 shows a vertical scanning region between approximately −25 degrees and approximately 15 degrees from a position of the lidar system, thereby showing an approximately 40 degree vertical scanning region in the FOV of the lidar system. Each point on the plot 450 is representative of a scan point (e.g., a measurement corresponding to an emitted optical signal) in the FOV originating from the channels of the wings 400*a*, 400*b*, 400*c*, and 400*d*. A subset of the points in the plot 450 are numbered based on a respective channel that emitted the optical signal corresponding to the respective point. As an example, a channel corresponding to the wing 400*c* may emit the optical signal referred to as point "66" in the plot 450 at a horizontal position of approximately 1.5 degrees and a vertical position of approximately 12 degrees. As shown in FIG. 4B, the emitted optical signals in the plot 450 are vertically distributed based on their respective wing 400, such that the 32 channels corresponding to each wing 400 emit optical signals along a vertical scanning region at a particular position in the horizontal scanning region. As an example, for the wing 400*a*, the emitted optical signals can be distributed at a horizontal position of approximately −4.5 degrees and can be distributed at a number of vertical positions between approximately −12 degrees and 7 degrees.

In some embodiments, a lidar system may emit optical signals towards the surrounding environment (e.g., FOV) based on the positioning and orientation of its included wings 400, TROSAs 401, and channels. With respect to FIG. 4B, emitted optical signals corresponding to a particular TROSA 401 within a wing 400 may be directed (e.g., clustered) within a particular area within the FOV. With respect to the lidar system corresponding to the plot 450, TROSAs 410 within a particular wing 400 of the lidar system may be configured to emit optical signals within a subset of a vertical range scanned by the particular wing 400. As shown in FIG. 4B and the plot 450, the TROSA 401*a* may emit optical signals at a horizontal position of approximately −4.5 degrees and at vertical positions between approximately −12 degrees and −5 degrees (as indicated by the dashed box surrounding such points in FIG. 4B), such that the four emitted optical signals corresponding to the four channels of the TROSA 401*a* are bounded within the described scanning region. As additionally shown in FIG. 4B and the plot 450, the TROSA 401*b* may emit optical signals at a horizontal position of approximately −4.5 degrees and at vertical positions between approximately −5 degrees and −3 degrees (as indicated by the dashed box surrounding such points in FIG. 4B). Accordingly, a lidar system may be configured to scan a horizontal and/or vertical FOV as shown in FIG. 4B using one or more wings 400, TROSAs 401, and channels (e.g., configured with the channel configuration 430). Both rotational and directional lidar systems may be configured as described with respect to FIG. 4A to scan the horizontal and/or vertical FOV. While the particular lidar system described herein includes wings 400, TROSAs 401, and channels configured to emit optical signals according to the plot 450, any suitable number and positioning of wings 400, TROSAs 401, and channels may be used by a lidar system to scan the FOV in accordance with any suitable scanning pattern. The scanning pattern shown in FIG. 4B is not limiting.

In some embodiments, a lidar system may be configured to emit (e.g., fire) optical signals at one or more scanning frequencies and/or according to a particular optical signal emission (e.g., firing) sequence (e.g., for lidar systems including more than one channel). The combination of the scanning frequencies and a particular optical signal emission (e.g., firing) sequence may determine a resulting point cloud resolution (e.g., point cloud datapoint density). As described herein, the lidar system may be configured with one or more operating modes, where each operation mode determines a respective scanning frequency and point cloud resolution. An operating mode may be selected based on one or more factors, including, for example, a use case(s) of environmental data aggregated by the lidar system and/or adherence to the operating factors (e.g., power consumption, thermal load, data transfer limits, eye safety, etc.) of the lidar system described herein.

First Operating Mode

In some embodiments, a lidar system (e.g., lidar system 100, 202, 250, and/or 270) may be configured to operate in a first operating mode, where the lidar system may be a rotational, directional, or any other suitable type of lidar system. An "operating period" for a lidar system may corresponding to a time period when the lidar system is active (e.g., emitting optical signals) and aggregating environmental data according to at least one operating mode. As described herein, the lidar system may include one or more wings, TROSAs, and/or channels configured to emit one or more optical signals to scan the lidar system's FOV. In the first operating mode, the lidar system may emit optical signals with a particular scanning frequency and/or in accordance with a particular optical signal emission (e.g., firing) sequence. For purposes of illustration, the first operating mode may be referred to herein as a "low frequency" operating mode, because the scanning frequencies (e.g., in Hz) used in the first operating mode may be lower than the scanning frequencies used in other operating modes in the examples described herein. However, one of ordinary skill in the art will appreciate that any suitable scanning frequency may be used in the first operating mode.

As an example, with respect to the scanning frequency of the lidar system in a low frequency operating mode, the lidar system's transmitter(s) may be configured to emit optical signal(s) at a scanning frequency between 12 and 24 kHz (e.g., approximately 19.4 kHz or any other suitable frequency). With respect to an optical signal firing sequence, channels of the lidar system may be ordered and/or otherwise assigned to one or more groups (e.g., firing groups), such that the temporal attributes of the scan points (and the times at which the optical signals corresponding to the scan points are emitted and the associated return signals are detected) are determined by the ordering of the firing groups. As an example, for a lidar system that operates in a low frequency operating mode and is configured as described with respect to FIGS. 3, 4A, and 4B to include four wings, eight TROSAs per wing, and four channels per TROSA, the operating mode may include sixteen firing groups where one channel from each TROSA emits an optical signal in every fourth firing group (e.g., groups 1, 5, 9, and 13) as described further below with respect to FIG. 5A.

FIG. 5A shows an exemplary firing sequence 500*a* for a lidar system operating in a first (e.g., low frequency) operating mode. While the low frequency firing sequence 500*a* as shown in FIG. 5A corresponds to a lidar system having four wings (e.g., wings 300), eight TROSAs (e.g., TROSAs 301) per wing, and four channels (e.g., channels 302) per TROSA resulting in 128 total channels (referred to as channels 0-127 in FIG. 5A), the low frequency firing sequence 500*a* may be adapted to a lidar system including any suitable number and/or arrangement of wings, TROSAs, and/or channels. The channels 502 (e.g., referred to as channels 0-127) shown by the low frequency firing sequence 500*a* may be included in one or more respective TROSAs 501, such that every four sequentially numbered channels 502 are included in the same respective TROSA 501 (starting with channel 0). As an example, channels 0-3 may be included in a TROSA 501*a*, channels 4-7 may be included in a TROSA 501*b*, channels 8-11 may be included in a TROSA 501*c*, etc.

In some embodiments, the low frequency firing sequence 500*a* may include one or more firing groups 510, where channel(s) 502 within each firing group 510 are configured to simultaneously scan points (e.g., emit and receive optical signals) within the lidar system's FOV. As an example, for the above-described lidar system configuration, the low frequency firing sequence 500*a* may include sixteen firing groups 510 (e.g., referred to as "L-Group" 1-16). In each firing group 510, one or more channels 502 may be configured to emit optical signal(s) (e.g., optical scanning signals 110) via the respective channel's transmitter (e.g., transmitter 104) and to detect/receive one or more return signals (e.g., return signals 114) via the channel's receiver (e.g., receiver 106). As an example, for the above-described lidar system configuration, a firing group 510 may include eight channels 502 configured to emit optical signal(s) (e.g., optical scanning signals 110) via their transmitters (e.g., transmitters 104) and to detect/receive one or more return signals (e.g., return signals 114) via their receivers (e.g., receivers 106).

In some embodiments, as shown by the low frequency firing sequence 500*a* in FIG. 5A, the transmitters of each of the channels 502 corresponding to a particular firing group 510 may be configured to simultaneously emit optical signals beginning at approximately the same time. For example, the channels 4, 12, 20, 28, 36, 44, 52, and 60 of the firing group "L-Group 1" may each simultaneously emit optical signal(s) at approximately the same time. Receivers of each of the channels 502 corresponding to a particular firing group 510 may be configured to simultaneously detect and/or receive optical signals during approximately the same listening period. For example, the channels 4, 12, 20, 28, 36, 44, 52, and 60 of the firing group "L-Group 1" may be configured to simultaneously listen for return signal(s) beginning at approximately the same time. Receivers of each of the channels 502 corresponding to a particular firing group 510 may detect and/or receive return signals during a "listening period," where the listening period begins approximately before, with, or after the emission of the optical signal(s) by the channels 502 of the respective firing group 510. A listening period may be configured to be any suitable duration based on the system's scanning frequency and/or the desired range of the lidar system. As an example, for the low frequency firing sequence 500*a* corresponding to the low frequency operating mode, the listening period may be approximately 3 μs (e.g., 3.2 μs) or any other suitable duration. In some cases, the listening period may be determined based on the maximum intended range of the lidar system. In some cases, the listening period for each firing group 510 may be configured to be the same duration. In certain examples, the listening period may be equal to or approximately equal to an amount of time elapsed between one firing group (e.g., L-Group 1) emitting optical signals and a next firing group in the firing sequence 500*a* (e.g., L-Group-2) emitting optical signals.

In some embodiments, the listening periods of successive firing groups 510 may be temporally adjacent to each other, with little or no buffer period between successive listening periods. As an example, a first listening period corresponding to channels 502 of the firing group "L-Group 1" may terminate, and a second listening period of the channels 502 of the firing group "L-Group 2" may begin at approximately the same time.

Figure 5B:
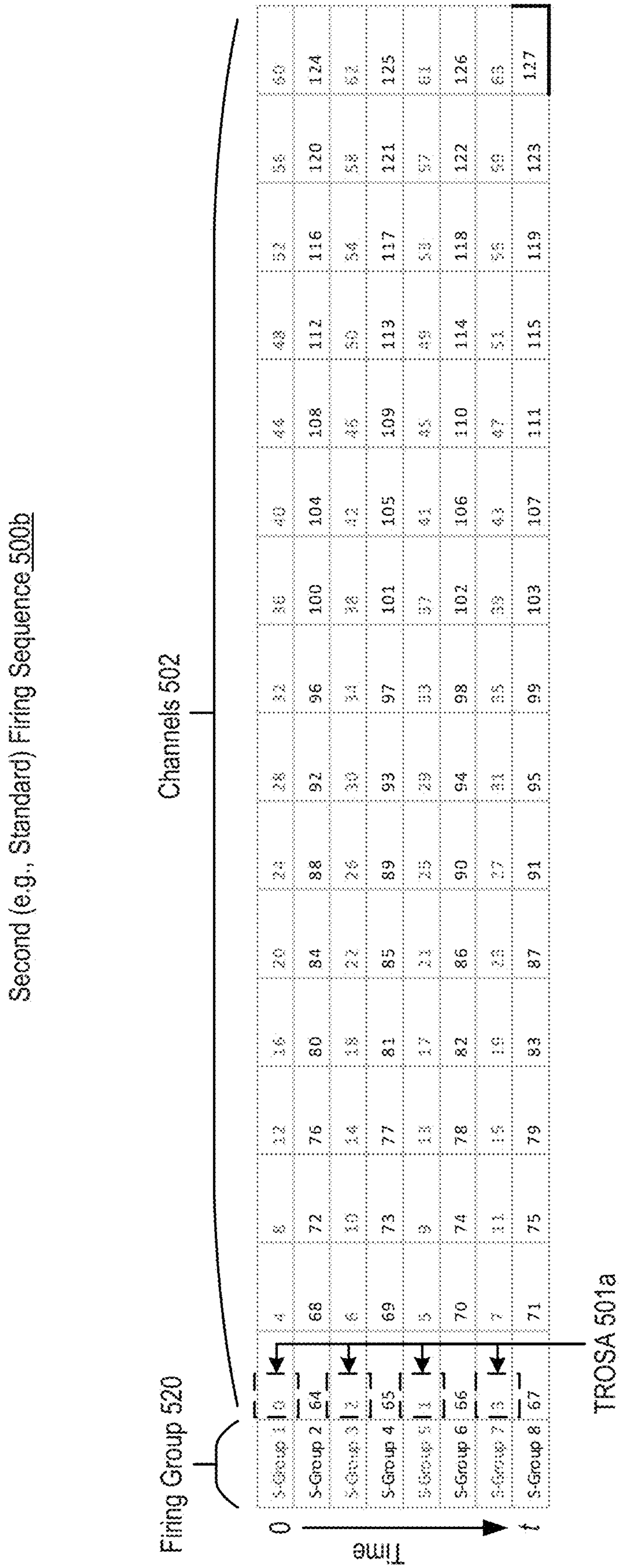
FIG. 5B shows an exemplary firing sequence for a lidar system operating in a second operating mode, in accordance with some embodiments.
Figure 5C:
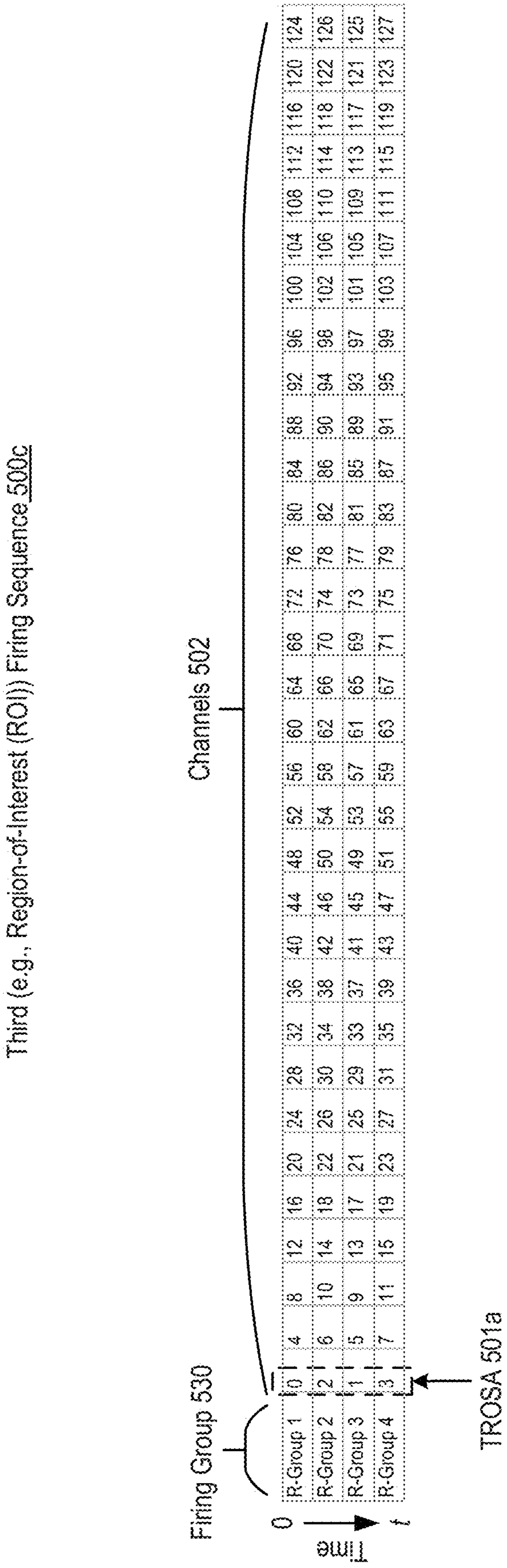
FIG. 5C shows an exemplary firing sequence for a lidar system operating in a third operating mode, in accordance with some embodiments.

In some embodiments, a firing group 510 (e.g., corresponding to any and/or all of the firing groups 510 described with respect to FIGS. 5A-5C) may include two or more sub-groups of channels. Each of a firing group's sub-groups may include a subset of the channels 502 assigned to the firing group 510, and each sub-group of channels may correspond to a "firing slot" (or "slot") within the firing group. The different sub-groups of a firing group may include a same or a different number of channels 502. As an example, the firing group "L-Group 1" may include two sub-groups (referred to as "Sub-group 1" and "Sub-group 2"), where Sub-group 1 includes channels 4, 12, 20, and 28 and where Sub-group 2 includes and/or corresponds to channels 36, 44, 52, and 60. As another example, the firing group "L-Group 1" may be include three sub-groups (referred to a "Sub-group 1", "Sub-group 2", and "Sub-group 3"), where Sub-group 1 includes and/or corresponds to channels 4, 12, and 20, and where Sub-group 2 includes and/or corresponds to channels 28, 36, and 44, and where Sub-group 3 includes and/or corresponds to channels 52 and 60.

In some cases, only channels 502 corresponding to different wings (e.g., wings 300) may be assigned to the same sub-group within a firing group 510. In other cases, channels 502 corresponding to different and/or same wings (e.g., wings 300) may be assigned to a sub-group within a firing group 510. For example, if the channels assigned to a firing group are divided among W wings of the lidar system and the number of channels in a sub-group of the firing group is S, and, where W<S, then it may not be possible to fully populate the sub-group with channels from different wings (e.g., with one channel from each wing). In some cases, channels 502 of a firing group that are included in the same wing may be assigned to the same sub-group of the firing group 510 if the channels 502 of the same wing are physically separated by a sufficient (e.g., threshold) distance and/or number of channels 502. As an example, channels 4 and 28, of the "L-Group 1" may be assigned to the sub-group based on (e.g., due to) the channels 4 and 28 being physically separated by at least a threshold distance and/or a threshold number of channels (e.g., 16 channels) as shown in FIG. 4A. In general, it can be desirable to avoid including two channels that are in close proximity (e.g., immediately adjacent to one another or within a single TROSA) in the same sub-group or firing group. This can improve measurement accuracy (e.g., avoid cross-talk among channels) and help control operating temperatures.

In some embodiments, channels 502 corresponding to the same sub-group may each scan point(s) in the FOV at approximately the same time, such that these channels 502 may emit (e.g., fire) optical signal(s) at approximately the same time. The time period allocated for the firing of a sub-group's channels may be referred to as the sub-group's "firing slot" or "slot." In some embodiments, the duration of a firing slot may be equal to (or slightly greater than) the time period during which the following occurs: the channels of a sub-group fire optical signals, those optical signals propagate to a window in the lidar system's housing, portions of those optical signals are reflected by the window, and these reflected portions of the optical signals propagate back to the receivers of the lidar system. The firing slots of the sub-groups within a firing group may be temporally adjacent to each other, such that channels 502 corresponding to first sub-group of the firing group 510 may fire optical signal(s) at a first time, the duration of a firing slot may elapse at a second time, and then the channels 502 corresponding to a second sub-group of the firing group 510 may fire optical signal(s) at the second time. As an example, for a firing group 510 including four sub-groups, the duration of a firing slot may be 10 ns, such that channels 502 corresponding to the first, second, third, and fourth sub-groups may begin scanning point(s) in the FOV starting at times 0 μs, 10 ns, 20 ns, and 30 ns, respectively. Staggering a firing group's firing slots in this manner may reduce and/or eliminate return signal cross-talk (or "dazzle") between physically adjacent and/or proximal channels 502. While sub-groups of firing groups 510 have been described with respect to the first (e.g., low-frequency) operating mode and FIG. 5A, sub-groups may be applied to the second (e.g., standard) and/or third (e.g., ROI) operating modes described below with respect to FIGS. 5B and 5C.

In some embodiments, each channel 502 of a lidar system may be configured to emit optical signal(s) according to the low frequency firing sequence 500*a*. As shown in FIG. 5A, each of the 128 channels (referred to as channels 0-127) included in the lidar system may be configured to emit optical signal(s) and detect return signal(s) during the low frequency firing sequence 500*a*. In some cases, channels 502 of particular TROSAs 501 may be configured to emit (e.g., fire) optical signals as a part of a respective firing group 510 of the low frequency firing sequence 500*a*. In some cases, at most one channel 502 of a particular TROSA 501 may emit optical signal(s) as a part of a particular firing group 510 (e.g., a firing group 510 may include no more than one channel from a given TROSA 501). In the low frequency firing sequence 500*a*, each channel 502 may be configured to emit optical signal(s) and listen for return signal(s) as a part of only one respective firing group 510. As an example and as shown in FIG. 5A, for the TROSA 501*a* that includes channels 0-3, each channel is configured to emit optical signal(s) and listen for return signal(s) as a part of only one respective firing group 510. In some cases, different channels 502 corresponding to a particular TROSA 501 may be configured to fire in every Nth firing group 510, where Nis any suitable number that can be configured based on the number of TROSAs 501 and channels 502 included in the lidar system and based on the number of firing groups 510 configured for the respective operating mode. For the low frequency operating mode and corresponding low frequency firing sequence 500*a*, different channels 502 of a TROSA 510 may be configured to emit optical signal(s) and listen for return signal(s) in every $4^{th}$ firing group 510 of the sixteen firing groups 510. Accordingly, as shown in FIG. 5A, channels 0, 1, 2, and 3 may be fired as a part of the respective firing groups 510 referred to as L-Groups 3, 7, 11, and 15 in the low frequency firing sequence 500*a*. In some cases, the TROSAs 501 of the lidar system may be configured such that four TROSAs corresponding to a respective wing are configured to emit optical signal(s) and listen for return signal(s) in a particular firing group 510. Accordingly, for the low frequency firing sequence 500*a*, channels 502 of only two wings of the four wings (and only eight TROSAs 501 of the 32 TROSAs 501) of the lidar system may be configured to scan the FOV as a part of a particular firing group 510. In one example, if the lidar system includes a total of N TROSAs, each firing group 510 can include N÷4 channels.

In some embodiments, the low frequency firing sequence 500*a* may occur for a duration t, where tis any suitable time period. The duration t may be configured based on the duration of listening periods for each firing group 510. As an example, for a listening period of approximately 3.1 μs, the low frequency firing sequence 500*a* may last for at least a duration of 16×3.1 μs=49.6 μs (e.g., t=49.6 μs). In some cases, at the conclusion of the low frequency firing sequence 500*a*, the lidar system may wait for a duration of time referred to as a "maintenance period." The maintenance period may be a duration configured to enable the lidar system to perform calibration and monitoring tasks while adhering to one or more operating factors including, for example, power consumption, thermal load, communication bandwidth, and/or eye safety. As an example, for the low frequency firing sequence 500*a*, the lidar system may be configured to wait for a maintenance period of 2 μs (or any other suitable duration) before the lidar system may repeat the low frequency firing sequence 500*a* (e.g., to continue scanning the FOV). For t of 49.6 μs and a maintenance period of 2 μs, the total duration of the low frequency firing sequence 500*a* may be 51.6 μs, resulting in a scanning frequency of approximately 19.4 kHz (e.g., each channel emits approximately 19,400 optical signals per second).

In some embodiments, as described herein, a rotational, directional, and/or any other suitable type of lidar system may be configured with a low frequency operating mode to emit optical signal(s) and detect and/or receive return signal(s) according to the low frequency firing sequence 500*a*. For a rotational lidar system (e.g., lidar system 270), channels 502 may emit (e.g., fire) optical signals according to the low frequency firing sequence 500*a* while the channels are stationary, rotating synchronously with respect to the scanning frequency (e.g., the system's scanning frequency matches or is an integer multiple of the frequency of the system's rotation) ("synchronously rotating"), and/or rotating asynchronously with respect to the scanning frequency (e.g., the system's scanning frequency does not match and is not an integer multiple of the frequency of the system's rotation) ("asynchronously rotating"). As an example of synchronous rotation, the lidar system may scan a FOV using a scanning frequency of 20 kHz and the low frequency firing sequence 500*a* while the channels 502 rotate at a frequency of approximately 10 Hz (approximately 10 revolutions per second), such that each channel tends to fire at the same, respective set of azimuths during each of the system's rotations. As an example of asynchronous rotation, the lidar system may scan a FOV using a scanning frequency of 20 kHz and the low frequency firing sequence 500*a* while the channels 502 rotate at a frequency of 6 Hz, such that each channel tends to fire at different azimuths during successive cycles of the system's rotation. In some embodiments, the system's rate of rotation may be user-configurable within fixed extremes (e.g., between 5 and 20 Hz).

In some embodiments, to scan a FOV, a lidar system may be configured to repeat the low frequency firing sequence 500*a* described herein. The lidar system may operate with a scanning frequency of approximately 19.4 kHz to aggregate one or more point measurements of the surrounding environment, which the lidar system may use to generate a 3D point cloud of the surrounding environment. The low frequency operating mode (and corresponding low frequency firing sequence 500*a*) may be used to scan a FOV in instances when lower point cloud resolution can be tolerated (e.g., relative to point cloud resolutions obtained with the second and third operating modes described below) and/or when reducing the power consumption and/or temperature of the lidar system is desirable. Such point cloud measurements may be provided to a data analysis module (e.g., data analysis and interpretation module 109) and/or to an external system (e.g., system 1100) coupled to the lidar system. With respect to point cloud resolution, at a rotation rate of 10 Hz (i.e., 3600 degrees/s), a lidar system configured with the low frequency operating mode (and the low frequency firing sequence 500*a*) may provide an azimuthal resolution of approximately 0.19 degrees based on a scanning frequency of 19.4 kHz.

Second Operating Mode

In some embodiments, a lidar system (e.g., lidar system 100, 202, 250, and/or 270) may be configured to operate in a second operating mode, where the lidar system may be a rotational, directional, or any other suitable type of lidar system. In the second operating mode, the lidar system may emit optical signals with a particular scanning frequency and/or in accordance with a particular optical signal emission (e.g., firing) sequence. For purposes of illustration, the second operating mode may be referred to herein as a "standard" operating mode, because the scanning frequencies used in the second operating mode (1) may be default scanning frequencies, and/or (2) may be greater than the scanning frequencies used in the first operating mode and less than the scanning frequencies used in a third operating mode, in the examples described herein. However, one of ordinary skill in the art will appreciate that any suitable scanning frequency may be used in the second operating mode.

As an example, with respect to the scanning frequency of the lidar system in a standard operating mode, the lidar system's transmitter(s) may be configured to emit optical signal(s) at a scanning frequency between 24 and 48 kHz (e.g., approximately 37.3 kHz) or any other suitable frequency). As described herein, with respect to an optical signal firing sequence, channels of the lidar system may be ordered and/or otherwise assigned to one or more groups (e.g., firing groups), such that the temporal attributes of the scan points (and the times at which the optical signals corresponding to the scan points are emitted and the associated return signals are detected) are determined by the ordering of the firing groups. As an example, for a lidar system that operates in a standard operating mode and is configured as described with respect to FIGS. 3, 4A, and 4B to include four wings, eight TROSAs per wing, and four channels per TROSA, the operating mode may include eight firing groups where one channel from each TROSA emits an optical signal in every second firing group (e.g., groups 1, 3, 5, and 7) as described further below with respect to FIG. 5B.

FIG. 5B shows an exemplary firing sequence 500*b* for a lidar system operating in a second (e.g., standard) operating mode. While the standard firing sequence 500*b* as shown in FIG. 5B corresponds to a lidar system configured to include four wings (e.g., wings 300), eight TROSAs (e.g., TROSAs 301) per wing, and four channels (e.g., channels 302) per TROSA resulting in 128 total channels (referred to as channels 0-127 in FIG. 5B), the standard firing sequence 500*b* may be adapted to a lidar system including any suitable number of wings, TROSAs, and/or channels. As described herein, the channels 502 (e.g., referred to as channels 0-127) shown by the standard firing sequence 500*b* may be included in one or more respective TROSAs 501, such that every four sequentially numbered channels 502 are included in the same respective TROSA 501 (starting with channel 0).

In some embodiments, the standard firing sequence 500*b* may include one or more firing groups 520, where channel(s) 502 corresponding to each firing group 520 are configured to simultaneously scan points within the lidar system's FOV. As an example, for the above-described lidar system configuration, the standard firing sequence 500*b* may include eight firing groups 520 (e.g., referred to as "S-Group" 1-8). In each firing group 520, one or more channels 502 may be configured to emit optical signal(s) (e.g., optical signals 110) via the respective channel's transmitter (e.g., transmitter 104) and to detect/receive one or more return signals (e.g., return signals 114) via the channel's receiver (e.g., receiver 106). As an example, for the above-described lidar system configuration, a firing group may include sixteen channels 502 configured to emit optical signal(s) (e.g., optical signals 110) via their transmitters (e.g., transmitters 104) and to detect/receive one or more return signals (e.g., return signals 114) via their receivers (e.g., receivers 106).

In some embodiments, as shown by the standard firing sequence 500*b* in FIG. 5B, a transmitter of each of the channels 502 corresponding to a particular firing group 520 may be configured to simultaneously emit optical signals beginning at approximately the same time. For example, the channels 0, 4, 8, 12, 16, 20, 24, 28, 32, 36, 40, 44, 48, 52, 56, and 60 of the firing group "S-Group 1" may each simultaneously emit optical signal(s) at approximately the same time. Receivers of each of the channels 502 corresponding to a particular firing group 520 may be configured to simultaneously listen for return signal(s) during approximately the same listening period. For example, the channels 0, 4, 8, 12, 16, 20, 24, 28, 32, 36, 40, 44, 48, 52, 56, and 60 of the firing group "S-Group 1" may be configured to simultaneously listen for return signal(s) beginning at approximately the same time. As described herein, receivers of each of the channels 502 corresponding to a particular firing group 520 may listen for return signals during a "listening period," where the listening period begins approximately before, with, or after the emission of the optical signal(s) by the channels 502 of the respective firing group 520. A listening period for the standard firing sequence 500*b* may be of any suitable duration. As an example, for the standard firing sequence 500*b* corresponding to the standard operating mode, the listening period may be configured to be approximately 3 μs (e.g., 3.2 μs) or any other suitable duration.

In some embodiments, the listening periods of successive firing groups 520 may be temporally adjacent to each other, with little or no buffer period between successive listening periods. As an example, a first listening period corresponding to channels 502 of the firing group "S-Group 1" may terminate and a second listening period of the channels 502 of the firing group "S-Group 2" may begin at approximately the same time.

In some embodiments, each channel 502 of a lidar system may be configured to emit optical signal(s) according to the standard firing sequence 500*b*. As shown in FIG. 5B, each of the 128 channels (referred to as channels 0-127) included in the lidar system may be configured to emit optical signal(s) and detect return signal(s) during the standard firing sequence 500*b*. In some cases, channels 502 of particular TROSAs 501 may be configured to emit (e.g., fire) optical signals as a part of a respective firing group 520 of the standard firing sequence 500*b*. In some cases, at most one channel 502 corresponding to a particular TROSA 501 may emit optical signal(s) as a part of a particular firing group 520 (e.g., a firing group 520 may include no more than one channel 502 in a particular TROSA 501). In the standard firing sequence 500*b*, each channel 502 may be configured to emit optical signal(s) and listen for return signal(s) as a part of only one respective firing group 520. As an example and as shown in FIG. 5B, for the TROSA 501*a* that includes channels 0-3, each channel is configured to emit optical signal(s) and listen for return signal(s) as a part of only one respective firing group 520. In some cases, different channels 502 corresponding to a particular TROSA 501 may be configured to fire in every Nth firing group 520, where Nis any suitable number that can be configured based on the number of TROSAs 501 and channels 502 included in the lidar system and based on the number of firing groups 520 configured for the respective operating mode. For the standard operating mode and corresponding standard firing sequence 500*b*, different channels 502 of a TROSA 520 may be configured to emit optical signal(s) and listen for return signal(s) in every $2^{nd}$ firing group 520 of the eight firing groups 520. Accordingly, as shown in FIG. 5B, channels 0, 2, 1, and 3 may be fired as a part of the respective firing groups 520 referred to as S-Groups 1, 3, 5, and 7 in the standard firing sequence 500*b*. In some cases, the TROSAs 501 of the lidar system may be configured such that four TROSAs corresponding to a respective wing are configured to emit optical signal(s) and detect for return signal(s) in a particular firing group 520. Accordingly, for the standard firing sequence 500*b*, channels 502 from each of the four wings (and from 16 of the 32 TROSAs 501) may be configured to scan the FOV as a part of a particular firing group 520. In one example, if the lidar system includes a total of N TROSAs, each firing group 520 can include N÷2 channels.

In some embodiments, the standard firing sequence 500*b* may have a duration t, where t is any suitable time period. The duration t may be configured based on the duration of listening periods for each firing group 520. As an example, for a listening period of approximately 3.1 μs, the standard firing sequence 500*b* may last for at least a duration of 8×3.1 μs=24.8 μs (e.g., t=24.8 μs). In some cases, at the conclusion of the standard firing sequence 500*b*, the lidar system may wait for a duration of time referred to as a maintenance period as described herein. As an example, for the standard firing sequence 500*b*, the lidar system may be configured to wait for a maintenance period of 2 μs (or any other suitable duration) before the lidar system may repeat the standard firing sequence 500*b* (e.g., to continue scanning the FOV). For t of 24.8 μs and a maintenance period of 2 μs, the complete duration of the standard firing sequence 500*b* may be 26.8 μs, resulting in a scanning frequency of approximately 37.3 kHz (e.g., each channel emits approximately 37,300 optical signals per second).

In some embodiments, as described herein, a rotational, directional, and/or any other suitable type of lidar system may be configured with a standard operating mode to emit optical signal(s) and detect and/or receive return signal(s) according to the standard firing sequence 500*b*. For a rotational lidar system (e.g., lidar system 270), channels 502 may emit (e.g., fire) optical signals according to the standard firing sequence 500*b* while the channels are synchronously rotating. As an example, the lidar system may scan a FOV using the standard firing sequence 500*b* while the channels 502 synchronously rotate at a frequency of approximately 10 Hz, such that the channels rotate at approximately 10 revolutions per second. A lidar system operating in the standard operating mode may scan the FOV synchronously with the rotation (e.g., change in orientation ω as described with respect to FIG. 2C) of the lidar channels such that "pixel" measurements are detected and/or received at the same azimuth angle (e.g., between 0-360 degrees) during rotation of the lidar channels.

In some embodiments, to scan a FOV, a lidar system configured with the standard operating mode may be configured to repeat the standard firing sequence 500*b* as described herein. The lidar system may operate with a scanning frequency of approximately 37.3 kHz to aggregate one or more point measurements of the surrounding environment, which the lidar system may use to generate a 3D point cloud of the surrounding environment. The standard operating mode (and corresponding standard firing sequence 500*b*) may be used to scan a FOV in instances where a higher point cloud resolution than the resolution provided by the low frequency operating mode is preferred and/or where the lidar system is restricted from operating in a third operating mode (e.g., due to power consumption, data transfer, and/or thermal load factors). As an example, if the lidar system is configured with a third operating mode and either a temperature of the lidar system or a power consumption by the lidar system exceeds a threshold, the lidar system may revert to the standard operating mode. Such point cloud measurements may be provided to a data analysis module (e.g., data analysis and interpretation module 109) and/or to an external system (e.g., system 1100) coupled to the lidar system. With respect to point cloud resolution, at a rotation rate of 10 Hz (i.e., 3600 degrees/s), a lidar system configured with the standard operating mode (and the standard firing sequence 500*b*) may provide an azimuthal resolution of approximately 0.096 degrees based on a scanning frequency of 37.3 kHz.

In some embodiments, the standard operating mode and standard firing sequence 500*b* may be configured as the operating mode for a lidar system for only a subset of an operating period (e.g., a time period when the lidar system is active and aggregating environmental data) of the lidar system. For a rotational lidar system, the standard operating mode and standard firing sequence 500*b* may be configured only for a subset of an azimuthal FOV (e.g., from 0-360 degrees). The standard operating mode may be limited to a subset of the lidar system's azimuthal FOV based on operating factors including power consumption requirements, thermal load requirements, communication bandwidth (e.g., to transfer return signal data for processing), etc. In some cases, for a rotational lidar system, the standard operating mode may be configured for one or more subsets of the lidar system's azimuthal FOV. As an example, for a rotational lidar system (e.g., rotating at 10 Hz), the lidar system may only be configured with the standard operating mode and standard firing sequence 500*c* for at most 180 degrees of the 360 degree azimuthal FOV. The 180 degree subset of the 360 degree azimuthal FOV may be divided into up to J azimuthal areas, wherein J is any suitable positive integer (e.g., J=2) (e.g., two 90 degree scanning regions, one 120 degree scanning region and one 60 degree scanning region, etc.) of the same azimuthal area or different azimuthal areas.

Third Operating Mode

In some embodiments, a lidar system (e.g., lidar system 100, 202, 250, and/or 270) may be configured to operate in a third operating mode, where the lidar system may be a rotational, directional, or any other suitable type of lidar system. In the third operating mode, the lidar system may emit optical signals with a particular scanning frequency and/or in accordance with a particular optical signal emission (e.g., firing) sequence. For purposes of illustration, the third operating mode may be referred to herein as a "region-of-interest" (ROI) operating mode or "high frequency" operating mode, because the scanning frequencies used in the third operating mode may be greater than the scanning frequencies used in the first and second operating modes in the examples described herein, or because the third operating mode may be used to scan regions-of-interest in the examples described herein. However, one of ordinary skill in the art will appreciate that any suitable scanning frequency may be used in the third operating mode.

As an example, with respect to the scanning frequency of the lidar system in the ROI operating mode, the lidar system's transmitter(s) may be configured to emit optical signal(s) at a scanning frequency between 48 and 96 kHz (e.g., approximately 72.4 kHz or any other suitable frequency). As described herein, with respect to an optical signal firing sequence, channels of the lidar system may be ordered and/or otherwise assigned to one or more groups (e.g., firing groups), such that the temporal attributes of the scan points (and the times at which the optical signals corresponding to the scan points are emitted and the associated return signals are detected) are determined by the ordering of the firing groups. As an example, for a lidar system that operates in an ROI operating mode and is configured as described with respect to FIGS. 3, 4A, and 4B to include four wings, eight TROSAs per wing, and four channels per TROSA, the operating mode may include four firing groups where one respective channel from each TROSA emits an optical signal in every firing group (e.g., groups 1, 2, 3, and 4) as described further below with respect to FIG. 5C.

FIG. 5C shows an exemplary firing sequence 500*c* for a lidar system operating in a third (e.g., ROI) operating mode. While the depicted ROI firing sequence 500*c* corresponds to a lidar system having four wings (e.g., wings 300), eight TROSAs (e.g., TROSAs 301) per wing, and four channels (e.g., channels 302) per TROSA, resulting in 128 total channels (referred to as channels 0-127 in FIG. 5C), the ROI firing sequence 500*c* may be adapted to a lidar system including any suitable number of wings, TROSAs, and/or channels. As described herein, the channels 502 shown in the ROI firing sequence 500*c* may be included in one or more respective TROSAs 501, with each TROSA 501 including a respective set of four sequentially numbered channels 502 (e.g., 0, 1, 2, 3).

In some embodiments, the ROI firing sequence 500*c* may include one or more firing groups 530, where channel(s) 502 corresponding to each firing group 530 are configured to simultaneously scan points within the lidar system's FOV. As an example, for the above-described lidar system configuration, the ROI firing sequence 500*c* may include four firing groups 530 (e.g., referred to as "R-Group" 1-4). In each firing group 530, one or more channels 502 may be configured to emit optical signal(s) (e.g., optical signals 110) via the respective channel's transmitter (e.g., transmitter 104) and to detect/receive one or more return signals (e.g., return signals 114) via the channel's receiver (e.g., receiver 106). As an example, for the above-described lidar system configuration, a firing group may include 32 channels 502 configured to emit optical signal(s) (e.g., optical signals 110) via their transmitters (e.g., transmitters 104) and to detect/receive one or more return signals (e.g., return signals 114) via their receivers (e.g., receivers 106).

In some embodiments, as shown by the ROI firing sequence 500*c* in FIG. 5C, the transmitters of each of the channels 502 corresponding to a particular firing group 530 may be configured to simultaneously emit optical signals beginning at approximately the same time. For example, the channels 502 of the firing group "R-Group 1" may each simultaneously emit optical signal(s) at approximately the same time. Receivers of each of the channels 502 corresponding to a particular firing group 530 may be configured to simultaneously listen for return signal(s) during approximately the same listening period. For example, the channels 502 of the firing group "R-Group 1" may be configured to simultaneously listen for return signal(s) beginning at approximately the same time. As described herein, receivers of each of the channels 502 corresponding to a particular firing group 530 may listen for return signals during a "listening period," where the listening period begins approximately before, with, or after the emission of the optical signal(s) by the channels 502 of the respective firing group 530. A listening period for the ROI firing sequence 500*c* may be of any suitable duration. As an example, for the ROI firing sequence 500*c* corresponding to the ROI operating mode, the listening period may be configured to be approximately 3 μs (e.g., 3.2 μs) or any other suitable duration.

In some embodiments, the listening periods of successive firing groups 530 may be temporally adjacent to each other, with little or no buffer period between successive listening periods. As an example, a first listening period corresponding to channels 502 of the firing group "R-Group 1" may terminate and a second listening period of the channels 502 of the firing group "R-Group 2" may begin at approximately the same time.

In some embodiments, each channel 502 of a lidar system may be configured to emit optical signal(s) according to the ROI firing sequence 500*c*. As shown in FIG. 5C, each of the 128 channels (referred to as channels 0-127) included in the lidar system may be configured to emit optical signal(s) and listen for return signal(s) during the ROI firing sequence 500*c*. In some cases, channels 502 of particular TROSAs 501 may be configured to emit (e.g., fire) optical signals as a part of a respective firing group 530 of the ROI firing sequence 500*c*. In some cases, at most one channel 502 corresponding to a particular TROSA 501 may emit optical signal(s) as a part of a particular firing group 530. In the ROI firing sequence 500*c*, each channel 502 may be configured to emit optical signal(s) and listen for return signal(s) as a part of only one respective firing group 530. As an example and as shown in FIG. 5C, for the TROSA 501*a* that includes channels 0-3, each channel is configured to emit optical signal(s) and listen for return signal(s) as a part of only one respective firing group 530. In some cases, different channels 502 corresponding to a particular TROSA 501 may be configured to fire in every Nth firing group 530, where Nis any suitable number that can be configured based on the number of TROSAs 501 and channels 502 included in the lidar system and based on the number of firing groups 530 configured for the respective operating mode. For the ROI operating mode and corresponding ROI firing sequence 500*c*, each channel 502 of a TROSA 530 may be configured to emit optical signal(s) and listen for return signal(s) in a respective firing group 530 of the four firing groups 530. Accordingly, as shown in FIG. 5C, channels 0, 2, 1, and 3 may be fired as a part of the respective firing groups 530 referred to as R-Groups 1, 2, 3, and 4 in the ROI firing sequence 500*c*. In some cases, the TROSAs 501 of the lidar system may be configured such that channels 502 of each of the eight TROSAs corresponding to a respective wing are configured to emit optical signal(s) and listen for return signal(s) in a particular firing group 530. Accordingly, for the ROI firing sequence 500*c*, channels 502 from each of the four wings (and each of the 32 TROSAs 501) of the lidar system may be configured to scan the FOV as a part of a particular firing group 530. In one example, if the lidar system includes a total of N TROSAs, each firing group 520 can include N channels.

In some embodiments, the ROI firing sequence 500*c* may occur for a duration 1, where t is any suitable time period. The duration t may be configured based on the duration of listening periods for each firing group 530. As an example, for a listening period of approximately 3.1 μs, the ROI firing sequence 500*c* may last for at least a duration of 4×3.1 μs=12.4 μs (e.g., t=12.4 μs). In some cases, at the conclusion of the ROI firing sequence 500*c*, the lidar system may wait for a duration of time referred to as a maintenance period as described herein. As an example, for the ROI firing sequence 500*c*, the lidar system may be configured to wait for a maintenance period of 2 μs (or any other suitable duration) before repeating the ROI firing sequence 500*c* (e.g., to continue scanning the FOV). For 1 of 12.4 μs and a maintenance period of 2 μs, the complete duration of the ROI firing sequence 500*c* may be 14.4 μs, resulting in a scanning frequency of approximately 69.4 kHz.

In some embodiments, as described herein, a rotational, directional, and/or any other suitable type of lidar system may be configured with an ROI operating mode to emit optical signal(s) and detect and/or receive return signal(s) according to the ROI firing sequence 500*c*. For a rotational lidar system (e.g., lidar system 270), channels 502 may emit (e.g., fire) optical signals according to the ROI firing sequence 500*c* while the channels are synchronously rotating. As an example, the lidar system may scan a FOV using the ROI firing sequence 500*c* while the channels 502 synchronously rotate at a frequency of approximately 10 Hz, such that the channels rotate at approximately 10 revolutions per second. A lidar system operating in the ROI operating mode may scan the FOV synchronously with the rotation (e.g., change in orientation ω as described with respect to FIG. 2C) of the lidar channels such that "pixel" measurements are detected and/or received at the same azimuth angle (e.g., between 0-360 degrees) during rotation of the lidar channels.

In some embodiments, to scan a FOV, a lidar system operating in the ROI operating mode may be configured to repeat the ROI firing sequence 500*c* as described herein. The lidar system may operate with a scanning frequency of approximately 69.4 kHz to aggregate one or more point measurements of the surrounding environment, which the lidar system may use to generate a 3D point cloud of the surrounding environment. The ROI operating mode (and corresponding ROI firing sequence 500*c*) may be used to scan a FOV in instances where a higher point cloud resolution than the resolution provided by the standard and low frequency operating modes is preferred. Such point cloud measurements may be provided to a data analysis module (e.g., data analysis and interpretation module 109) and/or to an external system (e.g., system 1100) coupled to the lidar system. With respect to point cloud resolution, at a rotation rate of 10 Hz (i.e., 3600 degrees per second), a lidar system configured with the ROI operating mode (and the ROI firing sequence 500*c*) may provide an azimuthal resolution of approximately 0.052 degrees (e.g., one point cloud datapoint every 0.052 degrees) based on a scanning frequency of 69.4 kHz.

In some embodiments, the ROI operating mode and ROI firing sequence 500*c* may be configured as the operating mode for a lidar system for only a subset of an operating period (e.g., a time period when the lidar system is active and aggregating environmental data) of the lidar system. For a rotational lidar system, the ROI operating mode and ROI firing sequence 500*c* may be used only for a subset of an azimuthal FOV (e.g., from 0-360 degrees). The ROI operating mode may be limited to a subset of the lidar system's azimuthal FOV based on operating factors including, for example, power consumption requirements, thermal load requirements, communication bandwidth (e.g., to transfer return signal data for processing), eye safety requirements, etc. In some cases, for a rotational lidar system, the ROI operating mode may be used for one or more subsets of the lidar system's azimuthal FOV. As an example, for a rotational lidar system (e.g., rotating at 10 Hz), the lidar system may use the ROI operating mode and ROI firing sequence 500*c* for at most 20 degrees of the 360 degree azimuthal FOV. The 20 degree subset of the 360 degree azimuthal FOV may be divided up into K azimuthal areas, where K is any suitable positive integer (e.g., K=4) (e.g., four 5 degree scanning regions, two 10 degree scanning regions, one 15 degree scanning region and one 5 degree scanning region, etc.) of the same azimuthal area or different azimuthal areas.

In some embodiments, the ROI operating mode and ROI firing sequence 500*c* may be configured as the operating mode of a lidar system to scan one or more ROIs. ROIs may include regions in the lidar system's FOV where it may be preferable to obtain high resolution point cloud measurements (e.g., relative to the low frequency and standard operating modes). As an example, for a lidar system included in a vehicle (e.g., autonomous vehicle), the ROI operating mode may be used to scan a direction in which the vehicle is moving. The ROI operating mode may dynamically adapt to scan the FOV in the direction of the vehicle's motion by adaptively switching between the ROI operating mode and other operating modes as described further below.

Adaptive Scanning for a Lidar System

In some embodiments, as described herein, a lidar system may be configured to operate in a particular operating mode whenever the lidar system is operating, or to operate in different operating modes at different times. Operating modes may include low frequency, standard, and ROI operating modes as described with respect to FIGS. 5A, 5B, and 5C, where the lidar system may be a rotational, directional, or any other suitable type of lidar system. During operation of the lidar system, the lidar system may operate according to one or more operating modes. In some cases, a lidar system configured with two or more operating modes may switch between operating modes as the lidar system scans a FOV to aggregate return signal data and detect objects and/or surfaces in the surrounding environment. The lidar system may adaptively switch between operating modes to aggregate higher resolution point cloud measurements for particular regions (e.g., ROIs) in the FOV and to conserve power when scanning regions in the FOV where higher resolution point cloud measurements are of less value. In some cases, one or more ROIs may be configured for the lidar system, such that the lidar system operates according to the ROI operating mode and ROI firing sequence 500*c* when scanning the one or more ROIs. As an example, for a rotational lidar system, a subset of an azimuthal scanning region may be configured as an ROI, such that the lidar system scans the azimuthal scanning region corresponding to the ROI using the ROI operating mode and scans the azimuthal scanning regions that are external to the ROI using the standard and/or low frequency operating modes. As another example, for a directional lidar system, a subset of an operating period may be configured for an ROI, such that the lidar system scans the FOV during the subset of the operating period corresponding to the ROI using the ROI operating mode and scans a second subset of the operating period that does not correspond to the ROI using the standard and/or low frequency operating modes.

Figure 6A:
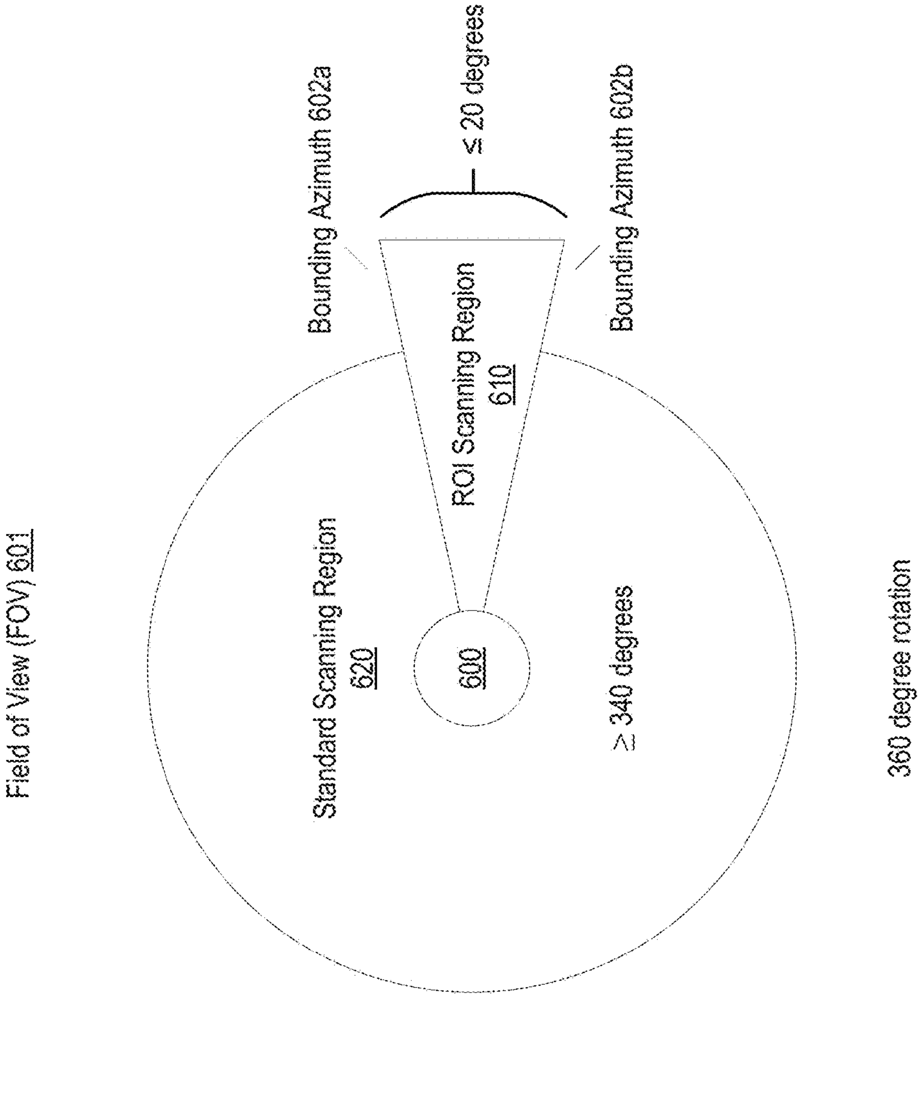
FIG. 6A shows exemplary adaptive scanning for a lidar system, in accordance with some embodiments.
Figure 6B:
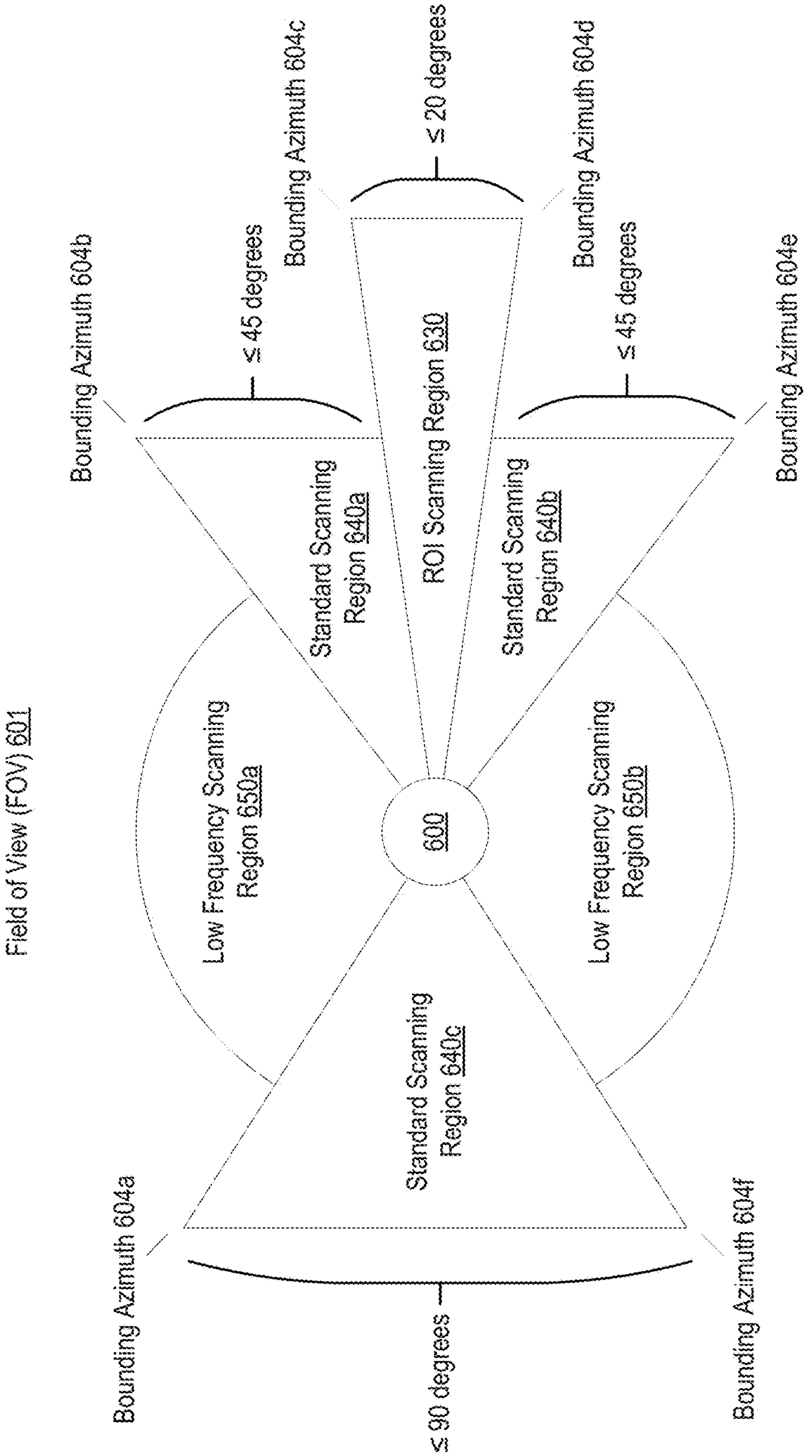
FIG. 6B shows exemplary adaptive scanning for a lidar system, in accordance with some embodiments.

FIGS. 6A and 6B show exemplary adaptive scanning for a lidar system 600. FIG. 6A shows adaptive scanning of a FOV 601 by a lidar system 600 (e.g., rotational lidar system 270) configured with a standard operating mode and an ROI operating mode. As shown in FIG. 6A, the lidar system 600 is configured to rotate and scan a 360 degree azimuthal FOV 601. One or more bounding azimuths 602 may define the scanning regions within the FOV 601, where a particular scanning region may begin at a first bounding azimuth and end at a second bounding azimuth. Each of the bounding azimuths may be measured with respect to a reference direction in a spherical coordinate system that is centered at the lidar system. While FIGS. 6A and 6B are described with respect to a lidar system configured to rotate and scan a 360 degree azimuthal FOV 601 (e.g., a rotational lidar system), any other suitable lidar system (e.g., a directional lidar system) may scan a FOV based on one or more scanning regions that are each bounded by a pair of bounding azimuths 602. A current position of the FOV 601 that is scanned by the lidar system may be a current scanning azimuth, where the current scanning azimuth is included in a respective azimuthal scanning region of the one or more azimuthal scanning regions. As described with respect to FIGS. 2B and 2C, the current scanning azimuth may correspond to the angular (azimuthal) orientation ω of the lidar system's 600 transmitter(s) with respect to the system's central axis (e.g., central axis 274) or the angular orientation ψ of the transmitter's movable mirror (e.g., movable mirror 256) (if present) with respect to the mirror's axis of oscillation (or rotation). As also described herein, a current scanning azimuth may be measured with respect to a reference direction in a spherical coordinate system that is centered at the lidar system 600. With respect to FIGS. 6A and 6B, the current scanning azimuth may correspond to the angular (azimuthal) orientation ω of the lidar system's 600 transmitter(s) with respect to the system's central axis (e.g., central axis 274), such that the angular (azimuthal) orientation ω of the lidar system's 600 transmitter(s) correspond(s) to a particular scanning region (e.g., of the scanning regions 610, 620, 630, 640, and 650 described with respect to FIGS. 6A and 6B) within the 360 degree FOV 601. In some cases, a pair of adjacent scanning regions may share a bounding azimuth, such the shared bounding azimuth defines the end of a first azimuthal scanning region and the start of a second azimuthal scanning region.

In some embodiments, a scan of one or more regions in the FOV 601 may be referred to as a "sweep" of the FOV 601 by the lidar system 600, where the sweep corresponds to scanning across the full azimuthal extent of the FOV 601. As described herein, the full azimuthal extent of the FOV may correspond to all regions of the FOV that may be scanned by the lidar system 600. The lidar system 600 may sweep the FOV 601 according to one or more scanning regions that can each correspond to an operating mode of one or more operating modes (e.g., ROI, standard, and low-frequency operating modes). A scanning mechanism (e.g., movable mirror 256, motor, etc.) may cause the channels of the lidar system to change position (e.g., angular (azimuthal) orientation ω and/or angular orientation ψ as described above) to sweep the FOV 601, enabling the lidar system 600 to generate one or more point cloud measurements.

The ROI scanning region 610 may correspond to an azimuthal scanning region where the lidar system operates in an ROI operating mode and scans using an ROI firing sequence (e.g., the ROI firing sequence 500*c*, using one or more repetitions). As shown in FIG. 6A, the ROI scanning region 610 is bounded by the bounding azimuths 602*a* and 602*b* (e.g., rotating clockwise from bounding azimuth 602*a* to bounding azimuth 602*b*). The ROI scanning region 610 of FIG. 6A may correspond to a particular ROI for the lidar system 600, such that higher resolution point cloud measurements are preferred (e.g., relative to the point cloud resolution in the standard scanning region 620). As described herein, the ROI scanning region 610 may be limited to be less than or equal to 20 degrees of the 360 degree azimuthal scanning region and may be divided up into K (e.g., K=4) azimuthal scanning sub-regions (e.g., that are each bounded by a pair of bounding azimuths). While FIG. 6A shows the ROI scanning region 610 as being a single scanning region of less than or equal to 20 degrees, the lidar system 600 may be configured with the ROI operating mode and ROI firing sequence 500*c* for any suitable scanning region and for any suitable number of scanning sub-regions.

In some embodiments, the standard scanning region 620 of FIG. 6A may correspond to an azimuthal scanning region where the lidar system is configured to operate in a standard operating mode and scan using the standard firing sequence 500*b* (e.g., using one or more repetitions). As shown in FIG. 6A, the standard scanning region 620 is bounded by the bounding azimuths 602*b* and 602*a* (e.g., rotating clockwise from bounding azimuth 602*b* to bounding azimuth 602*a*). While FIG. 6A shows the standard scanning region 620 as being greater than or equal to 340 degrees, a lidar system 600 may operate with the standard operating mode and standard firing sequence 500*b* for any suitable scanning region and for any suitable number of scanning sub-regions.

The lidar system 600 may adaptively switch between the ROI operating mode and standard operating mode as shown in FIG. 6A. As an example, if the ROI scanning region 610 corresponds to an azimuthal scanning region between 0 to 20 degrees (e.g., bounded by bounding azimuths 602*a* and 602*b*) and the standard scanning region 620 corresponds to an azimuthal scanning region between 20 to 360 degrees (e.g., bounded by bounding azimuths 602*b* and 602*a*), the lidar system may switch from the ROI operating mode to the standard operating mode when rotating past a 20 degree azimuthal threshold (e.g., corresponding to the bounding azimuth 602*b*) and may switch from the standard operating mode to the ROI operating mode when rotating past a 360 degree (e.g., equivalent to 0 degree) azimuthal threshold (e.g., corresponding to the bounding azimuth 602*a*).

In some embodiments, the lidar system 600 may be configured to change the directions and/or the azimuthal position(s) corresponding to the ROI scanning region 610 (and/or the standard scanning region 620). The lidar system 600 may adaptively change the direction and/or the azimuthal position(s) scanned by the ROI scanning region 610 such that the ROI scanning region 610 is directed towards one or more ROIs. As an example, if the lidar system 600 is included in a kinematic apparatus such as a vehicle and the ROI scanning region 610 is positioned towards the path and/or direction of the vehicle, the ROI scanning region 610 may be reconfigured (e.g., periodically or continuously reconfigured) to be directed toward the path of the vehicle (e.g., during turns, merging, unprotected turns, backing up, parking, etc.). By adaptively changing the direction and/or the azimuthal position(s) of the ROI scanning region 610 (e.g., based on changing the bounding azimuths 602*a* and 602*b*), the lidar system 600 may obtain high resolution point cloud data for regions where high resolution is desired (e.g., along a projected path of a vehicle). In some cases, the lidar system 600 may adaptively change the direction and/or the azimuthal position(s) scanned by the standard scanning region 620 such that the standard scanning region 620 is directed to any and/or all of the azimuthal scanning regions that do not correspond to the ROI scanning region 610. By adaptively changing the direction and/or the azimuthal position(s) of the standard scanning region 620, the lidar system 600 may obtain lower or standard resolution point cloud data for regions where such resolution is desired or tolerable (e.g., outside of the projected path of the vehicle, such as behind or to a side of the vehicle). Such adaptive changes can allow the lidar system 600 to consistently and/or continuously aggregate point cloud measurements for the FOV 601.

FIG. 6B shows adaptive scanning of a FOV 601 by a lidar system 600 (e.g., rotational lidar system 270) configured with a standard operating mode, an ROI operating mode, and a low frequency operating mode. As shown in FIG. 6B, the lidar system 600 is configured to rotate and scan a 360 degree azimuthal FOV 601. The ROI scanning region 630 may correspond to azimuthal scanning regions where the lidar system operates in an ROI operating mode and scans the FOV 601 using an ROI firing sequence (e.g., the ROI firing sequence 500*c*, using one or more repetitions). As shown in FIG. 6B, the ROI scanning region is bounded by the bounding azimuths 604*c* and 604*d*. The ROI scanning region 630 of FIG. 6B may correspond to a particular ROI for the lidar system 600, such that higher resolution point cloud measurements are preferred in the ROI scanning region 630 (e.g., relative to the point cloud resolution in the standard scanning region 620 and/or the low frequency scanning region 630). As described herein, the ROI scanning region 630 may be limited to be less than or equal to 20 degrees of the 360 degree azimuthal scanning region and may be divided up into K (e.g., K=4) azimuthal scanning sub-regions. While FIG. 6B shows the ROI scanning region 630 as being a single scanning region of less than or equal to 20 degrees (e.g., bounded by the bounding azimuths 604*c* and 604*d*), a lidar system 600 may be configured with the ROI operating mode (and ROI firing sequence 500*c*) for any suitable scanning region and for any suitable number of scanning sub-regions. For example, the ROI scanning region 630 could be divided into a pair of ROI scanning sub-regions 630 of 10 degrees each (e.g., that are each bounded by bounding azimuths 604).

In some embodiments, the standard scanning regions 640 of FIG. 6B may correspond to three azimuthal scanning sub-regions where the lidar system operates in a standard operating mode and scans the FOV 601 using a standard firing sequence (e.g., the standard firing sequence 500*b*, using one or more repetitions). While FIG. 6B shows two of the standard scanning sub-regions (640*a*, 640*b*) as each being less than or equal to 45 degrees and the third standard scanning sub-region 640*c* as being less than or equal to 90 degrees, a lidar system 600 may be configured with the standard operating mode (and standard firing sequence 500*b*) for any suitable scanning region and for any suitable number of scanning sub-regions. The standard scanning sub-region 640*a* may be bounded by the bounding azimuths 604*b* and 604*c*. The standard scanning sub-region 640*b* may be bounded by the bounding azimuths 604*d* and 604*e*. The standard scanning sub-region 640*c* may be bounded by the bounding azimuths 604*f* and 604*a*.

In some embodiments, the low frequency scanning regions (650*a*, 650*b*) of FIG. 6B may correspond to two azimuthal scanning regions where the lidar system operates in a low frequency operating mode and scans the FOV 601 using a low frequency firing sequence (e.g., the low frequency firing sequence 500*a*). While FIG. 6B shows the combination of the low frequency scanning sub-regions (650*a*, 650*b*) as being greater than or equal to about 160 degrees, a lidar system 600 may be configured with the low frequency operating mode and low frequency firing sequence 500*c* for any suitable scanning region and for any suitable number of scanning sub-regions. The low frequency scanning sub-region 650*a* may be bounded by the bounding azimuths 604*a* and 604*b*. The low frequency scanning sub-region 650*b* may be bounded by the bounding azimuths 604*e* and 604*f*.

The lidar system 600 may adaptively switch between the ROI operating mode, the standard operating mode, and low frequency operating mode as shown in FIG. 6B. As an example, if the ROI scanning region 630 corresponds to an azimuthal scanning region between 0 to 20 degrees (e.g., bounded by the bounding azimuths 604*c* and 604*d*), the standard scanning region 640 corresponds to azimuthal scanning sub-regions between 20 to 65 degrees, 145 to 235 degrees, and 315 to 360 degrees (e.g., bounded by the respective bounding azimuths 604 described above), and the low frequency scanning region 650 corresponds to azimuthal scanning sub-regions between 65 to 145 degrees and 235 to 315 degrees (e.g., bounded by the respective bounding azimuths 604 described above), the lidar system may switch from the ROI operating mode to the standard operating mode when rotating past a 20 degree azimuthal threshold (e.g., corresponding to the bounding azimuth 604*d*), switch from the standard operating mode to the low frequency operating mode when rotating past a 65 degree azimuthal threshold (e.g., corresponding to the bounding azimuth 604*e*), switch from the low frequency operating mode to the standard operating mode when rotating past a 145 degree azimuthal threshold (e.g., corresponding to the bounding azimuth 604*f*), switch from the standard operating mode to the low frequency operating mode when rotating past a 235 degree azimuthal threshold (e.g., corresponding to the bounding azimuth 604*a*), switch from the low frequency operating mode to the standard operating mode when rotating past a 315 degree azimuthal threshold (e.g., corresponding to the bounding azimuth 604*b*), and switch from the standard operating mode to the ROI operating mode when rotating past a 360 degree (0 degree) azimuthal threshold (e.g., corresponding to the bounding azimuth 604*c*).

In some embodiments, as described with respect to FIG. 6A, the lidar system 600 may be configured to change the directions and/or the azimuthal position(s) corresponding to the ROI scanning region 630 (or ROI scanning sub-regions), the standard scanning region 640 (or standard scanning sub-regions), and/or other low frequency scanning region 650 (or low frequency scanning sub-regions). The lidar system 600 may adaptively change the direction and/or the azimuthal position(s) scanned by the ROI scanning region 630 such that the ROI scanning region 630 is directed towards one or more azimuthal directions. By adaptively changing the direction and/or the azimuthal position(s) of the ROI scanning region 630, the lidar system 600 may obtain high resolution point cloud data for regions where high resolution is desired (e.g., along a projected path of a vehicle). In some cases, the lidar system 600 may adaptively change the direction and/or the azimuthal position(s) scanned by the standard scanning region 640 and/or the low frequency scanning region 650 such that the combination of the standard scanning region 640 and the low frequency scanning region 650 is directed to any and/or all of the azimuthal scanning regions that do not correspond to the ROI scanning region 630. By adaptively changing the direction and/or the azimuthal position(s) of the standard scanning region 640 and/or the low frequency scanning region 650 (e.g., based on changing the respective bounding azimuths 604), the lidar system 600 may obtain standard or low resolution point cloud data for regions where such resolution is desired or tolerable. Such adaptive changes to the scanning regions can allow the lidar system 600 to consistently and/or continuously aggregate point cloud measurements for the FOV 601.

While some embodiments have been described with reference to a lidar system including four wings, eight TROSAs per wing, and four channels per TROSA, any suitable lidar system may operate according to the low frequency, standard, and/or ROI operating modes (and corresponding firing sequences 500*a*, 500*b*, and 500*c*). The low frequency, standard, and ROI operating modes may be used by any suitable lidar system having any suitable number of wings, TROSAs per wing, and/or channels per TROSA, including (but not limited to) directional and rotational lidar systems.

Figure 6C:
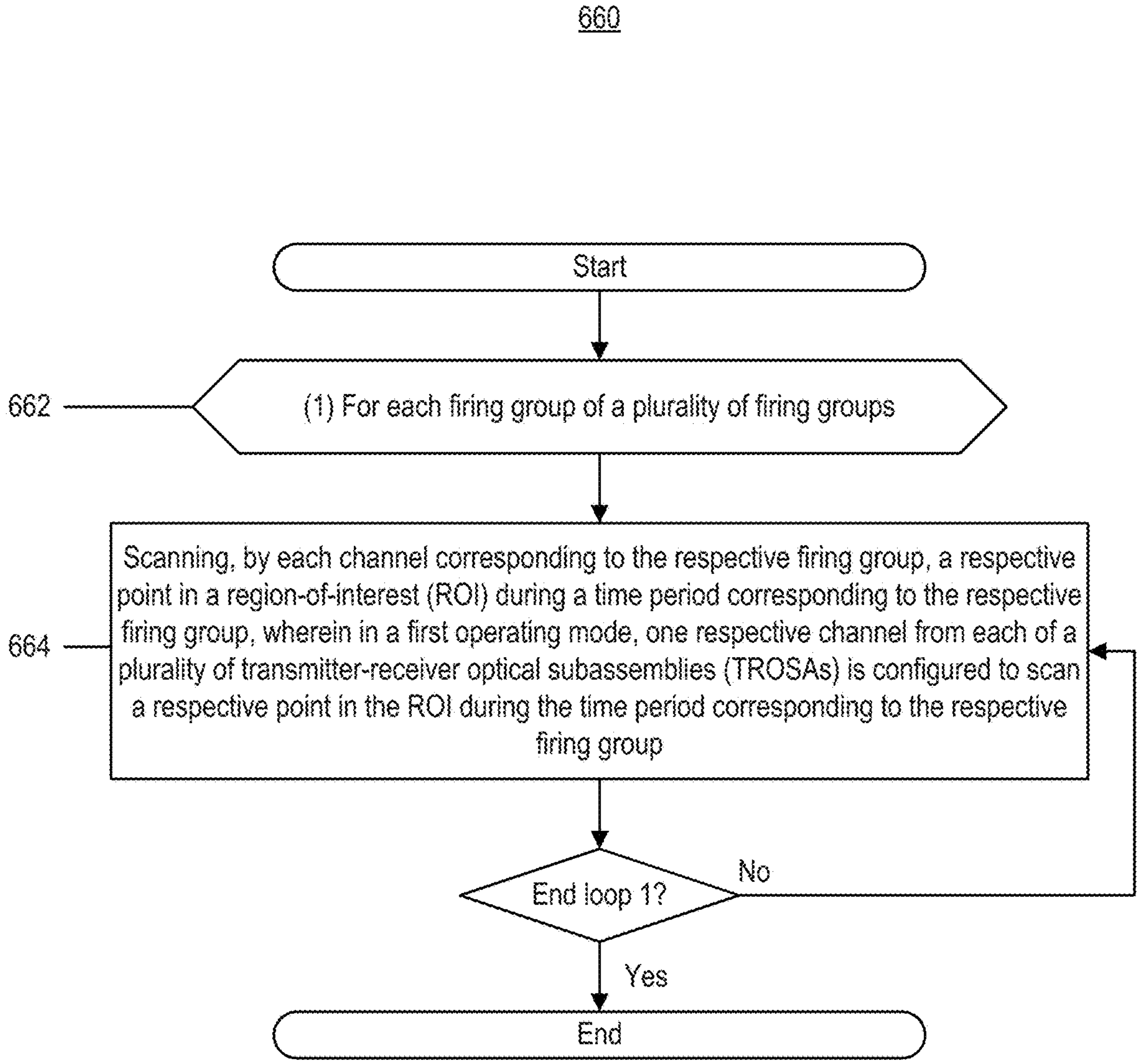
FIG. 6C shows a flowchart of a method for adaptive scanning by a lidar system, in accordance with some embodiments.

Referring to FIG. 6C, the lidar system 600 may perform a method 660 for adaptive scanning, which may include scanning one or more ROIs in the FOV, in accordance with certain embodiments. The method 660 may be suitable for scanning ROIs and/or a FOV in an operating environment according to a third (e.g., ROI) operating mode as described herein. As indicated by the loop header 662, step 664 of the method 662 may be performed for each firing group of a plurality of firing groups of the lidar system 600. For simplicity, the following paragraphs describe step 664 with reference to a single firing group of the lidar system 600. It is understood that the method 660 may be executed by any suitable configuration of firing groups for a lidar system, including firing group configurations corresponding to the first (e.g., low-frequency) and second (e.g., standard) operating modes.

At step 662, the lidar system may scan, by each channel corresponding to the respective firing group of the plurality of firing groups, a respective point in a region-of-interest (ROI) during a time period corresponding to the respective firing group, wherein in a first (e.g., ROI) operating mode, one respective channel from each of a plurality of transmitter-receiver optical subassemblies (TROSAs) is configured to scan a respective point in the ROI during the time period corresponding to the respective firing group. The plurality of TROSAs (e.g., 32 TROSAs) may each include a respective subset (e.g., 4 channels) of the plurality of channels (e.g., 128 channels). Each channel of the plurality of channels may correspond to a respective firing group of the plurality of firing groups. Each firing group of the plurality of firing groups may correspond to a respective time period of a plurality of time periods. The time periods and the corresponding firing groups may be sequentially ordered (e.g., as described and shown with respect to FIG. 5C). Each channel of the subset of channels of each respective TROSA may correspond to a different firing group of the plurality of firing groups. For the third (e.g., ROI) operating mode, a number of the plurality firing groups may be equal to a number of channels in the subset of channels of each of the plurality of TROSAs. In some cases, scanning, by each channel corresponding to the respective firing group, the respective point in the region-of-interest (ROI) during the time period corresponding to the respective firing group may further include transmitting a respective optical signal toward the respective point in the region-of-interest (ROI); and receiving a respective return signal during the time period corresponding the respective firing group.

The method 660 may be performed by a lidar system (e.g., lidar system 100, 202, 250, 270, and/or 600). In some embodiments, a system that includes the lidar system may communicate with a control module within the lidar system (e.g., a program resident in a computer-readable storage medium within the lidar system and executed by a processor within the lidar system) and/or with the control and data acquisition modules 108 of the lidar system's channels to control the lidar system to perform step 664 for each firing group of the plurality of firing groups as described above.

Figure 6D:
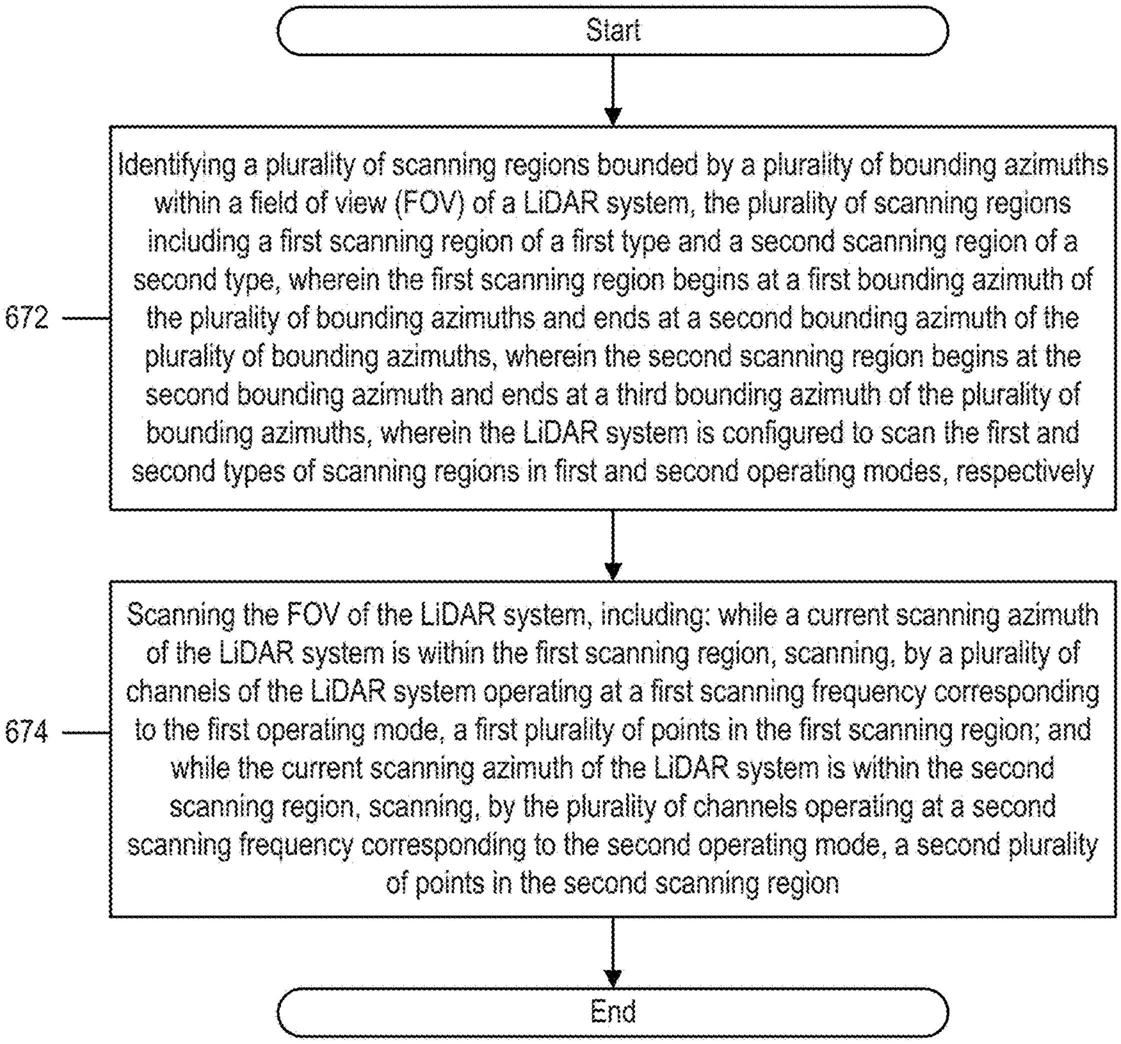
FIG. 6D shows a flowchart of another method for adaptive scanning by a lidar system, in accordance with some embodiments.

In some embodiments, the lidar system 600 may perform a method 670 for adaptive scanning. In some cases, the method for adaptive scanning may include scanning one or more ROIs in the FOV and/or one or more other portions of the FOV. Referring to FIG. 6D, an embodiment of a method 670 for adaptive scanning by a lidar system is shown. The method 670 may be suitable for scanning a plurality of scanning regions bounded by a plurality of bounding azimuths within a field of view (FOV) of a lidar system according to first, second, and/or third operating modes as described herein. One of ordinary skill in the art will appreciate that the method 670 may be executed by a lidar system having any suitable configuration, including those described herein with respect to FIGS. 1, 2A-2C, and 5A-5C.

At step 672, the lidar system may identify a plurality of scanning regions bounded by a plurality of bounding azimuths within a field of view (FOV) of a lidar system. The plurality of scanning regions may include a first scanning region of a first type and a second scanning region of a second type. The first scanning region may begin at a first bounding azimuth of the plurality of bounding azimuths and ends at a second bounding azimuth of the plurality of bounding azimuths. The second scanning region may begin at the second bounding azimuth and may end at a third bounding azimuth of the plurality of bounding azimuths. The lidar system may be configured to scan the first and second types of scanning regions in first and second operating modes, respectively.

At step 674, the lidar system may scan the FOV of the lidar system. Scanning the FOV of the lidar system may include: while a current scanning azimuth of the lidar system is within the first scanning region, scanning, by a plurality of channels of the lidar system operating at a first scanning frequency corresponding to the first operating mode, a first plurality of points in the first scanning region. Scanning the FOV of the lidar system may include: while the current scanning azimuth of the lidar system is within the second scanning region, scanning, by the plurality of channels operating at a second scanning frequency corresponding to the second operating mode, a second plurality of points in the second scanning region.

The method 670 may be performed by a lidar system (e.g., lidar system 100, 202, 250, 270, and/or 600). In some embodiments, a system that includes the lidar system may communicate with a control module within the lidar system (e.g., a program resident in a computer-readable storage medium within the lidar system and executed by a processor within the lidar system) and/or with the control and data acquisition modules 108 of the lidar system's channels to control the lidar system to perform steps 672-674 as described above.

Some Examples of Continuous Wave (CW) Lidar Systems

As discussed above, some lidar systems may use a continuous wave (CW) laser to detect the range and/or velocity of targets, rather than pulsed TOF techniques. Such systems include continuous wave (CW) coherent lidar systems and frequency modulated continuous wave (FMCW) coherent lidar systems. For example, any of the lidar systems 100, 202, 250, and 270 described above can be configured to operate as a CW coherent lidar system or an FMCW coherent lidar system.

Lidar systems configured to operate as CW or FMCW systems can avoid the eye safety hazards commonly associated with pulsed lidar systems (e.g., hazards that arise from transmitting optical signals with high peak power). In addition, coherent detection may be more sensitive than direct detection and can offer better performance, including single-pulse velocity measurement and immunity to interference from solar glare and other light sources, including other lidar systems and devices.

Figure 7:
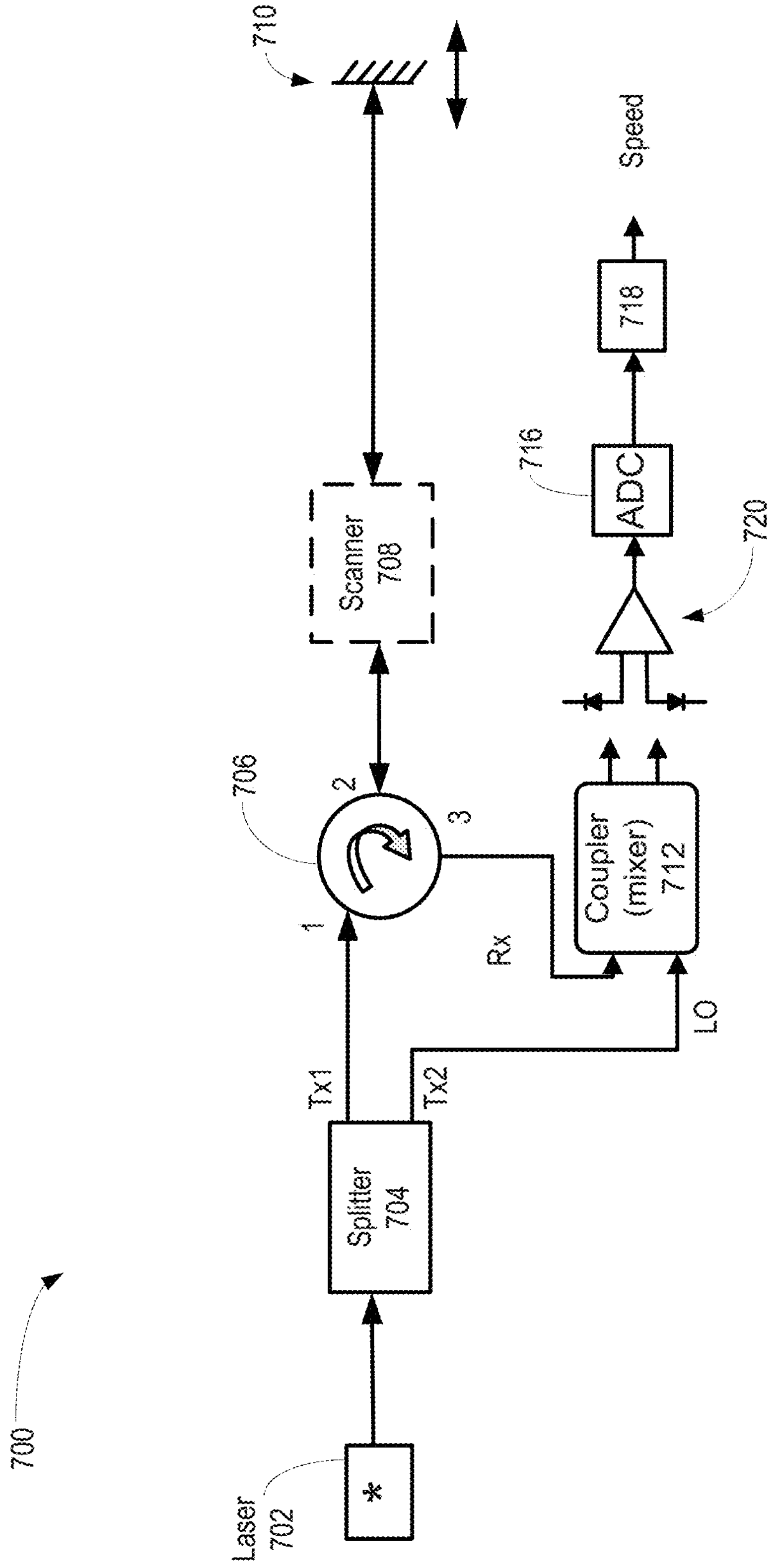
FIG. 7 is an illustration of an example continuous wave (CW) coherent lidar system, in accordance with some embodiments.

FIG. 7 illustrates an exemplary CW coherent lidar system 700 configured to determine the radial velocity (or speed) of a target. Lidar system 700 includes a laser 702 configured to produce a laser signal which is provided to a splitter 704. The laser 702 may provide a laser signal having a substantially constant laser frequency.

In one example, the splitter 704 provides a first split laser signal Tx1 to a direction selective device 706, which provides (e.g., forwards) the signal Tx1 to a scanner 708. In some examples, the direction selective device 706 is a circulator. The scanner 708 uses the first laser signal Tx1 to transmit light emitted by the laser 702 and receives light reflected by the target 710 (e.g., "reflected light" or "reflections"). The reflected light signal Rx is provided (e.g., passed back) to the direction selective device 706. The second laser signal Tx2 (provided by the splitter 704) and the reflected light signal Rx are provided to a coupler (also referred to as a mixer) 712. The mixer may use the second laser signal Tx2 as a local oscillator (LO) signal and mix it with the reflected light signal Rx. The mixer 712 may be configured to mix the reflected light signal Rx with the local oscillator signal LO. The mixer 712 may provide the mixed optical signal to differential photodetector 714, which may generate an electrical signal representing the beat frequency $f_{beat}$ of the mixed optical signals, where $f_{beat}=|f_{Tx2}-f_{Rx}|$ (the absolute value of the difference between the frequencies of the mixed optical signals). In some embodiments, the current produced by the differential photodetector 714 based on the mixed light may have the same frequency as the beat frequency $f_{beat}$. The current may be converted to a voltage by an amplifier (e.g., a transimpedance amplifier (TIA)), which may be provided (e.g., fed) to an analog-to-digital converter (ADC) 716 configured to convert the analog voltage signal to digital samples for a target detection module 718. The target detection module 718 may be configured to determine (e.g., calculate) the radial velocity of the target 710 based on the digital sampled signal with the beat frequency $f_{beat}$.

In one example, the target detection module 718 may identify Doppler frequency shifts using the beat frequency $f_{beat}$ and determine the radial velocity of the target 710 based on those shifts. For example, the radial velocity of the target 710 can be calculated using the following relationship:

$$f_d = \frac{2}{\lambda} v_t$$

where, $f_d$ is the Doppler frequency shift, $\lambda$ is the wavelength of the laser signal, and $v_t$ is the radial velocity of the target 710. In some examples, the direction of the target 710 is indicated by the sign of the Doppler frequency shift $f_d$. For example, a positive signed Doppler frequency shift may indicate that the target 710 is traveling towards the system 700 and a negative signed Doppler frequency shift may indicate that the target 710 is traveling away from the system 700.

In one example, a Fourier Transform calculation is performed using the digital samples from the ADC 716 to recover the desired frequency content (e.g., the Doppler frequency shift) from the digital sampled signal. For example, a controller (e.g., target detection module 718) may be configured to perform a Discrete Fourier Transform (DFT) on the digital samples. In certain examples, a Fast Fourier Transform (FFT) can be used to calculate the DFT on the digital samples. In some examples, the Fourier Transform calculation (e.g., DFT) can be performed iteratively on different groups of digital samples to generate a target point cloud.

While the lidar system 700 is described above as being configured to determine the radial velocity of a target, it should be appreciated that the system can be configured to determine the range and/or radial velocity of a target. For example, the lidar system 700 can be modified to use laser chirps to detect the velocity and/or range of a target.

Some examples have been described in which a DFT is used to generate points of a point cloud based on a group of samples. However, frequency analysis techniques (e.g., spectrum analysis techniques) other than the DFT may be used to generate points of a point cloud based on a group of samples. Any suitable frequency analysis technique may be used, including, without limitation, Discrete Cosine transform (DCT), Wavelet transform, Auto-Regressive moving average (ARMA), etc.

Figure 8:
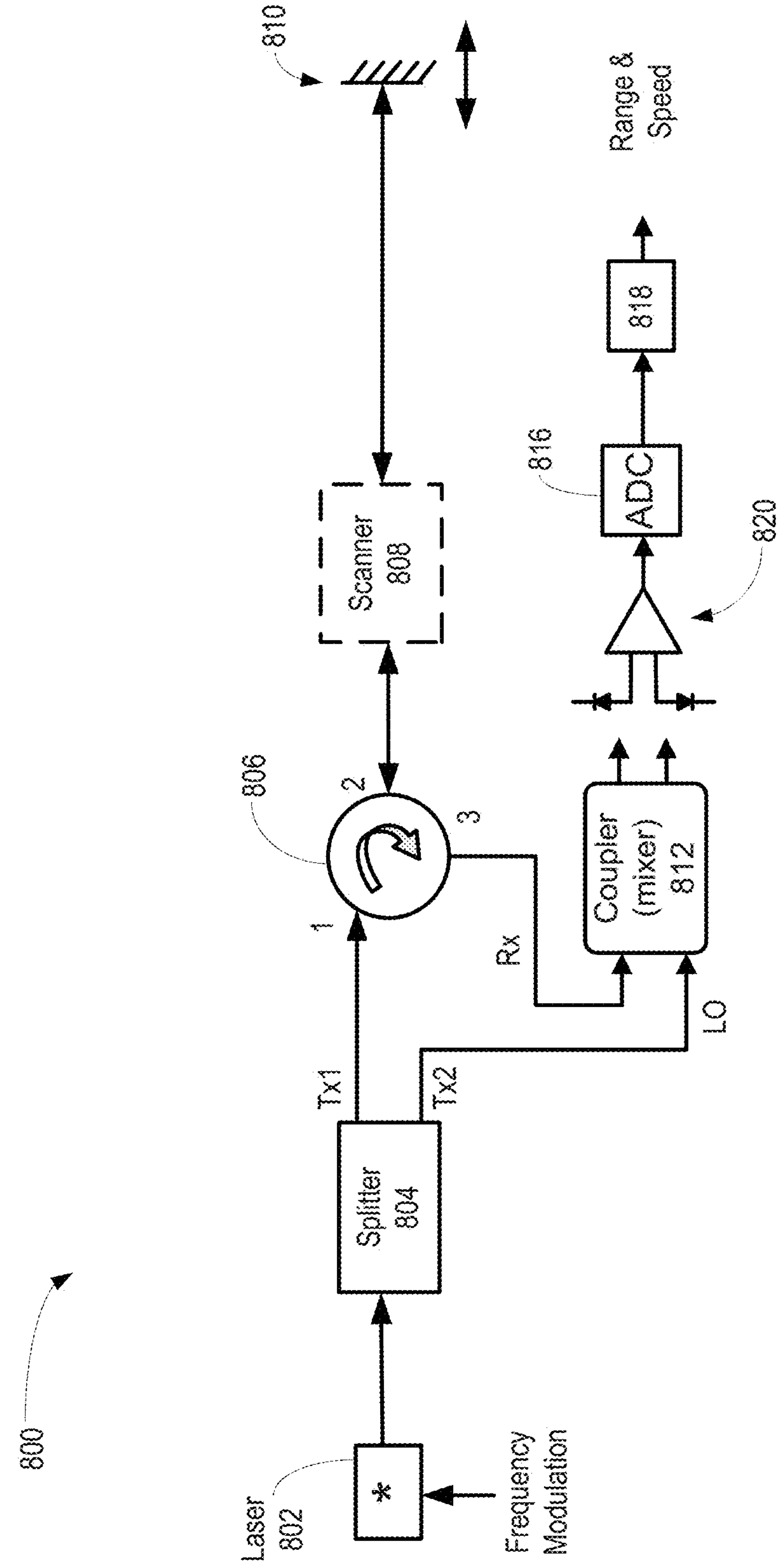
FIG. 8 is an illustration of an example frequency modulated continuous wave (FMCW) coherent lidar system, in accordance with some embodiments.

FIG. 8 illustrates an exemplary FMCW coherent lidar system 800 configured to determine the range and/or radial velocity of a target. Lidar system 800 includes a laser 802 configured to produce a laser signal which is fed into a splitter 804. The laser is "chirped" (e.g., the center frequency of the emitted laser beam is increased ("ramped up" or "chirped up") or decreased ("ramped down" or "chirped down") over time (or, equivalently, the central wavelength of the emitted laser beam changes with time within a waveband). In various embodiments, the laser frequency is chirped quickly such that multiple phase angles are attained. In one example, the frequency of the laser signal is modulated by changing the laser operating parameters (e.g., current/voltage) or using a modulator included in the laser source 802; however, in other examples, an external modulator can be placed between the laser source 802 and the splitter 804.

In other examples, the laser frequency can be "chirped" by modulating the phase of the laser signal (or light) produced by the laser 802. In one example, the phase of the laser signal is modulated using an external modulator placed between the laser source 802 and the splitter 804; however, in some examples, the laser source 802 may be modulated directly by changing operating parameters (e.g., current/voltage) or may include an internal modulator. Similar to frequency chirping, the phase of the laser signal can be increased ("ramped up") or decreased ("ramped down") over time.

Some examples of systems with FMCW-based lidar sensors have been described. However, some embodiments of the techniques described herein may be implemented using any suitable type of lidar sensors including, without limitation, any suitable type of coherent lidar sensors (e.g., phase-modulated coherent lidar sensors). With phase-modulated coherent lidar sensors, rather than chirping the frequency of the light produced by the laser (as described above with reference to FMCW techniques), the lidar system may use a phase modulator placed between the laser 802 and the splitter 804 to generate a discrete phase modulated signal, which may be used to measure range and radial velocity.

As shown, the splitter 804 provides a first split laser signal Tx1 to a direction selective device 806, which provides (e.g., forwards) the signal Tx1 to a scanner 808. The scanner 808 uses the first laser signal Tx1 to transmit light emitted by the laser 802 and receives light reflected by the target 810. The reflected light signal Rx is provided (e.g., passed back) to the direction selective device 806. The second laser signal Tx2 and reflected light signal Rx are provided to a coupler (also referred to as a mixer) 812. The mixer may use the second laser signal Tx2 as a local oscillator (LO) signal and mix it with the reflected light signal Rx. The mixer 812 may be configured to mix the reflected light signal Rx with the local oscillator signal LO to generate a beat frequency $f_{beat}$. The mixed signal with beat frequency $f_{beat}$ may be provided to a differential photodetector 814 configured to produce a current based on the received light. The current may be converted to voltage by an amplifier (e.g., a transimpedance amplifier (TIA)), which may be provided (e.g., fed) to an analog-to-digital converter (ADC) 816 configured to convert the analog voltage to digital samples for a target detection module 818. The target detection module 818 may be configured to determine (e.g., calculate) the range and/or radial velocity of the target 810 based on the digital sample signal with beat frequency $f_{beat}$.

Laser chirping may be beneficial for range (distance) measurements of the target. In comparison, Doppler frequency measurements are generally used to measure target velocity. Resolution of distance can depend on the bandwidth size of the chirp frequency band such that greater bandwidth corresponds to finer resolution, according to the following relationships:

$$\text{Range resolution: } \Delta R = \frac{c}{2BW} \text{ (given a perfectly linear chirp), and}$$

$$\text{Range: } R = \frac{f_{beat} c T_{ChirpRamp}}{2BW}$$

where c is the speed of light, BW is the bandwidth of the chirped laser signal, $f_{beat}$ is the beat frequency, and $T_{ChirpRamp}$ is the time period during which the frequency of the chirped laser ramps up (e.g., the time period corresponding to the up-ramp portion of the chirped laser). For example, for a distance resolution of 3.0 cm, a frequency bandwidth of 5.0 GHz may be used. A linear chirp can be an effective way to measure range and range accuracy can depend on the chirp linearity. In some instances, when chirping is used to measure target range, there may be range and velocity ambiguity. In particular, the reflected signal for measuring velocity (e.g., via Doppler) may affect the measurement of range. Therefore, some exemplary FMCW coherent lidar systems may rely on two measurements having different slopes (e.g., negative and positive slopes) to remove this ambiguity. The two measurements having different slopes may also be used to determine range and velocity measurements simultaneously.

Figure 9A:
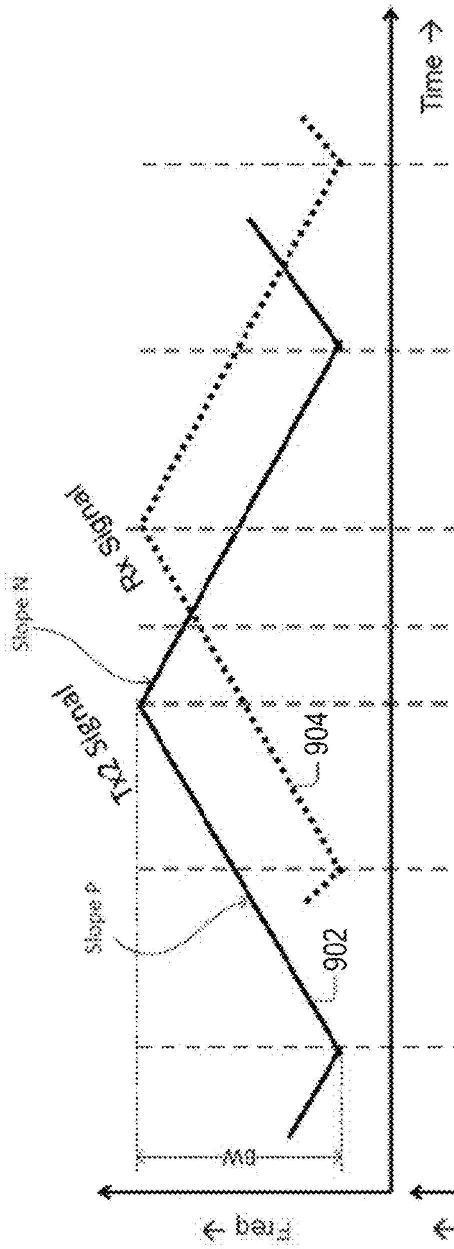
FIG. 9A is a plot of a frequency chirp as a function of time in a transmitted laser signal and reflected signal, in accordance with some embodiments.

FIG. 9A is a plot of ideal (or desired) frequency chirp as a function of time in the transmitted laser signal Tx (e.g., signal Tx2), depicted in solid line 902, and reflected light signal Rx, depicted in dotted line 904. As depicted, the ideal Tx signal has a positive linear slope between time t1 and time t3 and a negative linear slope between time t3 and time t6. Accordingly, the ideal reflected light signal Rx returned with a time delay td of approximately t2–t1 has a positive linear slope between time t2 and time t5 and a negative linear slope between time t5 and time t7.

Figure 9B:
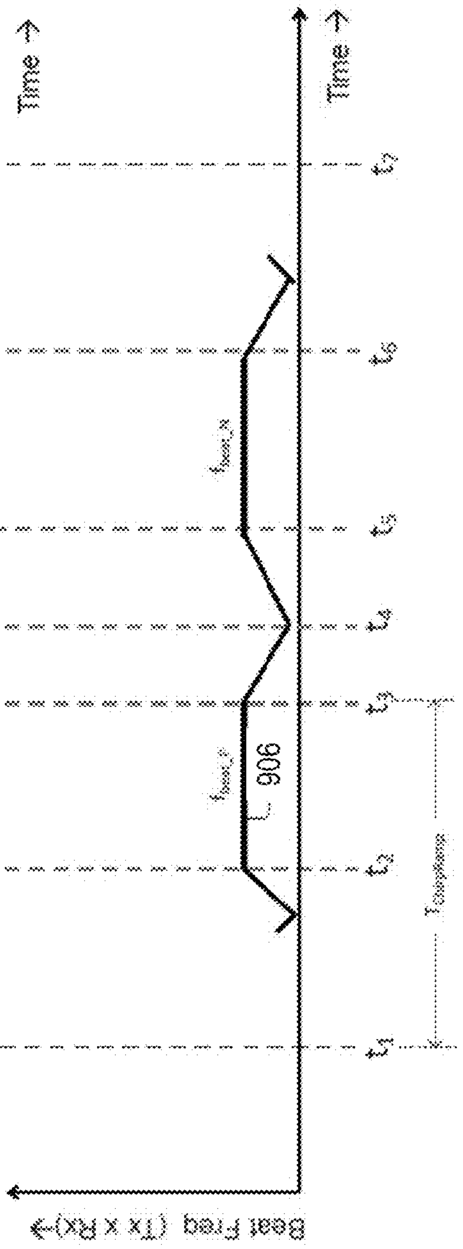
FIG. 9B is a plot illustrating a beat frequency of a mixed signal, in accordance with some embodiments.

FIG. 9B is a plot illustrating the corresponding ideal beat frequency $f_{beat}$ 906 of the mixed signal Tx2×Rx. Note that the beat frequency $f_{beat}$ 906 has a constant value between time t2 and time t3 (corresponding to the overlapping up-slopes of signals Tx2 and Rx) and between time t5 and time t6 (corresponding to the overlapping down-slopes of signals Tx2 and Rx).

The positive slope ("Slope P") and the negative slope ("Slope N") (also referred to as positive ramp (or up-ramp) and negative ramp (or down-ramp), respectively) can be used to determine range and/or velocity. In some instances, referring to FIGS. 9A-9B, when the positive and negative ramp pair is used to measure range and velocity simultaneously, the following relationships are utilized:

$$\text{Range: } R = \frac{cT_{ChirpRamp}\frac{(f_{beat\_P} + f_{beat\_N})}{2}}{2BW}, \text{ and}$$

$$\text{Velocity: } V = \frac{\lambda\frac{(f_{beat\_P} - f_{beat\_N})}{2}}{2}$$

where $f_{beat\_P}$ and $f_{beat\_N}$ are beat frequencies generated during positive (P) and negative (N) slopes of the chirp 902 respectively and A is the wavelength of the laser signal.

In one example, the scanner 808 of the lidar system 800 is used to scan the environment and generate a target point cloud from the acquired scan data. In some examples, the lidar system 800 can use processing methods that include performing one or more Fourier Transform calculations, such as a Fast Fourier Transform (FFT) or a Discrete Fourier Transform (DFT), to generate the target point cloud from the acquired scan data. Being that the system 800 is capable of measuring range, each point in the point cloud may have a three-dimensional location (e.g., x, y, and z) in addition to radial velocity. In some examples, the x-y location of each target point corresponds to a radial position of the target point relative to the scanner 808. Likewise, the z location of each target point corresponds to the distance between the target point and the scanner 808 (e.g., the range). In one example, each target point corresponds to one frequency chirp 902 in the laser signal. For example, the samples collected by the system 800 during the chirp 902 (e.g., t1 to t6) can be processed to generate one point in the point cloud.

Additional Embodiments, Computing Devices, and Information Handling Systems

Figure 10:
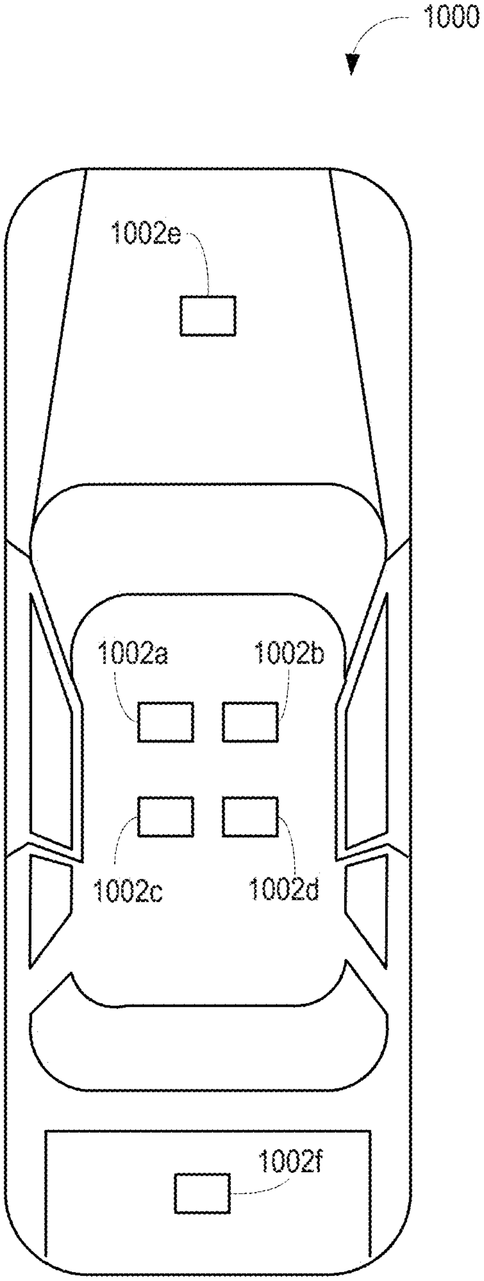
FIG. 10 is a diagram of a vehicle including a plurality of sensors, in accordance with some embodiments.

In some embodiments, lidar systems and techniques described herein may be used to provide mapping and/or autonomous navigation for a vehicle. FIG. 10 illustrates a vehicle 1000 having a plurality of sensors 1002. As shown, a first sensor 1002*a*, a second sensor 1002*b*, a third sensor 1002*c*, and a fourth sensor 1002*d* may be positioned in a first location on (or inside) the vehicle 1000 (e.g., the roof). Likewise, a fifth sensor 1002*e* may be positioned in a second location on (or inside) the vehicle 1000 (e.g., the front of the vehicle 1000) and a sixth sensor 1002*f* may be positioned in a third location on (or inside) the vehicle 1000 (e.g., the back of the vehicle 1000). In other examples, a different number or configuration of sensors may be used.

In some examples, at least one sensor of the plurality of sensors 1002 is configured to provide (or enable) 3D mapping of the vehicle's surroundings. In certain examples, at least one sensor of the plurality of sensors 1002 is used to provide autonomous navigation for the vehicle 1000 within an environment. In one example, each sensor 1002 includes at least one lidar system, device, or chip. The lidar system(s) included in each sensor 1002 may include any of the lidar systems disclosed herein. In some examples, at least one sensor of the plurality of sensors 1002 may be a different type of sensor (e.g., camera, radar, etc.). In one example, the vehicle 1000 is a car; however, in other examples, the vehicle 1000 may be a truck, boat, plane, drone, vacuum cleaner (e.g., robot vacuum cleaner), robot, train, tractor, ATV, or any other type of vehicle or moveable object.

In some embodiments, lidar systems and techniques described herein may be implemented using Silicon photonics (SiP) technologies. SiP is a material platform from which photonic integrated circuits (PICs) can be produced. SiP is compatible with CMOS (electronic) fabrication techniques, which allows PICs to be manufactured using established foundry infrastructure. In PICs, light propagates through a patterned silicon optical medium that lies on top of an insulating material layer (e.g., silicon on insulator (SOI)). In some cases, direct bandgap materials (e.g., indium phosphide (InP)) are used to create light (e.g., laser) sources that are integrated in an SiP chip (or wafer) to drive optical or photonic components within a photonic circuit. SiP technologies are increasingly used in optical datacom, sensing, biomedical, automotive, astronomy, aerospace, augmented reality (AR) applications, virtual reality (VR) applications, artificial intelligence (AI) applications, navigation, image identification, drones, robotics, etc.

Figure 11:
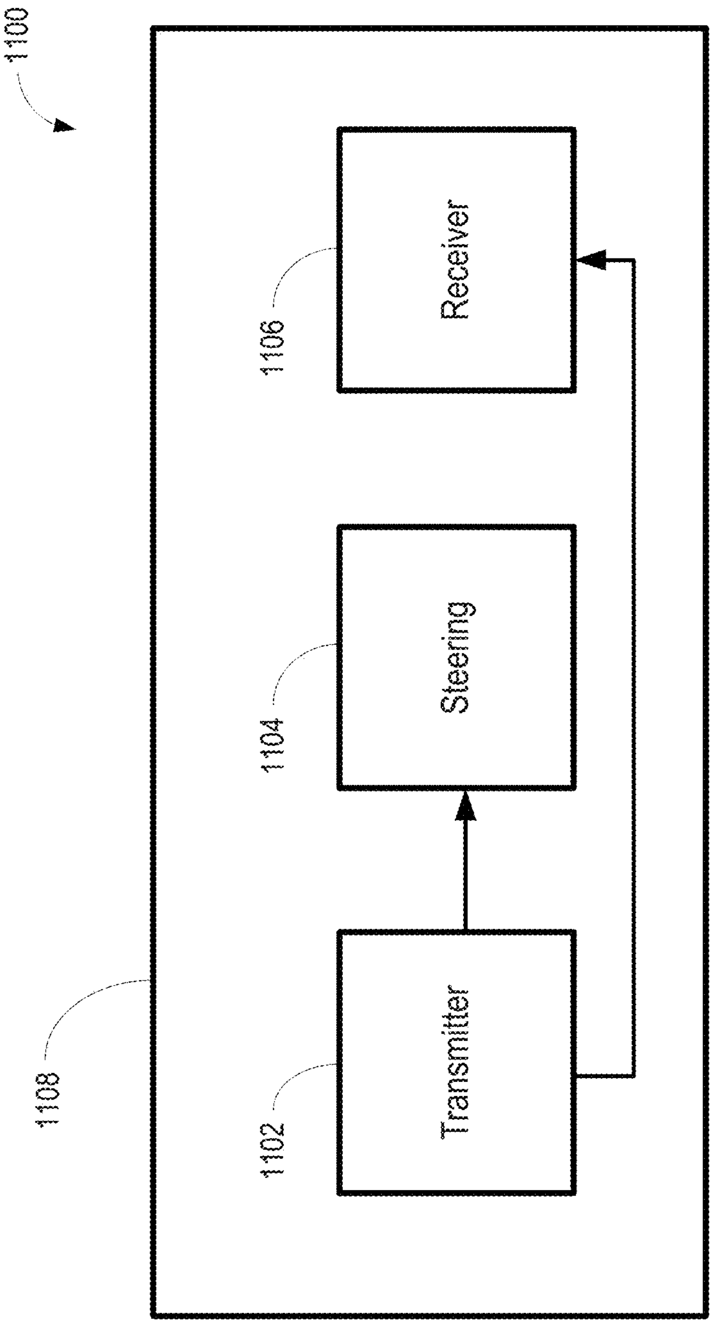
FIG. 11 is a block diagram of a silicon photonic integrated circuit (PIC) in accordance with some embodiments.

FIG. 11 is a block diagram of a silicon photonic integrated circuit (PIC) 1100 in accordance with aspects described herein. In one example, the lidar systems described herein can be implemented as the PIC 1100. The PIC 1100 includes a transmitter module 1102, a steering module 1104, and a receiver module 1106. As shown, the transmitter module 1102, the steering module 1104, and the receiver module 1106 are integrated on a silicon substrate 1108. In other examples, the transmitter module 1102, the steering module 1104, or the receiver module 1106 may be included on a separate substrate. In some embodiments, the steering module 1104 is used by the PIC 1100 in connection with transmission (e.g., emission) and reception (e.g., collection) of optical signals. In some examples, the silicon substrate 1108 is an SOI substrate with a silicon layer (e.g., between 200 nm and 10 micron thick) disposed over an oxide layer (e.g., approximately 2 micron thick). In certain examples, the silicon substrate 1108 can include multiple silicon and/or oxide layers.

In one example, the transmitter module 1102 includes at least one laser source. In some examples, the laser source(s) are implemented using a direct bandgap material (e.g., InP) and integrated on the silicon substrate 1108 via hybrid integration. The transmitter module 1102 may also include at least one splitter, a combiner, and/or a direction selective device that are implemented on the silicon substrate 1108 via monolithic or hybrid integration. In some examples, the laser source(s) are external to the PIC 1100 and the laser signal(s) can be provided to the transmission module 1102.

In some embodiments, lidar systems and techniques described herein may be implemented using micro-electro-mechanical system (MEMS) devices. A MEMS device is a miniature device that has both mechanical and electronic components. The physical dimension of a MEMS device can range from several millimeters to less than one micrometer. Lidar systems may include one or more scanning mirrors implemented as a MEMS mirror (or an array of MEMS mirrors). Each MEMS mirror may be a single-axis MEMS mirror or dual-axis MEMS mirror. The MEMS mirror(s) may be electromagnetic mirrors. A control signal is provided to adjust the position of the mirror to direct light in at least one scan direction (e.g., horizontal and/or vertical). The MEMS mirror(s) can be positioned to steer light transmitted by the lidar system and/or to steer light received by the lidar system. MEMS mirrors are compact and may allow for smaller form-factor lidar systems, faster control speeds, and more precise light steering compared to other mechanical-scanning lidar methods. MEMS mirrors may be used in solid-state (e.g., stationary) lidar systems and rotating lidar systems.

In embodiments, aspects of the techniques described herein (e.g., timing the emission of the transmitted signal, processing received return signals, and so forth) may be directed to or implemented on information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), network storage device, or any other suitable device and may vary in size, shape, performance, functionality, and price.

Figure 12:
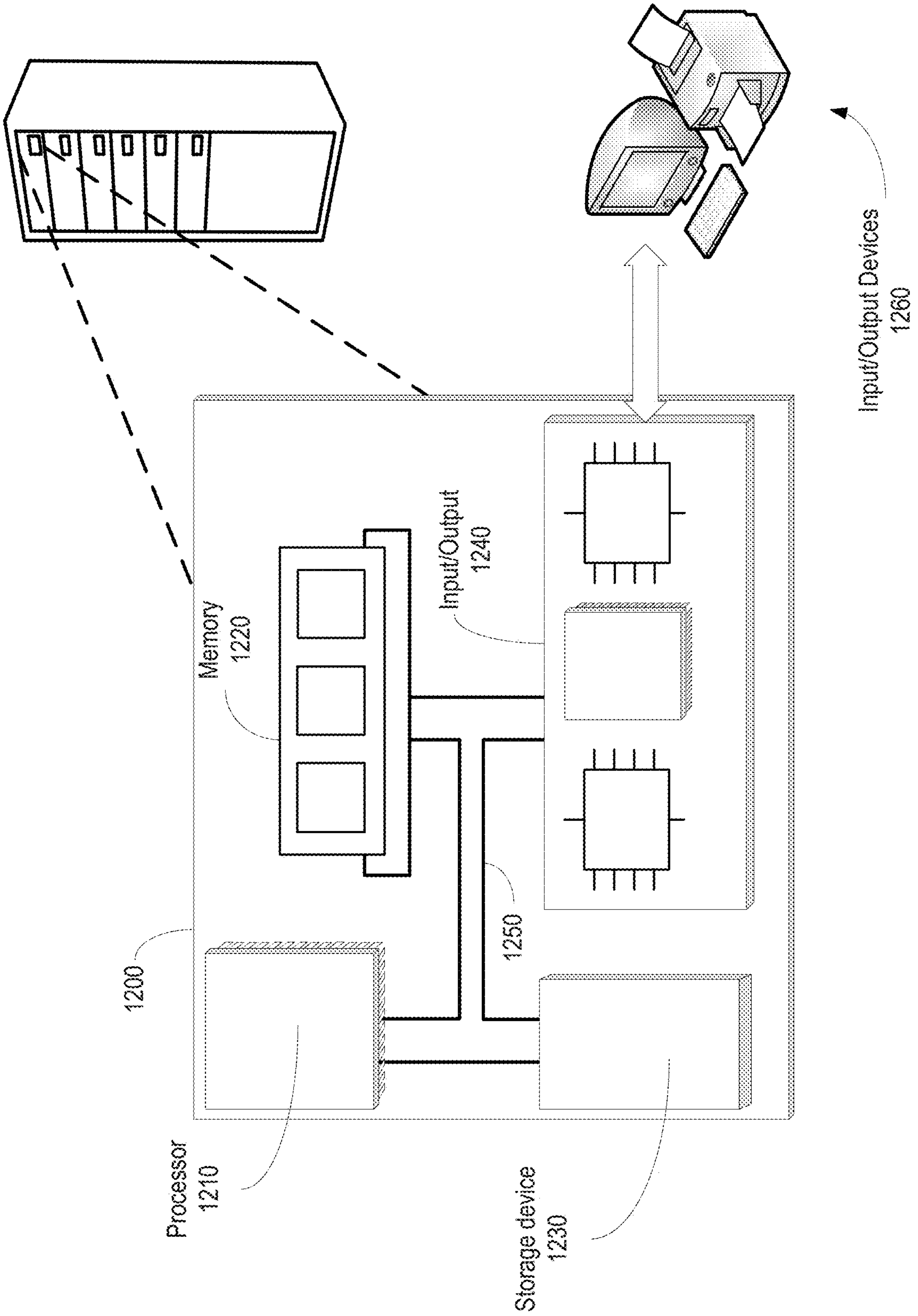
FIG. 12 is a block diagram of an example computer system, in accordance with some embodiments.

FIG. 12 is a block diagram of an example computer system 1200 that may be used in implementing the technology described in this document. General-purpose computers, network appliances, mobile devices, or other electronic systems may also include at least portions of the system 1200. The system 1200 includes a processor 1210, a memory 1220, a storage device 1230, and an input/output device 1240. Each of the components 1210, 1220, 1230, and 1240 may be interconnected, for example, using a system bus 1250. The processor 1210 is capable of processing instructions for execution within the system 1200. In some implementations, the processor 1210 is a single-threaded processor. In some implementations, the processor 1210 is a multi-threaded processor. In some implementations, the processor 1210 is a programmable (or reprogrammable) general purpose microprocessor or microcontroller. The processor 1210 is capable of processing instructions stored in the memory 1220 or on the storage device 1230.

The memory 1220 stores information within the system 1200. In some implementations, the memory 1220 is a non-transitory computer-readable medium. In some implementations, the memory 1220 is a volatile memory unit. In some implementations, the memory 1220 is a non-volatile memory unit.

The storage device 1230 is capable of providing mass storage for the system 1200. In some implementations, the storage device 1230 is a non-transitory computer-readable medium. In various different implementations, the storage device 1230 may include, for example, a hard disk device, an optical disk device, a solid-date drive, a flash drive, or some other large capacity storage device. For example, the storage device may store long-term data (e.g., database data, file system data, etc.). The input/output device 1240 provides input/output operations for the system 1200. In some implementations, the input/output device 1240 may include one or more network interface devices, e.g., an Ethernet card, a serial communication device, e.g., an RS-232 port, and/or a wireless interface device, e.g., an 802.11 card, a 3G wireless modem, or a 4G wireless modem. In some implementations, the input/output device may include driver devices configured to receive input data and send output data to other input/output devices, e.g., keyboard, printer and display devices 1260. In some examples, mobile computing devices, mobile communication devices, and other devices may be used.

In some implementations, at least a portion of the approaches described above may be realized by instructions that upon execution cause one or more processing devices to carry out the processes and functions described above. Such instructions may include, for example, interpreted instructions such as script instructions, or executable code, or other instructions stored in a non-transitory computer readable medium. The storage device 1230 may be implemented in a distributed way over a network, for example as a server farm or a set of widely distributed servers, or may be implemented in a single computing device.

Although an example processing system has been described in FIG. 12, embodiments of the subject matter, functional operations and processes described in this specification can be implemented in other types of digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, a data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "system" may encompass all kinds of apparatus, devices, and machines for processing data, including by way of example a programmable processor, a computer, or multiple processors or computers. A processing system may include special purpose logic circuitry, e.g., an FPGA (field programmable gate array), an ASIC (application specific integrated circuit), or a programmable general purpose microprocessor or microcontroller. A processing system may include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA, an ASIC, or a programmable general purpose microprocessor or microcontroller.

Computers suitable for the execution of a computer program can include, by way of example, general or special purpose microprocessors or both, or any other kind of central processing unit. Generally, a central processing unit will receive instructions and data from a read-only memory or a random access memory or both. A computer generally includes a central processing unit for performing or executing instructions and one or more memory devices for storing instructions and data. Generally, a computer will also include, or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship between client and server arises by virtue of computer programs running on the respective computers and having a client-server relationship with each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Figure 13:
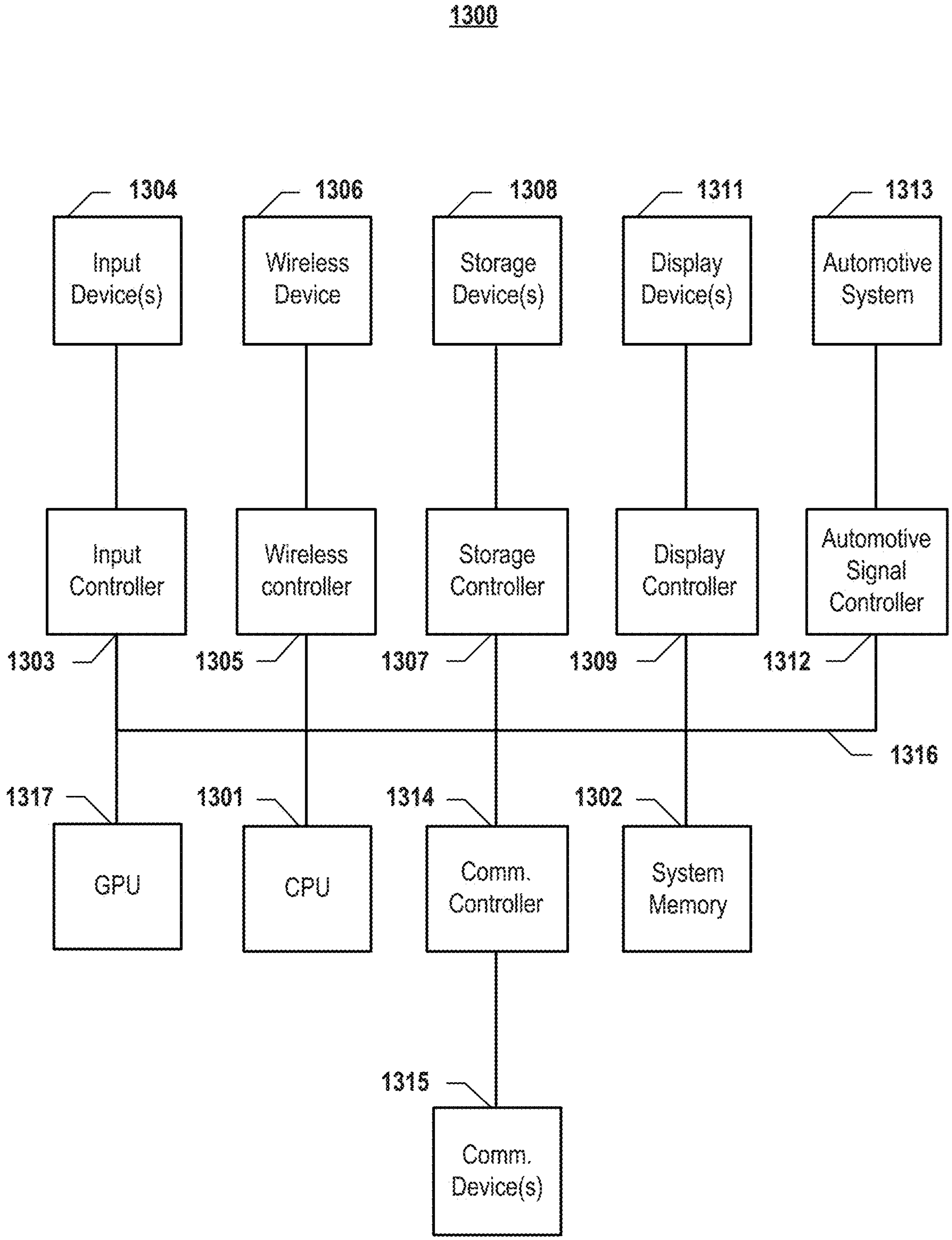
FIG. 13 is a block diagram of a computing device/information handling system, in accordance with some embodiments.

FIG. 13 depicts a simplified block diagram of a computing device/information handling system (or computing system) according to embodiments of the present disclosure. It will be understood that the functionalities shown for system 1300 may operate to support various embodiments of an information handling system—although it shall be understood that an information handling system may be differently configured and include different components.

As illustrated in FIG. 13, system 1300 includes one or more central processing units (CPU) 1201 that provide(s) computing resources and control(s) the computer. CPU 1301 may be implemented with a microprocessor or the like, and may also include one or more graphics processing units (GPU) 1317 and/or a floating point coprocessor for mathematical computations. System 1300 may also include a system memory 1302, which may be in the form of random-access memory (RAM), read-only memory (ROM), or both.

A number of controllers and peripheral devices may also be provided. For example, an input controller 1303 represents an interface to various input device(s) 1304, such as a keyboard, mouse, or stylus. There may also be a wireless controller 1305, which communicates with a wireless device 1306. System 1300 may also include a storage controller 1307 for interfacing with one or more storage devices 1308, each of which includes a storage medium such as a magnetic tape or disk, or an optical medium that might be used to record programs of instructions for operating systems, utilities, and applications, which may include embodiments of programs that implement various aspects of the techniques described herein. Storage device(s) 1308 may also be used to store processed data or data to be processed in accordance with some embodiments. System 1300 may also include a display controller 1309 for providing an interface to a display device 1311, which may be a cathode ray tube (CRT), a thin film transistor (TFT) display, or other type of display. The computing system 1300 may also include an automotive signal controller 1312 for communicating with an automotive system 1313. A communications controller 1314 may interface with one or more communication devices 1315, which enables system 1300 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN), or through any suitable electromagnetic carrier signals including infrared signals.

In the illustrated system, all major system components may connect to a bus 1316, which may represent more than one physical bus. However, various system components may or may not be in physical proximity to one another. For example, input data and/or output data may be remotely transmitted from one physical location to another. In addition, programs that implement various aspects of some embodiments may be accessed from a remote location (e.g., a server) over a network. Such data and/or programs may be conveyed through any of a variety of machine-readable medium including, but not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Some embodiments may be encoded upon one or more non-transitory, computer-readable media with instructions for one or more processors or processing units to cause steps to be performed. It shall be noted that the one or more non-transitory, computer-readable media shall include volatile and non-volatile memory. It shall also be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that some embodiments may further relate to computer products with a non-transitory, tangible computer-readable medium that has computer code thereon for performing various computer-implemented operations. The medium and computer code may be those specially designed and constructed for the purposes of the techniques described herein, or they may be of the kind known or available to those having skill in the relevant arts. Examples of tangible, computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that is executed by a computer using an interpreter. Some embodiments may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the techniques described herein. One skilled in the art will also recognize that a number of the elements described above may be physically and/or functionally separated into submodules or combined together.

In embodiments, aspects of the techniques described herein (e.g., timing the emission of optical signals, processing received return signals, generating point clouds, performing one or more (e.g., all) of the steps of the methods described herein, etc.) may be implemented using machine learning and/or artificial intelligence technologies.

"Machine learning" generally refers to the application of certain techniques (e.g., pattern recognition and/or statistical inference techniques) by computer systems to perform specific tasks. Machine learning techniques may be used to build models based on sample data (e.g., "training data") and to validate the models using validation data (e.g., "testing data"). The sample and validation data may be organized as sets of records (e.g., "observations" or "data samples"), with each record indicating values of specified data fields (e.g., "independent variables," "inputs," "features," or "predictors") and corresponding values of other data fields (e.g., "dependent variables," "outputs," or "targets"). Machine learning techniques may be used to train models to infer the values of the outputs based on the values of the inputs. When presented with other data (e.g., "inference data") similar to or related to the sample data, such models may accurately infer the unknown values of the targets of the inference data set.

A feature of a data sample may be a measurable property of an entity (e.g., person, thing, event, activity, etc.) represented by or associated with the data sample. A value of a feature may be a measurement of the corresponding property of an entity or an instance of information regarding an entity. Features can also have data types. For instance, a feature can have an image data type, a numerical data type, a text data type (e.g., a structured text data type or an unstructured ("free") text data type), a categorical data type, or any other suitable data type. In general, a feature's data type is categorical if the set of values that can be assigned to the feature is finite.

As used herein, "model" may refer to any suitable model artifact generated by the process of using a machine learning algorithm to fit a model to a specific training data set. The terms "model," "data analytics model," "machine learning model" and "machine learned model" are used interchangeably herein.

As used herein, the "development" of a machine learning model may refer to construction of the machine learning model. Machine learning models may be constructed by computers using training data sets. Thus, "development" of a machine learning model may include the training of the machine learning model using a training data set. In some cases (generally referred to as "supervised learning"), a training data set used to train a machine learning model can include known outcomes (e.g., labels or target values) for individual data samples in the training data set. For example, when training a supervised computer vision model to detect images of cats, a target value for a data sample in the training data set may indicate whether or not the data sample includes an image of a cat. In other cases (generally referred to as "unsupervised learning"), a training data set does not include known outcomes for individual data samples in the training data set.

Following development, a machine learning model may be used to generate inferences with respect to "inference" data sets. For example, following development, a computer vision model may be configured to distinguish data samples including images of cats from data samples that do not include images of cats. As used herein, the "deployment" of a machine learning model may refer to the use of a developed machine learning model to generate inferences about data other than the training data.

"Artificial intelligence" (AI) generally encompasses any technology that demonstrates intelligence. Applications (e.g., machine-executed software) that demonstrate intelligence may be referred to herein as "artificial intelligence applications," "AI applications," or "intelligent agents." An intelligent agent may demonstrate intelligence, for example, by perceiving its environment, learning, and/or solving problems (e.g., taking actions or making decisions that increase the likelihood of achieving a defined goal). In many cases, intelligent agents are developed by organizations and deployed on network-connected computer systems so users within the organization can access them. Intelligent agents are used to guide decision-making and/or to control systems in a wide variety of fields and industries, e.g., security; transportation; risk assessment and management; supply chain logistics; and energy management. Intelligent agents may include or use models.

Some non-limiting examples of AI application types may include inference applications, comparison applications, and optimizer applications. Inference applications may include any intelligent agents that generate inferences (e.g., predictions, forecasts, etc.) about the values of one or more output variables based on the values of one or more input variables. In some examples, an inference application may provide a recommendation based on a generated inference. For example, an inference application for a lending organization may infer the likelihood that a loan applicant will default on repayment of a loan for a requested amount, and may recommend whether to approve a loan for the requested amount based on that inference. Comparison applications may include any intelligent agents that compare two or more possible scenarios. Each scenario may correspond to a set of potential values of one or more input variables over a period of time. For each scenario, an intelligent agent may generate one or more inferences (e.g., with respect to the values of one or more output variables) and/or recommendations. For example, a comparison application for a lending organization may display the organization's predicted revenue over a period of time if the organization approves loan applications if and only if the predicted risk of default is less than 20% (scenario #1), less than 10% (scenario #2), or less than 5% (scenario #3). Optimizer applications may include any intelligent agents that infer the optimum values of one or more variables of interest based on the values of one or more input variables. For example, an optimizer application for a lending organization may indicate the maximum loan amount that the organization would approve for a particular customer.

As used herein, "data analytics" may refer to the process of analyzing data (e.g., using machine learning models, artificial intelligence, models, or techniques) to discover information, draw conclusions, and/or support decision-making. Species of data analytics can include descriptive analytics (e.g., processes for describing the information, trends, anomalies, etc. in a data set), diagnostic analytics (e.g., processes for inferring why specific trends, patterns, anomalies, etc. are present in a data set), predictive analytics (e.g., processes for predicting future events or outcomes), and prescriptive analytics (processes for determining or suggesting a course of action).

Data analytics tools are used to guide decision-making and/or to control systems in a wide variety of fields and industries, e.g., security; transportation; risk assessment and management; supply chain logistics; and energy management. The processes used to develop data analytics tools suitable for carrying out specific data analytics tasks generally include steps of data collection, data preparation, feature engineering, model generation, and/or model deployment.

As used herein, "spatial data" may refer to data relating to the location, shape, and/or geometry of one or more spatial objects. Data collected by lidar systems, devices, and chips described herein may be considered spatial data. A "spatial object" may be an entity or thing that occupies space and/or has a location in a physical or virtual environment. In some cases, a spatial object may be represented by an image (e.g., photograph, rendering, etc.) of the object. In some cases, a spatial object may be represented by one or more geometric elements (e.g., points, lines, curves, and/or polygons), which may have locations within an environment (e.g., coordinates within a coordinate space corresponding to the environment). In some cases, a spatial object may be represented as a cluster of points in a 3D point-cloud.

As used herein, "spatial attribute" may refer to an attribute of a spatial object that relates to the object's location, shape, or geometry. Spatial objects or observations may also have "non-spatial attributes." For example, a residential lot is a spatial object that that can have spatial attributes (e.g., location, dimensions, etc.) and non-spatial attributes (e.g., market value, owner of record, tax assessment, etc.). As used herein, "spatial feature" may refer to a feature that is based on (e.g., represents or depends on) a spatial attribute of a spatial object or a spatial relationship between or among spatial objects. As a special case, "location feature" may refer to a spatial feature that is based on a location of a spatial object. As used herein, "spatial observation" may refer to an observation that includes a representation of a spatial object, values of one or more spatial attributes of a spatial object, and/or values of one or more spatial features.

Spatial data may be encoded in vector format, raster format, or any other suitable format. In vector format, each spatial object is represented by one or more geometric elements. In this context, each point has a location (e.g., coordinates), and points also may have one or more other attributes. Each line (or curve) comprises an ordered, connected set of points. Each polygon comprises a connected set of lines that form a closed shape. In raster format, spatial objects are represented by values (e.g., pixel values) assigned to cells (e.g., pixels) arranged in a regular pattern (e.g., a grid or matrix). In this context, each cell represents a spatial region, and the value assigned to the cell applies to the represented spatial region.

"Computer vision" generally refers to the use of computer systems to analyze and interpret image data. In some embodiments, computer vision may be used to analyze and interpret data collected by lidar systems (e.g., point-clouds). Computer vision tools generally use models that incorporate principles of geometry and/or physics. Such models may be trained to solve specific problems within the computer vision domain using machine learning techniques. For example, computer vision models may be trained to perform object recognition (recognizing instances of objects or object classes in images), identification (identifying an individual instance of an object in an image), detection (detecting specific types of objects or events in images), etc.

Computer vision tools (e.g., models, systems, etc.) may perform one or more of the following functions: image pre-processing, feature extraction, and detection/segmentation. Some examples of image pre-processing techniques include, without limitation, image re-sampling, noise reduction, contrast enhancement, and scaling (e.g., generating a scale space representation). Extracted features may be low-level (e.g., raw pixels, pixel intensities, pixel colors, gradients, patterns and textures (e.g., combinations of colors in close proximity), color histograms, motion vectors, edges, lines, corners, ridges, etc.), mid-level (e.g., shapes, surfaces, volumes, patterns, etc.), or high-level (e.g., objects, scenes, events, etc.). The detection/segmentation function may involve selection of a subset of the input image data (e.g., one or more images within a set of images, one or more regions within an image, etc.) for further processing.

Some Embodiments

Some embodiments may include any of the following:

A1. A lidar device comprising: a plurality of channels; and a plurality of transmitter-receiver optical subassemblies (TROSAs) each comprising a respective subset of the plurality of channels, wherein each channel is assigned to a firing group from a plurality of firing groups, wherein each firing group comprises either one channel or no channels from any given TROSA from the plurality of TROSAs, and wherein the channels in each firing group are configured to scan an environment during a respective window of time assigned to the firing group in a firing sequence.

A2. The lidar device of clause A1, wherein each channel comprises: a transmitter configured to transmit optical signals; and a receiver configured to receive return signals based on the optical signals.

A3. The lidar device of clause A1 or A2, wherein the plurality of TROSAs includes a total of N TROSAs, and wherein each firing group includes N channels, N÷2 channels, or N÷4 channels.

A4. The lidar device of any of clauses A1 to A3, wherein each channel in each firing group is configured to scan the environment by: transmitting a respective optical signal toward the environment; and receiving a respective return signal based on the respective optical signal.

A5. The lidar device of any of clauses A1 to A4, wherein the plurality of TROSAs is configured to rotate about an axis.

A6. The lidar device of any of clauses A1 to A5, wherein each TROSA in the plurality of TROSAs includes a scanning mirror configured to oscillate about an axis.

A7. The lidar device of any of clauses A1 to A6, wherein the lidar device is mounted on or carried by a vehicle.

A8. A method comprising: providing a lidar device comprising: a plurality of channels; and a plurality of transmitter-receiver optical subassemblies (TROSAs) each comprising a respective subset of the plurality of channels, wherein each channel is assigned to a firing group from a plurality of firing groups, and wherein each firing group comprises either one channel or no channels from any given TROSA from the plurality of TROSAs; and scanning an environment surrounding the lidar device, wherein the channels in each firing group are configured to scan the environment during a respective window of time assigned to the firing group in a firing sequence.

A9. The method of clause A8, wherein the plurality of TROSAs includes a total of N TROSAs, and wherein each firing group includes N channels, N÷2 channels, or N÷4 channels.

A10. The method of clause A8 or A9, wherein each channel in each firing group is configured to scan the environment by: transmitting a respective optical signal toward the environment; and receiving a respective return signal based on the respective optical signal.

A11. The method of any of clauses A8 to A10, wherein the plurality of TROSAs is configured to rotate about an axis.

A12. The method of any of clauses A8 to A11, wherein each TROSA in the plurality of TROSAs includes a scanning mirror configured to oscillate about an axis.

A13. The method of any of clauses A8 to A12, wherein the lidar device is mounted on or carried by a vehicle.

A14. A method comprising: providing a lidar device comprising: a plurality of channels; and a plurality of transmitter-receiver optical subassemblies (TROSAs) each comprising a respective subset of the plurality of channels, wherein each channel is assigned to a firing group from a plurality of firing groups, and wherein each firing group comprises either one channel or no channels from any given TROSA from the plurality of TROSAs; and dividing an environment surrounding the lidar device into a plurality of azimuthal regions, assigning each azimuthal region to a firing sequence from a plurality of firing sequences; and scanning each azimuthal region according to the assigned firing sequence, wherein the channels in each firing group are configured to scan the environment during a respective window of time assigned to the firing group in the firing sequence.

A15. The method of clause A14, wherein the plurality of TROSAs includes a total of N TROSAs, and wherein the plurality of firing sequences comprises: a first firing sequence in which each firing group includes N÷4 channels; a second firing sequence in which each firing group includes N÷2 channels; and a third firing sequence in which each firing group includes N channels.

A16. The method of clause A15, wherein at least one of the plurality of azimuthal regions is a region-of-interest and wherein the region-of-interest is assigned to the third firing sequence.

A17. The method of any of clauses A14 to A16, wherein each channel comprises: a transmitter configured to transmit optical signals; and a receiver configured to receive return signals based on the optical signals.

A18. The method of any of clauses A14 to A17, wherein each channel in each firing group is configured to scan the environment by: transmitting a respective optical signal toward the environment; and receiving a respective return signal based on the respective optical signal.

Terminology

The phrasing and terminology used herein is for the purpose of description and should not be regarded as limiting.

Measurements, sizes, amounts, and the like may be presented herein in a range format. The description in range format is provided merely for convenience and brevity and should not be construed as an inflexible limitation on the scope of the invention. Accordingly, the description of a range should be considered to have specifically disclosed all the possible subranges as well as individual numerical values within that range. For example, description of a range such as 1-20 meters should be considered to have specifically disclosed subranges such as 1 meter, 2 meters, 1-2 meters, less than 2 meters, 10-11 meters, 10-12 meters, 10-13 meters, 10-14 meters, 11-12 meters, 11-13 meters, etc.

Furthermore, connections between components or systems within the figures are not intended to be limited to direct connections. Rather, data or signals between these components may be modified, re-formatted, or otherwise changed by intermediary components. Also, additional or fewer connections may be used. The terms "coupled," "connected," or "communicatively coupled" shall be understood to include direct connections, indirect connections through one or more intermediary devices, wireless connections, and so forth.

Reference in the specification to "one embodiment," "preferred embodiment," "an embodiment," "some embodiments," or "embodiments" means that a particular feature, structure, characteristic, or function described in connection with the embodiment is included in at least one embodiment of the invention and may be in more than one embodiment. Also, the appearance of the above-noted phrases in various places in the specification is not necessarily referring to the same embodiment or embodiments.

The use of certain terms in various places in the specification is for illustration purposes only and should not be construed as limiting. A service, function, or resource is not limited to a single service, function, or resource; usage of these terms may refer to a grouping of related services, functions, or resources, which may be distributed or aggregated.

Furthermore, one skilled in the art shall recognize that: (1) certain steps may optionally be performed; (2) steps may not be limited to the specific order set forth herein; (3) certain steps may be performed in different orders; and (4) certain steps may be performed simultaneously or concurrently.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements).

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements).

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

It will be appreciated by those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A lidar device comprising:
- a plurality of channels; and
- a plurality of transmitter-receiver optical subassemblies (TROSAs) each comprising a respective subset of the plurality of channels,
- wherein each channel is assigned to a firing group from a plurality of firing groups,
- wherein each firing group comprises either one channel or no channels from any given TROSA from the plurality of TROSAs,
- wherein the channels in each firing group are configured to scan an environment during a respective window of time assigned to the firing group in a firing sequence; and
- wherein the plurality of TROSAs includes a total of N TROSAs, where N is a positive integer between 2 and 32, and wherein each firing group includes N÷2 channels or N÷4 channels.

2. The lidar device of claim 1, wherein each channel comprises:
- a transmitter configured to transmit optical signals; and
- a receiver configured to receive return signals based on the optical signals.

3. The lidar device of claim 1, wherein each channel in each firing group is configured to scan the environment by:
- transmitting a respective optical signal toward the environment; and
- receiving a respective return signal based on the respective optical signal.

4. The lidar device of claim 1, wherein the plurality of TROSAs is configured to rotate about an axis.

5. The lidar device of claim 1, wherein each TROSA in the plurality of TROSAs includes a scanning mirror configured to oscillate about an axis.

6. The lidar device of claim 1, wherein the lidar device is mounted on or carried by a vehicle.

7. A method comprising:
- providing a lidar device comprising:
- a plurality of channels; and
- a plurality of transmitter-receiver optical subassemblies (TROSAs) each comprising a respective subset of the plurality of channels,
- wherein each channel is assigned to a firing group from a plurality of firing groups, and
- wherein each firing group comprises either one channel or no channels from any given TROSA from the plurality of TROSAs; and
- scanning an environment surrounding the lidar device,
- wherein the channels in each firing group are configured to scan the environment during a respective window of time assigned to the firing group in a firing sequence, and
- wherein the plurality of TROSAs includes a total of N TROSAs, where N is a positive integer between 2 and 32, and wherein each firing group includes N÷2 channels or N÷4 channels.

8. The method of claim 7, wherein the plurality of TROSAs includes a total of N TROSAs, and wherein each firing group includes N channels.

9. The method of claim 7, wherein each channel in each firing group is configured to scan the environment by:
- transmitting a respective optical signal toward the environment; and
- receiving a respective return signal based on the respective optical signal.

10. The method of claim 7, wherein the plurality of TROSAs is configured to rotate about an axis.

11. The method of claim 7, wherein each TROSA in the plurality of TROSAs includes a scanning mirror configured to oscillate about an axis.

12. The method of claim 7, wherein the lidar device is mounted on or carried by a vehicle.

13. A method comprising:
- providing a lidar device comprising:
- a plurality of channels; and
- a plurality of transmitter-receiver optical subassemblies (TROSAs) each comprising a respective subset of the plurality of channels,
- wherein each channel is assigned to a firing group from a plurality of firing groups, and
- wherein each firing group comprises either one channel or no channels from any given TROSA from the plurality of TROSAs; and
- dividing an environment surrounding the lidar device into a plurality of azimuthal regions,
- assigning each azimuthal region to a firing sequence from a plurality of firing sequences; and
- scanning each azimuthal region according to the assigned firing sequence,
- wherein the channels in each firing group are configured to scan the environment during a respective window of time assigned to the firing group in the firing sequence.

14. The method of claim 13, wherein the plurality of TROSAs includes a total of N TROSAs, where N is a positive integer between 2 and 32 and wherein the plurality of firing sequences comprises:
- a first firing sequence in which each firing group includes N÷4 channels;
- a second firing sequence in which each firing group includes N÷2 channels; and
- a third firing sequence in which each firing group includes N channels.

15. The method of claim 14, wherein at least one of the plurality of azimuthal regions is a region-of-interest and wherein the region-of-interest is assigned to the third firing sequence.

16. The method of claim 13, wherein each channel comprises:
- a transmitter configured to transmit optical signals; and
- a receiver configured to receive return signals based on the optical signals.

17. The method of claim 13, wherein each channel in each firing group is configured to scan the environment by:
- transmitting a respective optical signal toward the environment; and
- receiving a respective return signal based on the respective optical signal.

* * * * *